US012196000B2

(12) United States Patent
Benzie et al.

(10) Patent No.: US 12,196,000 B2
(45) **Date of Patent: *Jan. 14, 2025**

(54) CYLINDER LOCK WITH MULTIPLE, SUPPLEMENTAL LOCKING ELEMENTS AND ASSOCIATED KEY

(71) Applicant: ASSA ABLOY HIGH SECURITY GROUP INC., Salem, VA (US)

(72) Inventors: Mark Benzie, Roanoke, VA (US); Douglas E. Trent, Roanoke, VA (US); Samuel D. Wood, Greensboro, NC (US); Peter H. Field, Salem, VA (US); Walter Dannhardt, Roanoke, VA (US); Thomas Duckwall, Roanoke, VA (US)

(73) Assignee: ASSA ABLOY HIGH SECURITY GROUP INC., Salem, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,724

(22) Filed: Apr. 10, 2023

(65) Prior Publication Data

US 2023/0313562 A1 Oct. 5, 2023

Related U.S. Application Data

(63) Continuation of application No. 17/062,271, filed on Oct. 2, 2020, now Pat. No. 11,624,206.
(Continued)

(51) Int. Cl.
*E05B 19/00* (2006.01)
*E05B 27/00* (2006.01)
(Continued)

(52) U.S. Cl.
CPC ...... *E05B 19/0064* (2013.01); *E05B 27/0082* (2013.01); *E05B 35/003* (2013.01);
(Continued)

(58) Field of Classification Search
CPC .. E05B 19/0058; E05B 19/0064; E05B 19/14; E05B 27/0032; E05B 27/0039;
(Continued)

(56) References Cited

U.S. PATENT DOCUMENTS 167,088 A 8/1875 Felter
947,913 A 2/1910 Jenkins
(Continued)

FOREIGN PATENT DOCUMENTS

CN 106368515 A1 2/2017
CN 205935957 U 2/2017
(Continued)

OTHER PUBLICATIONS

International Search Report and Written Opinion in International Patent Application No. PCT/US2014/058817, 10 pages (Dec. 18, 2014).
(Continued)

*Primary Examiner* — Christopher J Boswell
(74) *Attorney, Agent, or Firm* — ROTHWELL, FIGG, ERNST & MANBECK, P.C.

(57) ABSTRACT

A lock assembly includes a plug with a keyway, primary pins aligned with the keyway for controlling rotation of the plug, a sidebar for controlling rotation of the plug, secondary pins adjacent the keyway for controlling movement of the sidebar, and at least one supplemental sidebar control element for controlling movement of the sidebar. The lock assembly is operated by simultaneously manipulating the primary pins, the secondary pins, and the supplemental sidebar control element to place each in a respective position and/or orientation to permit rotation of the plug and to permit sufficient movement of the sidebar to permit rotation of the plug and then applying torque to the plug.

15 Claims, 43 Drawing Sheets

Related U.S. Application Data

(60) Provisional application No. 63/062,016, filed on Aug. 6, 2020, provisional application No. 63/060,690, filed on Aug. 4, 2020, provisional application No. 62/910,083, filed on Oct. 3, 2019.

(51) Int. Cl.
*E05B 35/00* (2006.01)
*E05B 35/14* (2006.01)
*E05B 19/14* (2006.01)
*E05B 27/10* (2006.01)

(52) U.S. Cl.
CPC .............. *E05B 35/14* (2013.01); *E05B 19/14* (2013.01); *E05B 27/0032* (2013.01); *E05B 27/10* (2021.08); *E05Y 2201/47* (2013.01)

(58) Field of Classification Search
CPC .. E05B 27/0078; E05B 27/0082; E05B 27/10; E05B 29/0066; E05B 35/003; E05B 35/14
See application file for complete search history.

(56) References Cited

U.S. PATENT DOCUMENTS 1,567,979 A 12/1925 Northrop
1,965,336 A 7/1934 Gerald
2,021,185 A 11/1935 Hurd
2,438,435 A 3/1948 Gagnon
2,440,428 A 4/1948 Best
2,629,247 A 2/1953 Deutsch
2,660,876 A 12/1953 Spain
3,486,355 A 12/1969 Halfyard
3,499,302 A 3/1970 Spain
3,623,345 A 11/1971 Solitanner
3,722,241 A 3/1973 Sussina
3,877,267 A 4/1975 Harris, Jr.
3,990,282 A 11/1976 Sorum
4,377,082 A 3/1983 Wolter
4,393,673 A 7/1983 Widen
D274,302 S 6/1984 Widen
4,507,944 A 4/1985 Widen
D278,880 S 5/1985 Widen
4,545,226 A 10/1985 Urrestarazu-Borda
4,577,479 A 3/1986 Widen
4,662,200 A 5/1987 Borda
4,667,495 A 5/1987 Girard
4,756,177 A 7/1988 Widen
4,815,307 A 3/1989 Widen
5,067,335 A 11/1991 Widen
5,076,081 A 12/1991 Boris, Jr.
5,170,651 A 12/1992 Errani
5,437,176 A 8/1995 Keller
5,457,974 A 10/1995 Keller
5,475,998 A 12/1995 Raskevicius
D368,845 S 4/1996 Widen
D370,168 S 5/1996 Widen
D370,169 S 5/1996 Widen
5,520,035 A 5/1996 Eizen
5,640,865 A 6/1997 Widen
5,715,717 A 2/1998 Widen
5,778,712 A 7/1998 Wallden
5,784,910 A 7/1998 Eizen
5,809,816 A 9/1998 Widen
5,813,260 A 9/1998 Widen
5,839,308 A 11/1998 Eizen
5,845,525 A 12/1998 Widen
6,134,929 A 10/2000 Widen
6,427,506 B1 8/2002 Prunbauer
6,477,875 B2 11/2002 Field
6,606,890 B1 8/2003 Widen
6,681,609 B1 1/2004 Preddey
6,708,539 B1 3/2004 Widen
6,755,063 B2 6/2004 Takadama
6,945,082 B2 9/2005 Field
7,159,424 B2 1/2007 Widen
7,370,502 B2 5/2008 Widen
7,377,146 B2 5/2008 Field
7,392,677 B1 7/2008 Fan
7,487,653 B2 2/2009 Widen
7,621,163 B2 11/2009 Widen
7,665,336 B2 2/2010 Widen
7,665,337 B1 2/2010 Widen
7,673,484 B1 3/2010 Crepinsek
7,797,973 B2 9/2010 Field
7,810,364 B2 10/2010 Widen
7,958,760 B2 6/2011 Widen
8,056,380 B2 11/2011 Widen
8,061,168 B2 11/2011 Widen
8,156,777 B1 4/2012 Widen
8,205,473 B2 6/2012 Widen
8,210,009 B2 7/2012 Widen
8,230,708 B2 7/2012 Widen
8,281,628 B2 10/2012 Widen
8,347,680 B2 1/2013 Widen
8,387,425 B2 3/2013 Ben-Aharon et al.
8,448,485 B1 5/2013 Widen
8,539,803 B2 9/2013 Widen
8,720,241 B1 5/2014 Widen
9,045,915 B2 6/2015 Field et al.
9,157,256 B2 10/2015 Hiscocks
9,359,793 B2 6/2016 Field
9,416,561 B2 8/2016 Field et al.
9,919,368 B2 3/2018 Widen
RE46,878 E 5/2018 Widen
10,112,243 B2 10/2018 Widen
10,337,210 B2 7/2019 Widen
10,472,856 B1 11/2019 Widén
11,499,340 B1 11/2022 Kim
11,624,206 B2 * 4/2023 Benzie .................... E05B 35/14
70/358
2006/0101880 A1 5/2006 Ward-Dolkas
2010/0326150 A1 12/2010 Chung
2013/0298621 A1 11/2013 Clifford
2015/0184422 A1 7/2015 Chang
2019/0106905 A1 4/2019 Widen
2021/0102402 A1 4/2021 Benzie

FOREIGN PATENT DOCUMENTS

DE 8017686 U1 9/1984
DE 3424307 A1 1/1985
EP 0202949 A2 11/1986
EP 0431550 A1 6/1991
EP 1767731 A1 3/2007
EP 3205796 A1 8/2017
WO 1987004749 A1 8/1987
WO 2014165949 A1 10/2014
WO 2015001559 A1 1/2015
WO 2015051114 A1 4/2015
WO 2016/205067 A1 12/2016
WO 2018224259 A1 12/2018

OTHER PUBLICATIONS

International Preliminary Report on Patentability issued in International Application No. PCT/US2014/058817, 8 pages (Apr. 14, 2016).
International Search Report and Written Opinion in International Patent Application No. PCT/US2020/054108, 18 pages (Feb. 22, 2021).
Notice of Allowance issued in corresponding U.S. Appl. No. 17/351,210, 30 pages (Nov. 16, 2021).
International Preliminary Report on Patentability (Chapter II) issued in corresponding International application No. PCT/US2020/054108, 27 pages, (Dec. 21, 2021).

* cited by examiner

CYLINDER LOCK WITH MULTIPLE, SUPPLEMENTAL LOCKING ELEMENTS AND ASSOCIATED KEY

CROSS REFERENCE OF RELATED APPLICATION

This application is a continuation which claims the benefit under 35 U.S.C. § 120 of the filing date of non-provisional patent application Ser. No. 17/062,271 filed Oct. 2, 2020, now U.S. Pat. No. 11,624,206, which claims the benefit under 35 U.S.C. § 119 (e) of the filing date of U.S. provisional patent application Ser. Nos. 62/910,083 filed Oct. 3, 2019, 63/060,690 filed Aug. 4, 2020, and 63/062,016 filed Aug. 6, 2020, the disclosures of which are incorporated herein by reference in their entirety.

FIELD OF THE DISCLOSURE

This disclosure relates to improvements in keys, key blanks, keyways, and lock cylinders, particularly with regard to multiple, supplemental locking elements and keys having a shuttle element mounted within the blade of the key for lateral movement to actuate a supplemental sidebar control element of the cylinder lock.

BACKGROUND

Keyways formed in cylinders are generally defined by a width and height with various ridges and grooves formed in the keyway to create a unique shape (or profile) that corresponds with the same shape or profile of the keys that can be inserted into the cylinder. Only keys with matching profiles can be inserted into the cylinder. This prevents unauthorized keys with different profiles from being inserted into the lock cylinder.

Prior art keys have a limited number of unique key identifiers and locking elements. Increasing the number of locking elements in a lock can improve the security of the lock as lock picking techniques become more sophisticated and as practitioners of such techniques become more persistent. Increasing the number of supplemental locking elements on a key blade with a movable element would increase the number of unique key possibilities, reduce the ability to pick the lock, and retain control of key blade distribution with the manufacturer. The challenge, however, is providing such additional, supplemental locking elements in an assembly having limited space for accommodating the additional locking elements.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Increasing the number of supplemental locking elements on a key blade with a movable element would increase the number of unique key possibilities, reduce the ability to pick the lock, and retain control of key blade distribution with the manufacturer.

Aspects of the disclosed subject matter are embodied lock cylinders that generally comprise a housing and a plug with a keyway formed therein. The plug is rotatably disposed within a bore formed in the housing. A sidebar is disposed within a sidebar opening formed in the plug and configured for radial movement with respect to an axis of rotation of the plug for engaging a sidebar groove formed in a wall of the bore formed in the housing for controlling rotation of the plug within the housing. Primary pins or primary side bar control elements (rotating tumblers) are aligned with the keyway for controlling rotation of the plug within the housing and for controlling radial movement of the sidebar within the sidebar opening. One or more secondary pins or secondary sidebar control elements are disposed within the plug adjacent to the keyway for controlling radial movement of the sidebar within the sidebar opening. At least one supplemental sidebar control element for further controlling radial movement of the sidebar is disposed within the sidebar opening.

In various embodiments, the keyway of the cylinder lock may include a multi-level ridge or rib that has multiple lengthwise segments or extents of different heights (i.e., different levels, planes, or surfaces) along the length of the ridge and transitions (transition zone or ramps) between the different segments. These surfaces of these different segments may interact with one or more moveable element(s) (e.g., shuttle pin(s)) in the key to thereby move each moveable element into position to engage and control locking element(s) in the cylinder. The multi-level ridge's different levels may be located at different positions along the length of the keyway to align with different key and cylinder adaptations.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
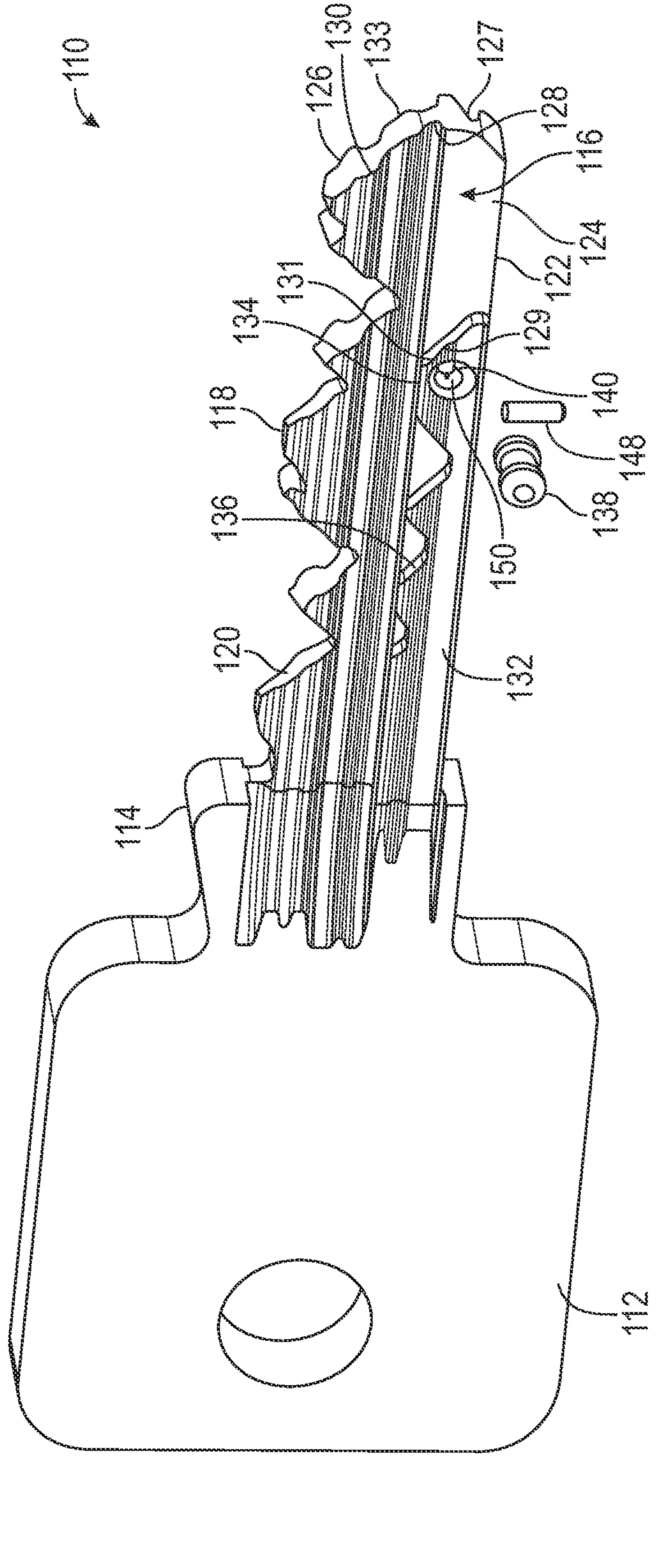
FIG. 1 is an exploded top perspective view of a bitted key.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Unless otherwise indicated, or the context suggests otherwise, terms used herein to describe a physical and/or spatial relationship between a first component, structure, or portion thereof and a second component, structure, or portion thereof, such as, attached, connected, fixed, joined, linked, coupled, or similar terms or variations of such terms, shall encompass both a direct relationship in which the first component, structure, or portion thereof is in direct contact with the second component, structure, or portion thereof or there are one or more intervening components, structures, or portions thereof between the first component, structure, or portion thereof and the second component, structure, or portion thereof.

Furthermore, unless otherwise stated, any specific dimensions mentioned in this description are merely representative of an exemplary implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

Key and Key Blank

Figure 2:
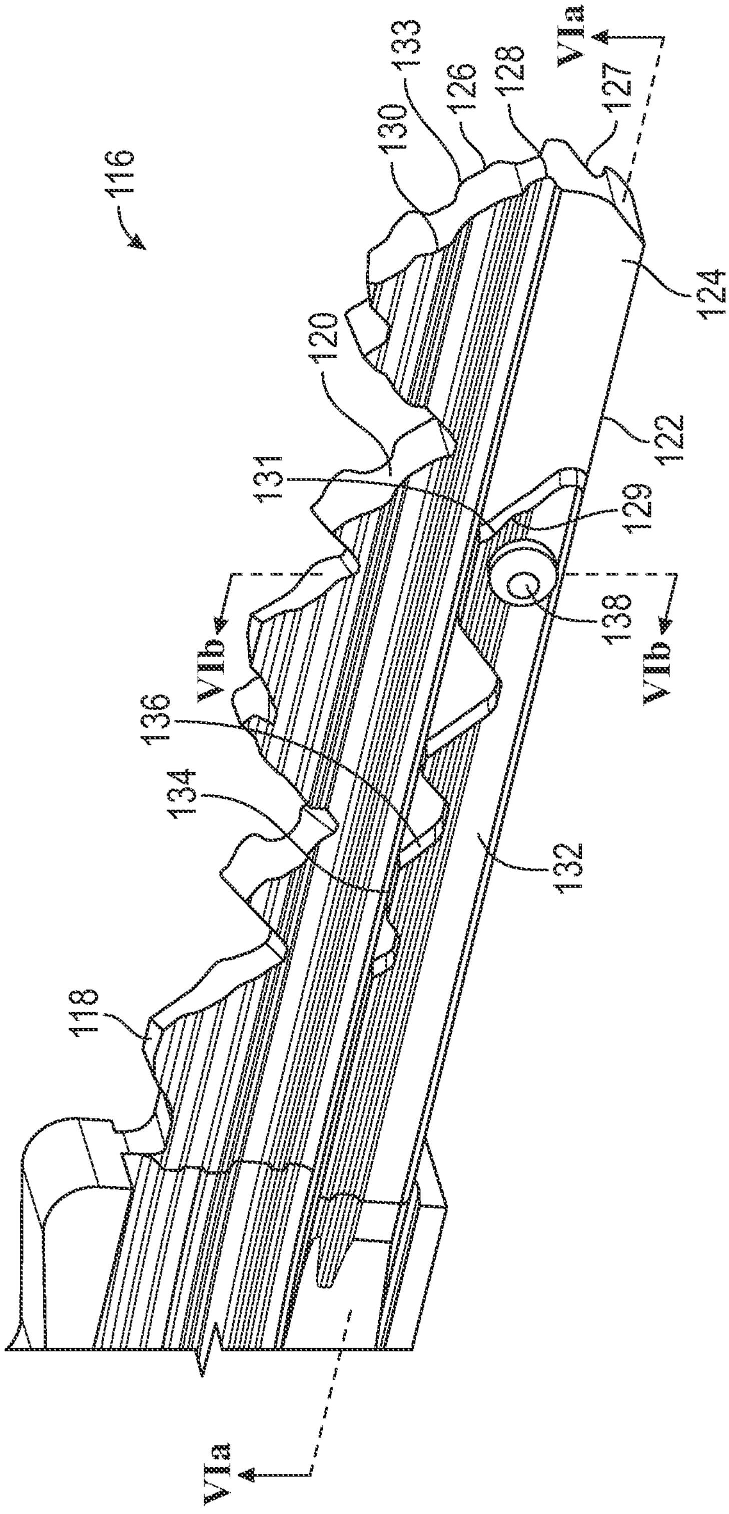
FIG. 2 is a top perspective view of a first side of a blade of the bitted key with a shuttle pin in an extended position.
Figure 3:
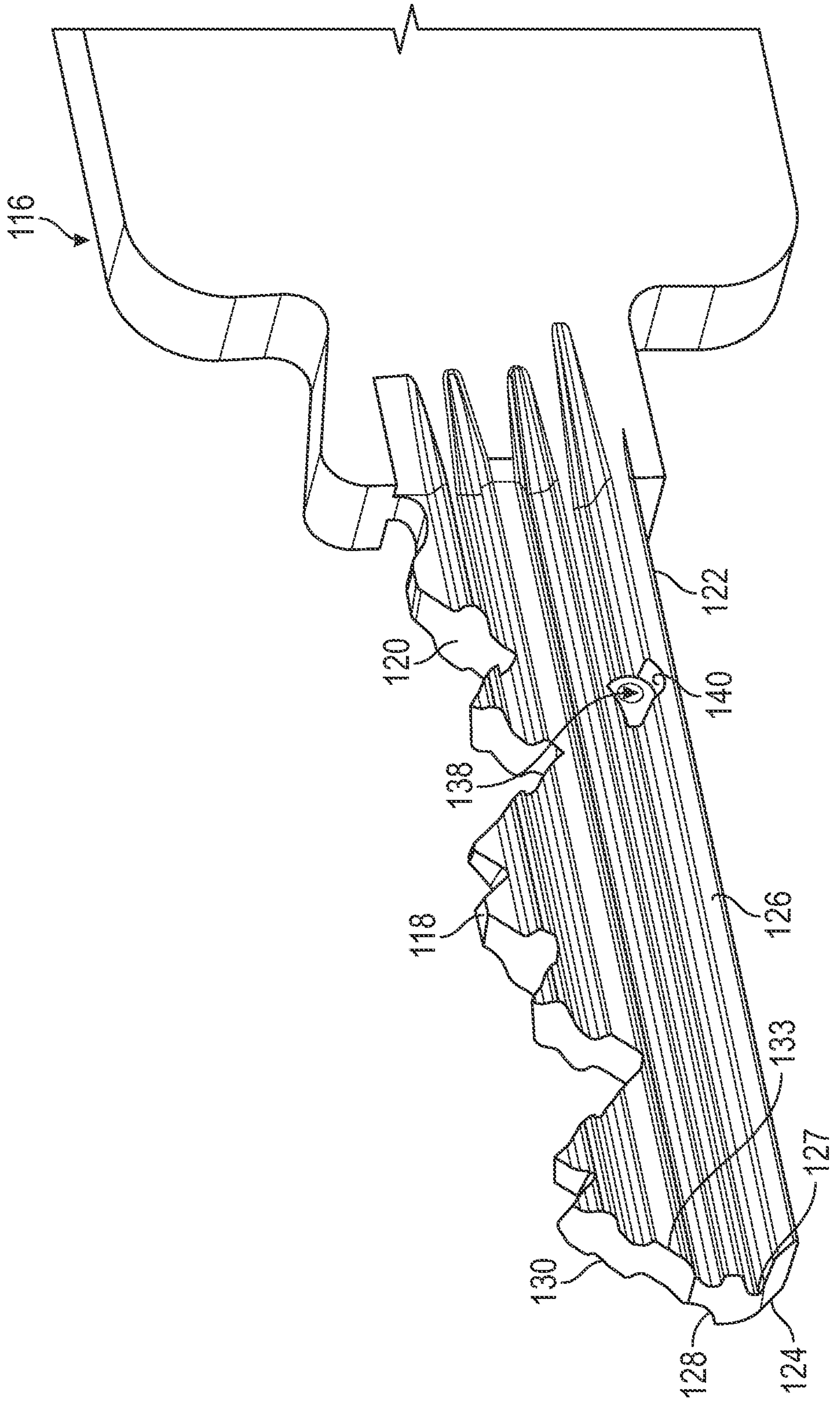
FIG. 3 is a top perspective view of a second side of the blade of the bitted key with the shuttle pin in the extended position.

FIGS. 1-3 show, respectively, a key 110 having a key blade 116, a first side 124 of the key blade 116, and a second side 126 of the key blade 116, configured to operate a lock as disclosed herein. In an embodiment, key 110 includes a bow 112 and a shoulder 114, or key stop, with the blade 116 extending from the key stop 114. Key 110 includes a primary top edge 118 with primary bitting cuts 120, a bottom edge 122, and first 124 and second 126 opposed sides extending between the primary top edge 118 and the bottom edge 122. Note that the designation of sides 124 and 126 as first and second is arbitrary. In some embodiments, the primary bitting cuts may 120 be skew type bittings that provide elevation and rotational positioning to the primary pins.

Each side of blade 116 may include warding grooves and ridges extending longitudinally along the blade, such as groove 128 and ridge 130 on the first side 124 and groove 127 and ridge 133 on the second side 126. As further described below, groove 127 is located to align with and accept a multi-level ridge of a cylinder keyway as the key 110 is inserted into the lock.

First side 124 may include a rib 132 extending longitudinally along at least a portion of the length of the key blade 116. Rib 132 defines a secondary top edge 134 on which may be formed secondary bittings 136. Rib 132 may include warding grooves and ridges, such as groove 129 and ridge 131, extending longitudinally along the rib. Groove 127 extends longitudinally along key blade 116 on a side of the blade 116 opposite the rib 132.

Key 110 further includes a movable element, such as a shuttle pin 138, disposed within a through-hole 140 extending transversely through the key blade 116 from the first side 124 to the second side 126. Although the concepts disclosed herein are described in the context of shuttle pin 138, these concepts also encompass other forms of "movable elements" configured to extend transversely through the key blade 116 from the first side 124 to the second side 126.

The shuttle pin 138 may be positioned within the key blade 116 at different longitudinal locations. FIGS. 4A, 4B, 4C, 4D are side views of varying embodiments of keys 110*a*, 110*b*, 110*c*, 110*d* including primary bittings 120*a*, 120*b*, 120*c*, 120*d* and secondary bittings 136*a*, 136*b*, 136*c*, 136*d*, respectively. The shuttle pin 138 and through-hole 140 are positioned at a first location, second location, third location, and fourth location along the key blade 116*a*, 116*b*, 116*c*, 116*d*. Note that primary bittings 120*a*, 120*b*, 120*c*, 120*d* may each be the same or different and secondary bittings 136*a*, 136*b*, 136*c*, 136*d* may each be the same or different.

In the embodiments shown in FIGS. 1-4D, shuttle pin 138 extends through rib 132 and groove 127. Alternatively, shuttle pin 138 may be located at a position along the length of the key blade 116 before the rib 132, after the rib 132, or on a key blade having no rib 132.

Figure 5:
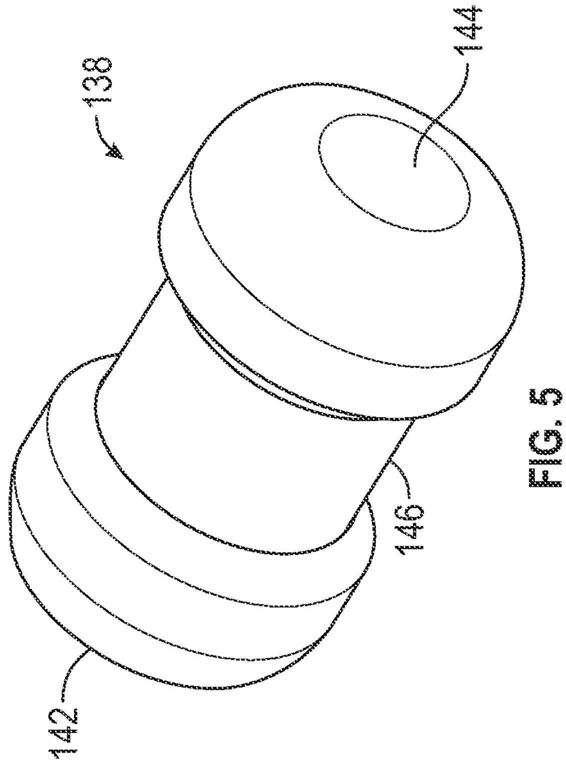
FIG. 5 is a top perspective view of a shuttle pin.
Figure 4A:
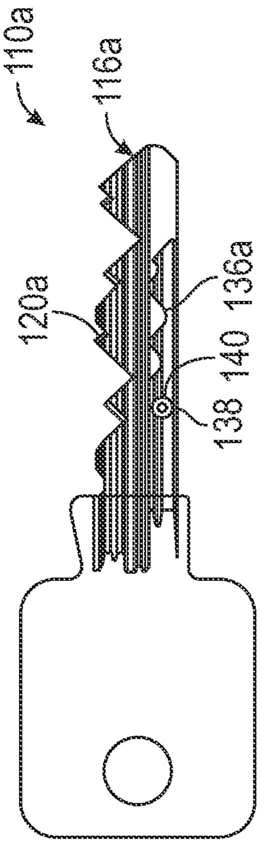
FIGS. 4A-4D are side views of four embodiments of a key blade with a shuttle pin and secondary bittings located in different positions along the length of the key blade.
Figure 4B:
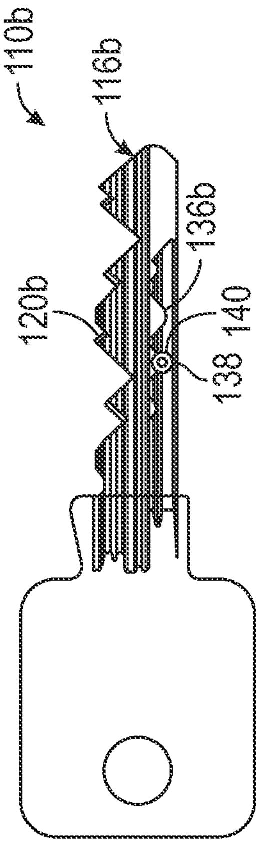
Figure 4C:
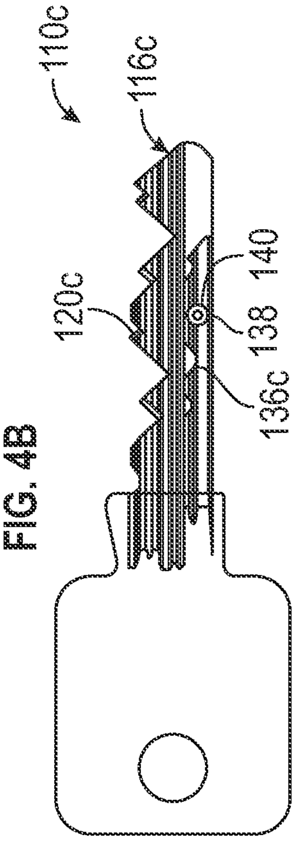
Figure 4D:
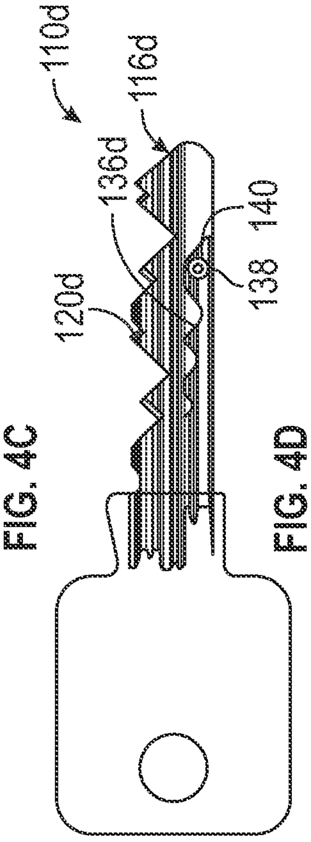

FIG. 5 shows features of the shuttle pin 138 having a first end or enlarged head portion 142 and second end or enlarged head portion 144 at opposite longitudinal ends connected by a narrower, generally cylindrical center portion 146.

Referring to FIGS. 1-3, shuttle pin 138 is retained within the through-hole 140 and is configured to be moveable within the through-hole 140 across the width of the key 110 from a retracted or first position, in which the second end 144 of the shuttle pin 138 extends into the groove 127, to an extended or second position, in which the second end 144 of the shuttle pin 138 is moved out of the groove 127 and the first end 142 of the shuttle pin 138 extends from the first side 124 of the key blade 116 to actuate a supplemental sidebar control element. See also FIGS. 8A and 8B. As will further be described below, shuttle pin 138, or other movable element, is configured to engage a multi-level ridge within a keyway of a lock as key 110 is inserted into the keyway. The multi-level ridge moves the shuttle pin, or other moveable element, from the first position to the second position.

Figure 6:
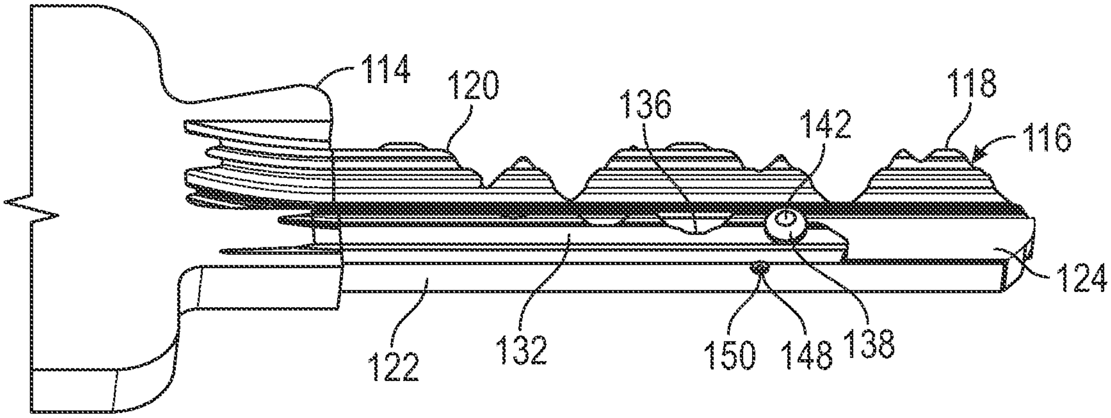
FIG. 6 is a bottom perspective view of the bitted key blade.
Figure 7:
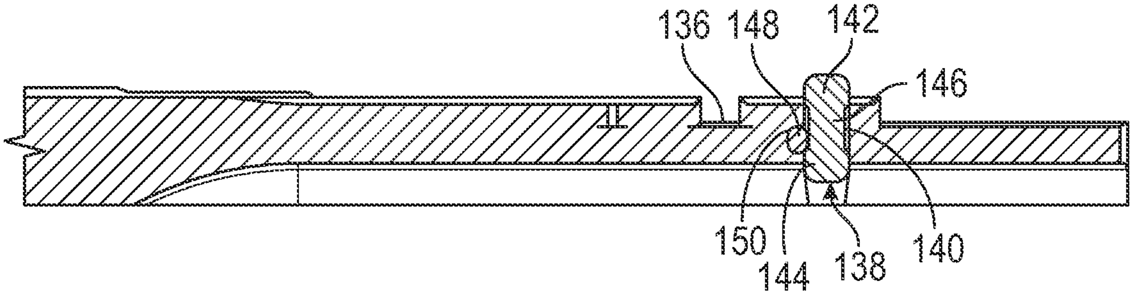
FIG. 7 is a longitudinal cross-section of the key blade along line VIa-VIa in FIG. 2.
Figure 8B:
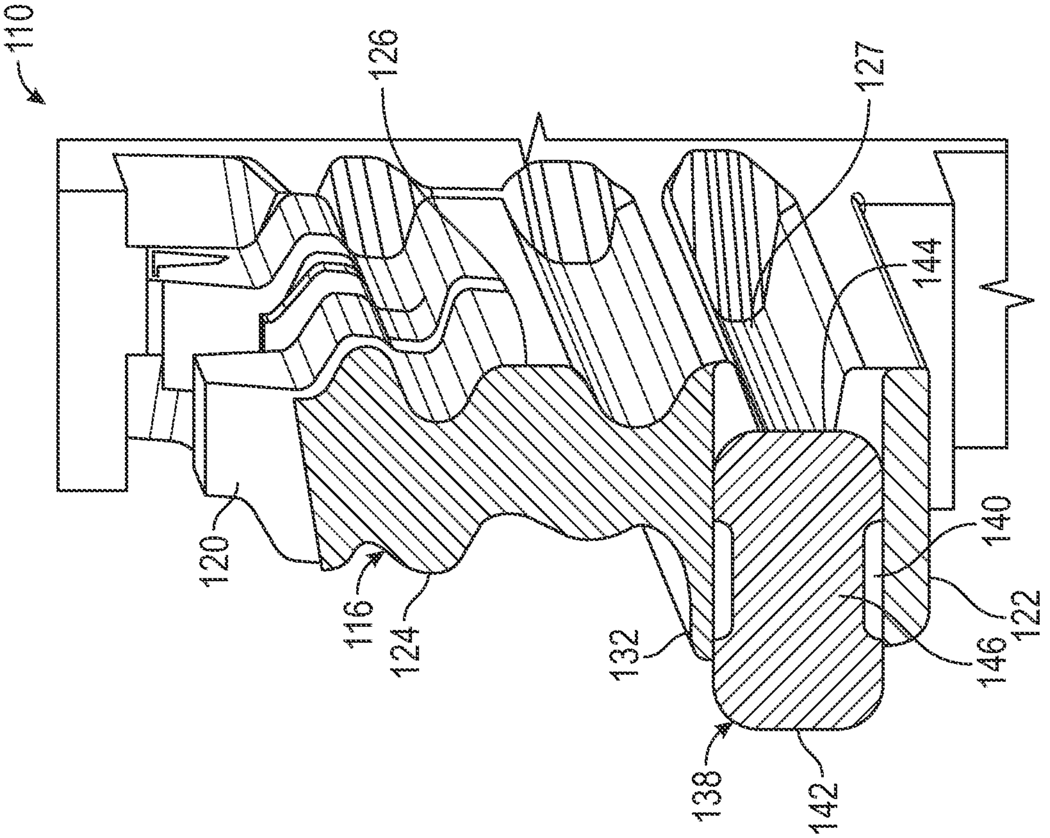
FIG. 8B is a transverse cross-section of the key blade along line VIb-VIb in FIG. 2 with the shuttle pin in an extended position.
Figure 8A:
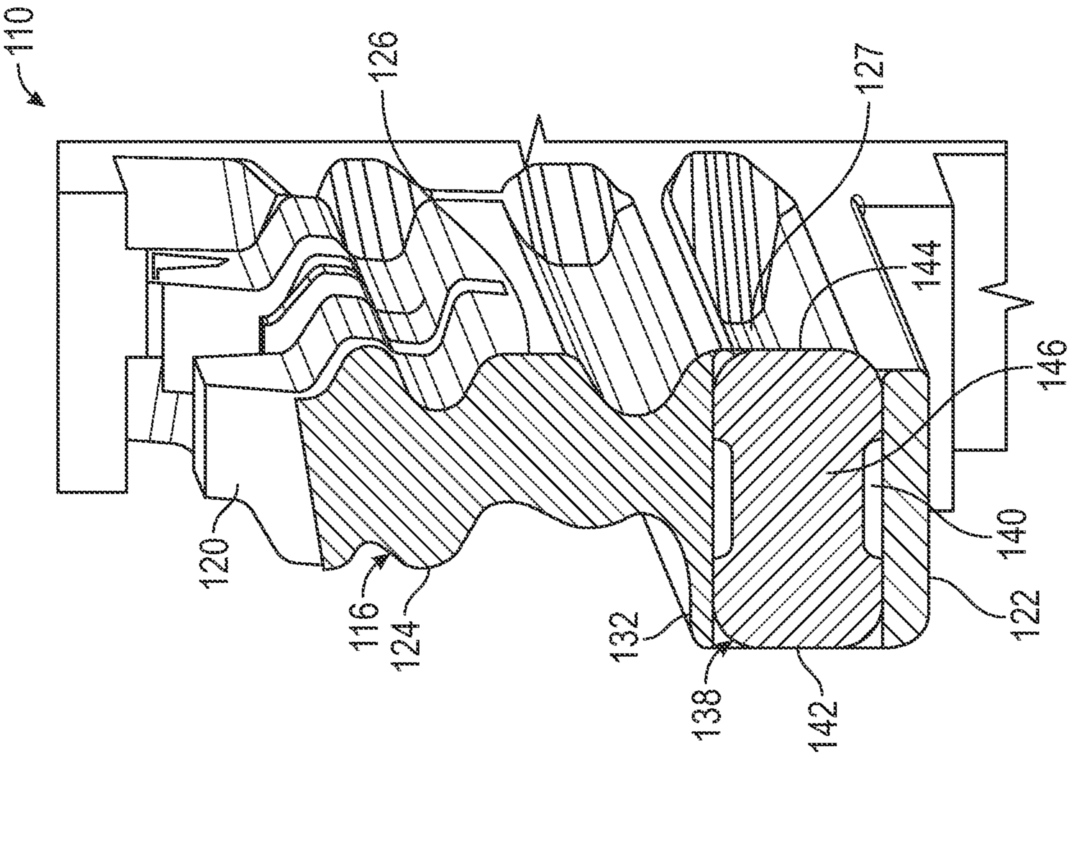
FIG. 8A is a transverse cross-section of the key blade along line VIb-VIb in FIG. 2 with the shuttle pin in a retracted position.

FIG. 6 depicts the bottom edge 122 of the key blade 116. A shuttle pin retainer 148 is disposed in a retainer hole 150 extending vertically from the bottom edge 122 upwards towards the top edge 118 and intersecting through hole 140. FIG. 7 is a cross sectional view of FIG. 6 cut longitudinally through the blade 116 and shuttle pin 138, looking down on key 110 inverted and the top edges 118 and 134 are facing downwards (i.e., a longitudinal cross-section of the key blade 116 along line VIa-VIa in FIG. 2). FIG. 7 illustrates the position of the retainer 148 relative to the shuttle pin 138. The shuttle pin retainer 148 extends into the through-hole 140 to contact the shuttle pin center portion 146 and blocks enlarged head portions 142, 144 to retain the shuttle pin 138 within through-hole 140 while allowing limited axial movement of the shuttle pin 138 within the through-hole 140. FIGS. 8A and 8B are transverse cross-sections of the key blade along line VIb-VIb in FIG. 2 and show the shuttle pin 138 disposed within through hole 140 extending through the rib 132 within groove 127 extending longitudinally along key blade 116 on a side of the blade opposite the rib 132. In FIG. 8A, shuttle pin 138 is retracted within the through hole 140 with the first end 142 flush with or recessed from an outer edge of the rib 132 on the first side 124 of the key blade 116 and the second end 144 of the shuttle pin 138 extended into a longitudinal groove 127 on the second side 126 of the key blade 116. In FIG. 8B, shuttle pin 138 is extended within the through hole 140 with the first end 142 extending beyond the outer edge of the rib 132 on the first side 124 of the key blade 116. The shuttle pin can be caused to move from the retracted position shown in FIG. 8A to the extended position shown in FIG. 8B when inserted into a keyway by a projecting rib or multi-level ridge in the keyway that extends into the groove 127 to contact the second end 144 of the shuttle pin 138.

The present disclosure further contemplates a key blank from which key 110 may be formed. Such a key blank may include all features shown and described above with respect to key 110, key blade 116, and shuttle pin 138, except the primary bittings 120 and the secondary bittings 136, which are later formed (e.g., cut, machined) on the primary top edge 118 and secondary top edge 134, respectively, with a key cutting machine to operate a specifically coded lock.

Lock Assembly—First Embodiment

Figure 9:
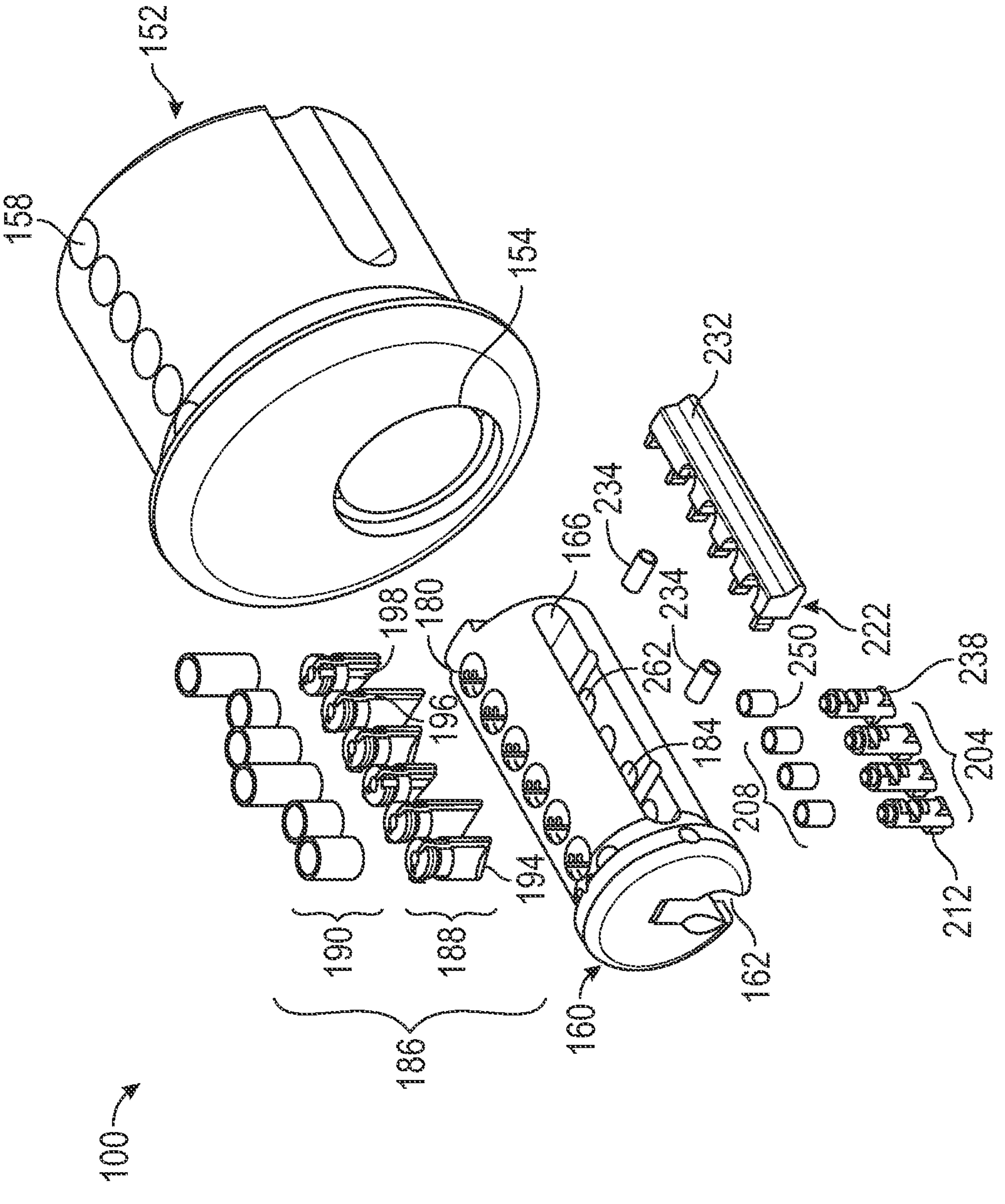
FIG. 9 is an exploded top perspective view of a first embodiment of a cylinder lock assembly with multiple, supplemental locking elements.

FIG. 9 is an exploded, top perspective view of a first embodiment of a cylinder lock assembly 100 that may be operated by key 110 described above. Lock assembly 100 includes a housing 152 having an axial bore 154 in which a cylindrical plug or cylinder 160 is rotatably disposed. A sidebar 222 is positioned in a sidebar cavity 166 formed in the side of the plug 160 and a beveled projection, or nose, 232 extends into an axial sidebar groove 156 (not shown in FIG. 9, see FIGS. 25, 26, 27) formed in the sidewall of the axial bore 154 in the housing 152. The sidebar 222 is urged radially outwardly from the rotational axis of the plug 160, for example, by springs 234 located in the sidebar 222 spring holes, and the beveled projection 232 is urged into the sidebar groove 156 to prevent rotation of the plug 160 within the axial bore 154. The plug 160 cannot be rotated to the unlocked position until the sidebar 222 is moved radially upon application of a torque about the rotational axis of the plug 160, and the beveled projection 232 forces the end of the sidebar 222 from the sidebar groove 156.

Primary pin sets or primary sidebar control elements 186 (e.g., tumbler pins) may control rotation of the plug 160 within the bore 154 and control movement of the sidebar 222 out of engagement with the sidebar groove 156, as will be described below. Each primary set 186 comprises a top, or primary, pin 188, a top pin driver 190, and a top pin spring (not shown). In the illustrated embodiment, the lock assembly 100 includes six pin sets 186. Alternatively, the lock assembly may have a different number of pin sets 186.

Lock assembly 100 may further include a secondary sidebar control element in the form of secondary pins, or side pins 204, that are positioned by the secondary bitting cuts 136 of key 110, and a supplemental sidebar control element comprising a supplemental pin, e.g., in the form of a lift pin 238, that is positioned by the shuttle pin 138 of the key 110. The side pins 204 and lift pin 238 control movement of the sidebar 222 out of engagement with the sidebar groove 156, as will be described below. In the illustrated embodiment (FIG. 9), the lock assembly 100 includes three side pins 204 and one lift pin 238. Alternatively, as further described below, the lock assembly may have a different numbers of secondary pins 204 and lift pins 238 located at various positions within the plug 160. In some embodiments, the lock assembly may have no side pins 204. In various embodiments, the sidebar may be controlled by only one or more supplemental sidebar control elements (e.g., one or more lift pins), or by any combination of primary pins, secondary pins, and supplemental sidebar control elements.

Figure 10:
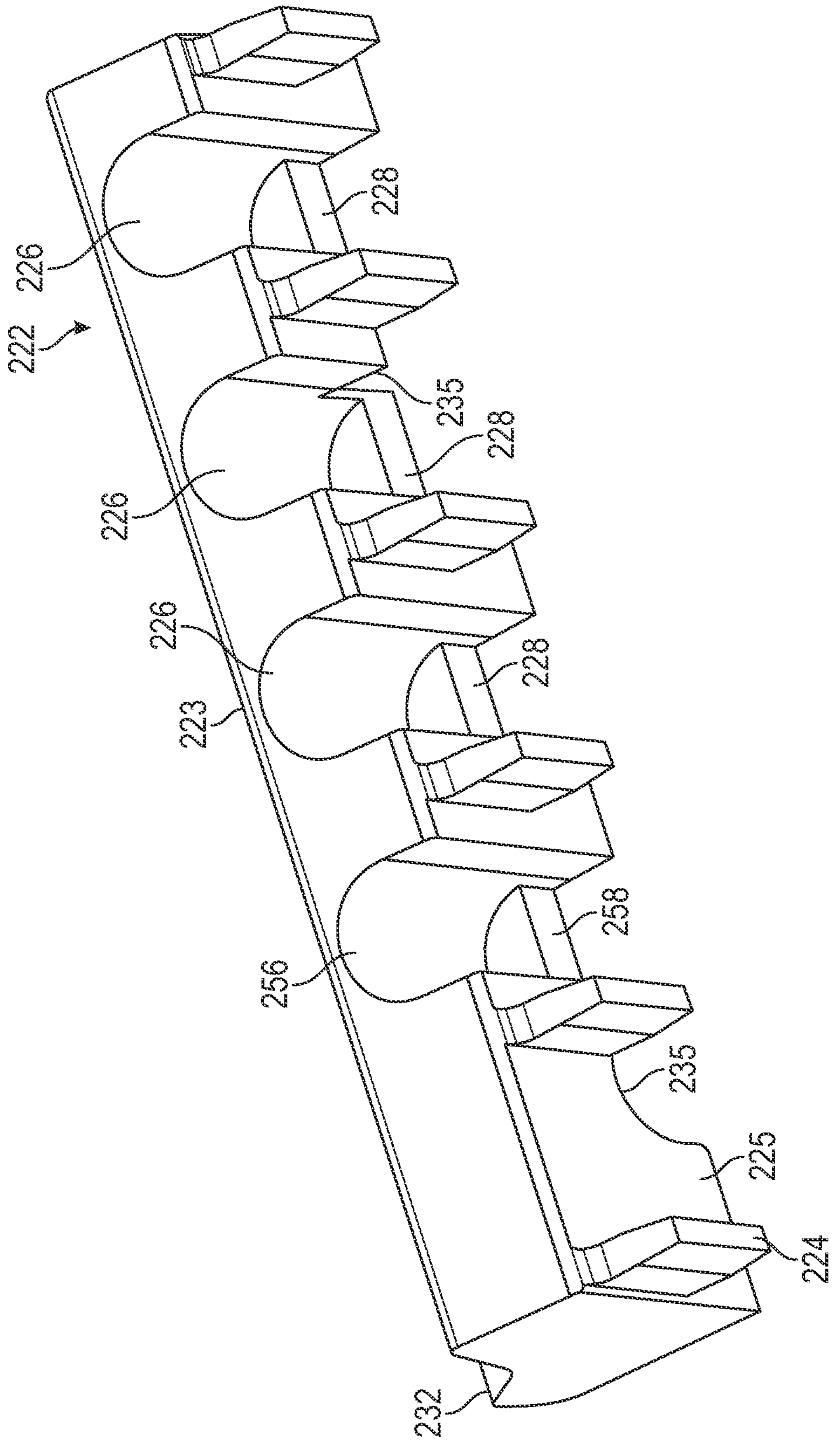
FIG. 10 is a top perspective view of a sidebar of the first embodiment of the cylinder lock assembly.

FIG. 10 illustrates features of one embodiment of the sidebar 222. The sidebar 222 has a first side 223 having the beveled projection 232 and a second side 225 having various blocking elements to block the sidebar 222 from moving radially when the lock assembly 100 is in the locked state and allow radial movement of the sidebar 222 when the lock assembly 100 is in the unlocked state. The various blocking elements include primary blocking lugs 224 projecting from the second side 225, secondary pin cutouts 226 formed in the second side 225 between adjacent pairs of blocking lugs 224, secondary blocking shelves 228 extending across each cutout 226, and supplemental blocking elements (e.g., supplemental cutout 256 and supplemental blocking feature, such as supplemental blocking shelf 258 extending across cutout 256). The second side 225 further includes spring holes 235 to house the springs 234 (not shown in FIG. 10, see FIG. 9). The spring holes 235 may be positioned below primary blocking lugs 224. FIG. 10 depicts two spring holes 235 positioned below the second outer-most primary blocking lugs 224 on each end of the sidebar 222. Other embodiments may include various quantities and positions of the spring holes 235.

Referring again to FIG. 9, the plug 160 and the housing 152 have top, or primary, pin holes 180, 158, respectively, in which the top, or primary, pin sets 186 are positioned. Plug 160 further includes a keyway 162 extending longitudinally therein and aligned with the primary pin holes 180. The top pins 188 have beveled tips 194, and can be properly positioned to permit rotation of the plug 160 within the housing 152 by inserting a properly bitted key 110 into the keyway 162 to elevate the top pins 188 to align a shear line between the top pin 188 and the corresponding top pin driver 190 of each top pin set 186 with a shear line between the plug 160 and the housing 152. Each top pin 188 may further include a sidebar recess 196 formed in a side of the pin (e.g., a longitudinal slot or hole) to permit movement of the sidebar 222 when the top pins 188 are properly oriented rotationally by beveled primary cuts 120 of the key 110. Each top pin 188 may optionally include one or more false longitudinal sidebar recesses 198 to foil lock picking as further explained below.

Figure 11B:
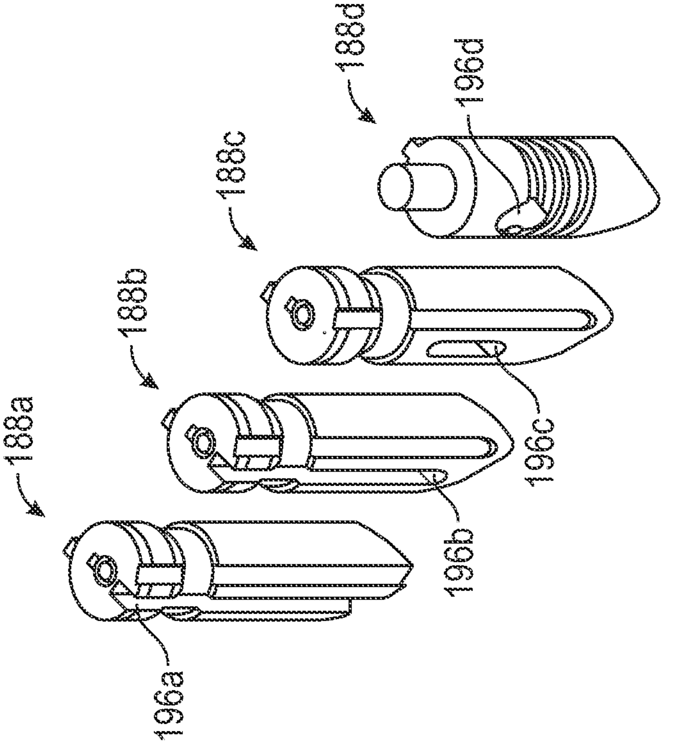
FIG. 11B illustrates top perspective views of the embodiments of the primary pin shown in FIG. 11A.
Figure 11A:
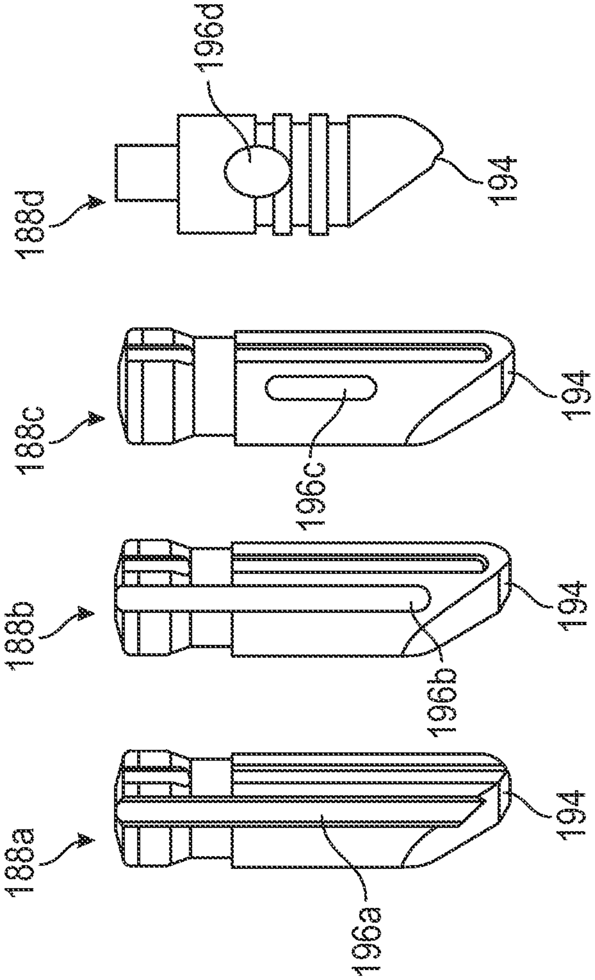
FIG. 11A illustrates front views of various embodiments of a primary pin.
Figure 24:
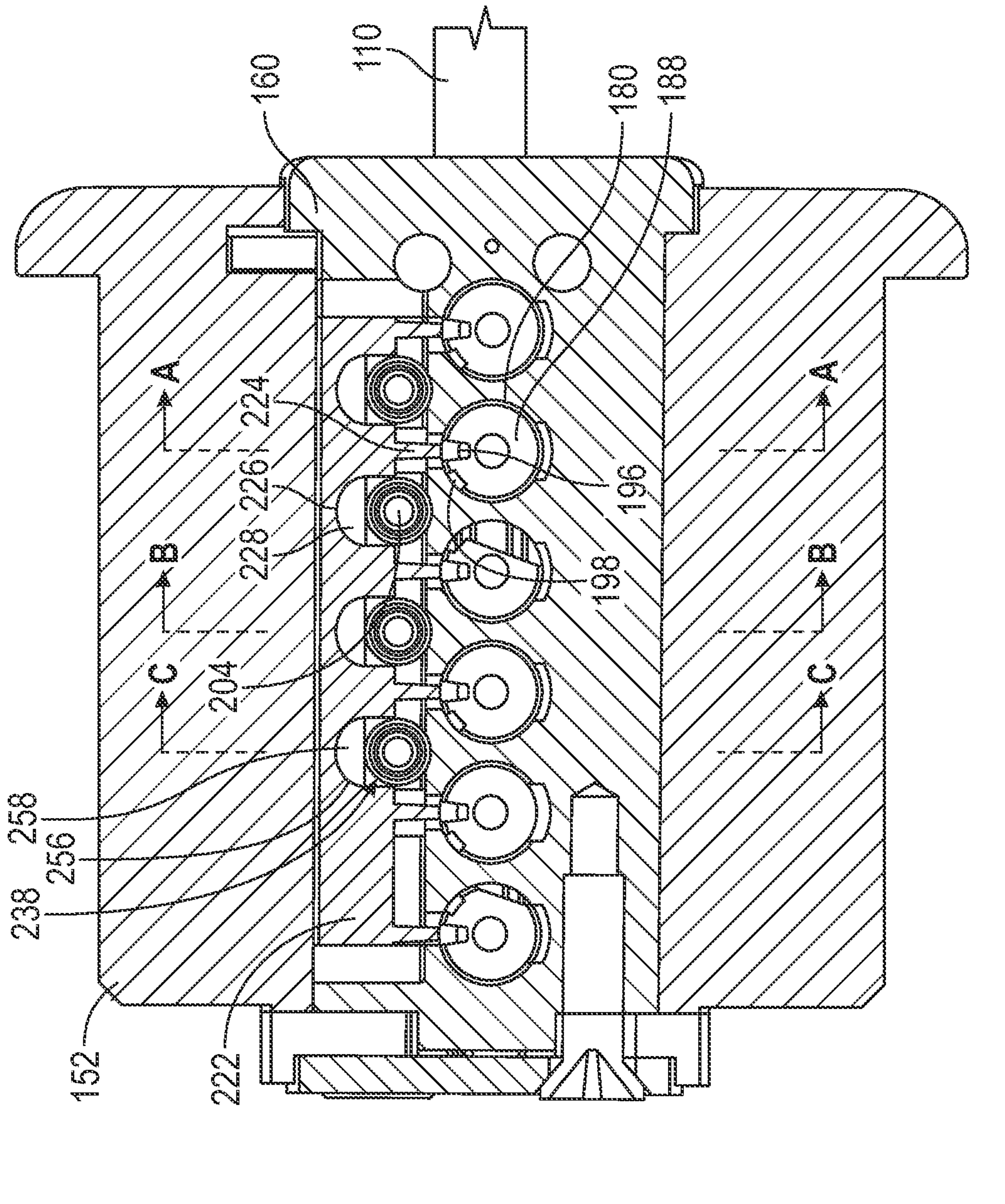
FIG. 24 is a longitudinal cross-section of the first embodiment of the cylinder lock assembly.
Figure 25:
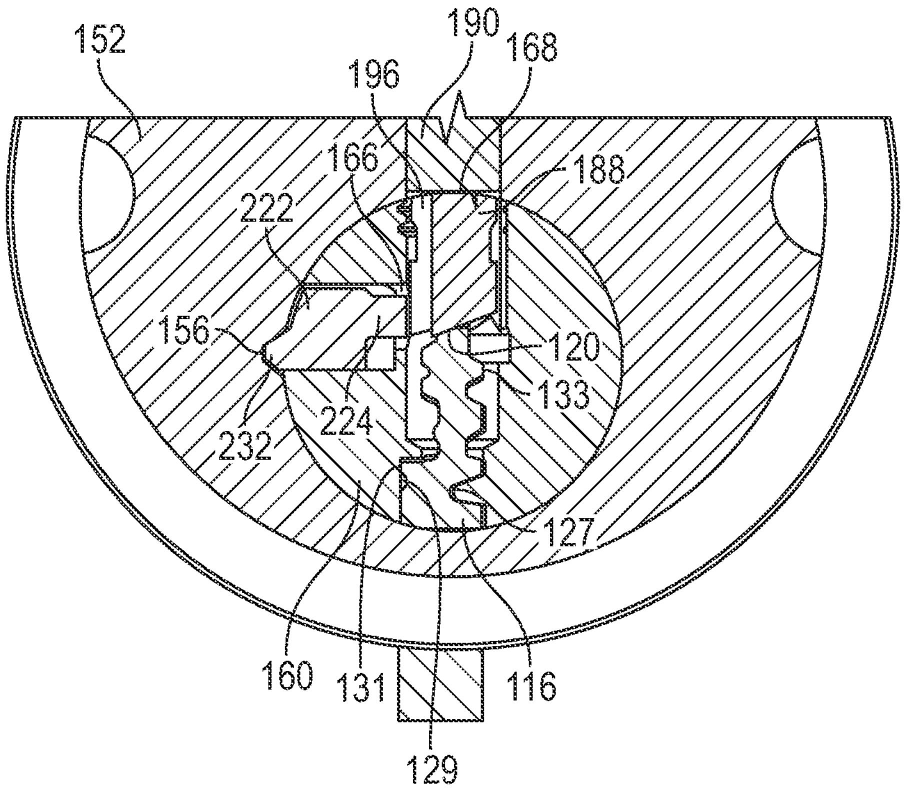
FIG. 25 is a transverse cross-section of the cylinder lock assembly along the line A-A in FIG. 24.

FIGS. 11A and 11B illustrate alternate embodiments of the primary pin, specifically embodiments designated by reference numbers 188*a*, 188*b*, 188*c*, 188*d*. Each embodiment includes a different variation of a side bar recess 196*a*, 196*b*, 196*c*, 196*d*, respectively. The sidebar recesses 196*a* can extend the full length of the pin 188*a*, as with primary pin 188. Alternatively, the sidebar recess 196*b*, 196*c*, 196*d* can extend a limited or partial length of the pin 188*b*, 188*c*, 188*d*. In some embodiments, e.g., embodiment 188*d*, the recess 196*d* can be shaped as a hole. To accommodate recess 196*d*, the sidebar primary blocking lugs 224 can be shaped as a round post (not shown). When the lock assembly is in the locked state, the primary blocking lugs 224 contact the primary pins 188 to block the sidebar 222 from moving radially. When the lock assembly is in the unlocked state, as shown in FIGS. 24 and 25, the primary pins 188 are rotationally oriented by the primary bittings and the sidebar recesses 196 are aligned with the primary blocking lugs 224, so the primary pins 188 will not block axial movement of the sidebar 222.

Referring to FIG. 9, plug 160 has side pin holes, or secondary pin holes 184, in which side pins 204 and associated springs 208 are positioned. Secondary pin holes 184 are laterally offset with respect to the keyway 162, extend into the sidebar cavity 166, and may be oriented so as to be generally parallel with the primary pin holes 180.

Plug 160 further includes a lift pin hole 262 in which the lift pin 238 is disposed. Lift pin hole 262 is laterally offset with respect to the keyway 162, extends into the sidebar cavity 166, and may be oriented so as to be generally parallel with the primary pin holes 180 and aligned with the secondary pin holes 184.

Figure 12A:
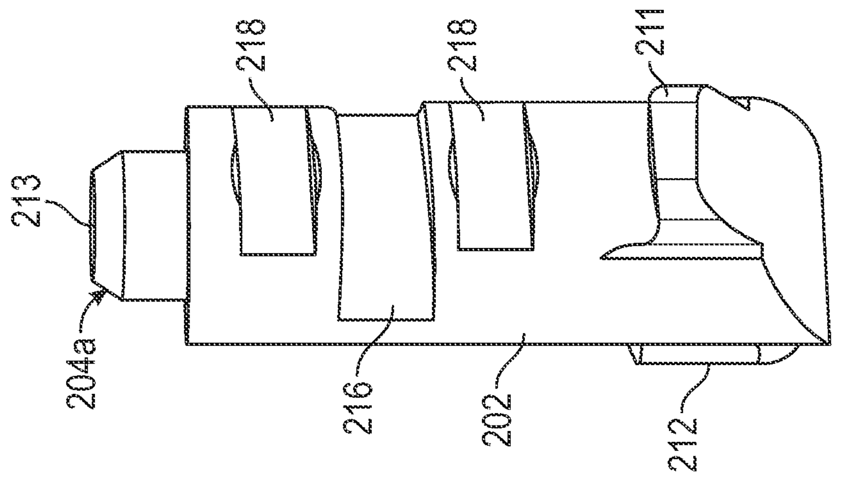
FIGS. 12A-C are perspective views of three embodiments of a side, or secondary, pin.
Figure 12B:
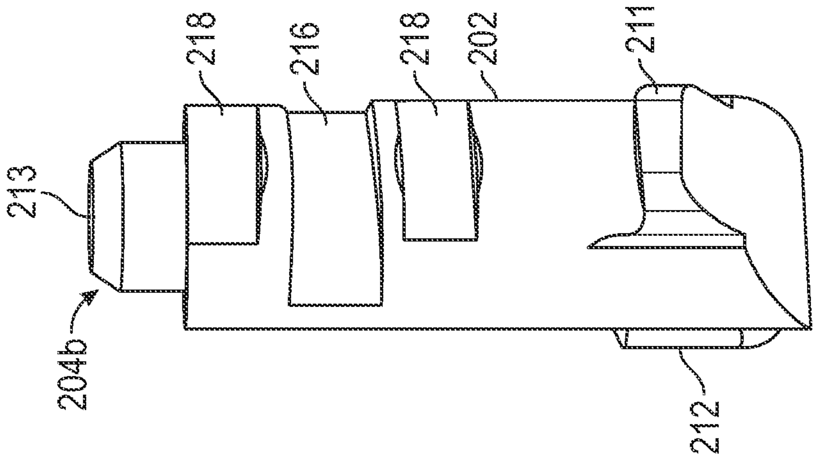
Figure 12C:
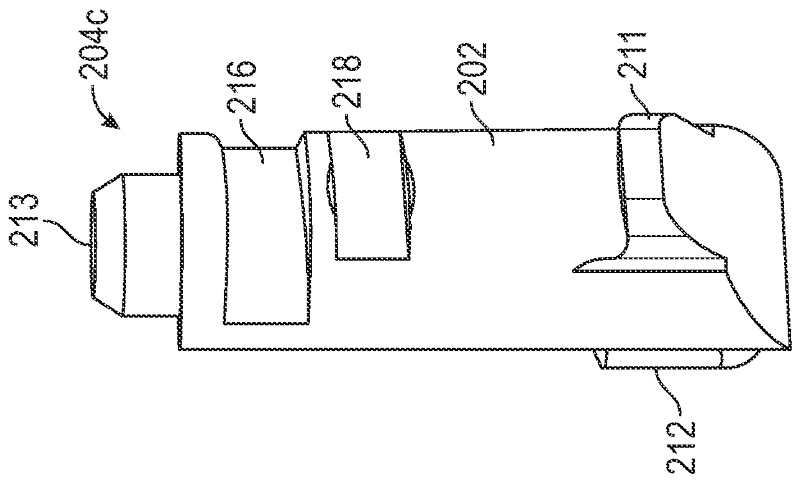

Referring to FIGS. 12A, 12B, and 12C, each secondary pin may comprise a different configuration, as shown by pins 204*a*, 204*b*, and 204*c*. Each pin 204*a*, 204*b*, 204*c* has a pin body 202, which may be generally cylindrical in shape, a transversely extending projection 212 extending from a lower end of the body 202, and a top axial projection 213 that may be seated into the corresponding coil spring 208. The transversely extending projection 212 extends laterally into the keyway 162 from the body 202 by a width sufficient to contact top edge 134 of a rib 132 and engage secondary cuts 136 of the rib 132 on the key 110. On the opposite side of the transversely extending projection 212, the secondary pins 204*a*, 204*b*, and 204*c* have a second transversely extending projection 211 to limit rotation of the pins 204*a*, 204*b*, 204*c* within the secondary pin holes 184.

Each secondary pin 204 includes a transverse sidebar slot 216 formed transversely across the body 202 on an opposite side of the body 202 from the projection 212. The sidebar slots 216 receive the secondary blocking shelves 228 on the sidebar 222, to permit radial movement of the sidebar 222 when the secondary pins 204 are properly elevated by the secondary bittings 136 to align the sidebar slots 216 with the blocking shelves 228, as will be described below. The sidebar slot 216 of each secondary pin 204*a*, 204*b*, and 204*c* is located at a different axial position on the pin body 202, thereby allowing for different key code variations depending on the pins used and where they are positioned within the lock. Each secondary pin 204 may optionally further include one or more false sidebar slots 218 to foil lock picking, as further explained below.

With the secondary pin 204 and spring 208 disposed within a secondary pin hole 184, the projection 212 extends into the keyway 162, and, upon inserting a properly bitted key, each secondary pin 204 can be properly elevated by secondary cuts 136 on the rib 132 of the key 110 engaging the projection 212.

Figure 13:
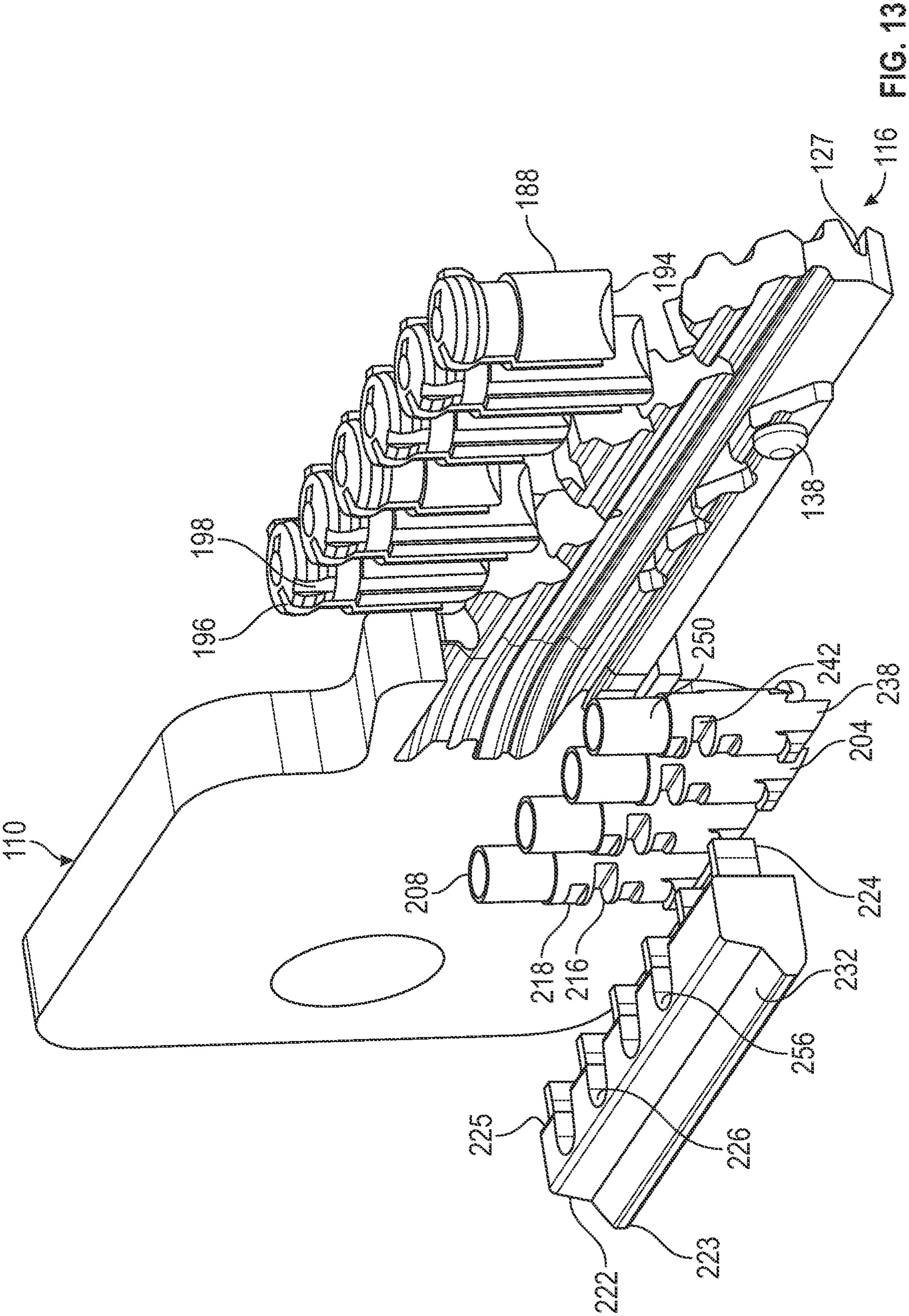
FIG. 13 is an expanded top perspective view of the key, primary pins, secondary pins, lift pin, and a sidebar of the lock assembly of FIG. 9.

FIG. 13 is an exploded perspective view of the key 110, the primary pins 188, the secondary pins 204, the lift pin 238, and the sidebar 222 and shows the relative positions of key 110 inserted into plug 160 (not shown for clarity), primary pins 188, secondary pins 204 and springs 208, lift pin 238 and spring 250, and sidebar 222, with the secondary pins 204 and sidebar 222 exploded laterally from the key 110.

As noted above, each primary pin 188 may optionally include one or more false sidebar recesses 198 extending longitudinally along the length of the primary pin 188. In the event the lock assembly is being manipulated in an attempt to pick the lock, a blocking lug 224 of the sidebar 222 may engage the false sidebar recess 198. The false sidebar recess 198 is not deep enough to allow sufficient radial movement of the sidebar 222 to disengage the nose 232 from the sidebar groove 156 of the bore 154, but engagement of the false sidebar recess 198 by the blocking lug 224 will prevent further manipulation of the lock assembly, thereby foiling the pick attempt.

Figure 14A:
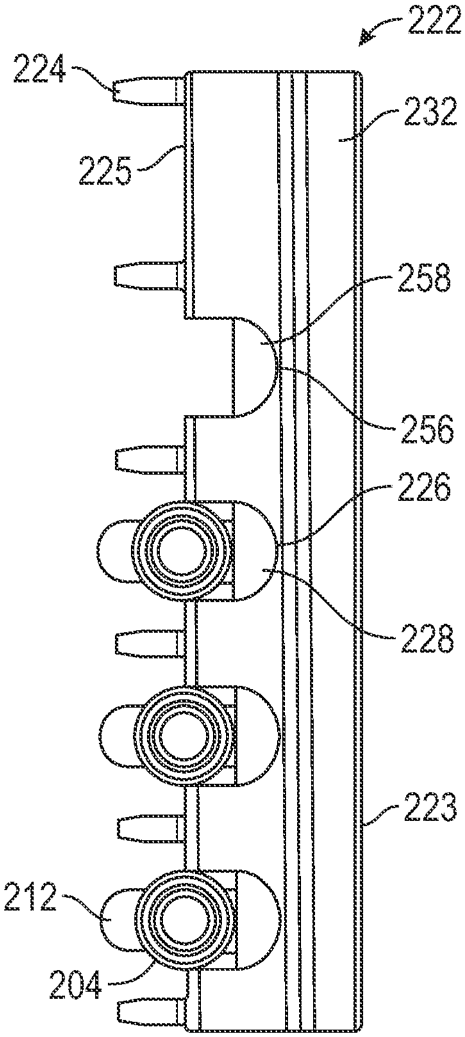
FIG. 14A is a top view of the sidebar and secondary pins, showing the sidebar in a locked position relative to the secondary pins.
Figure 14B:
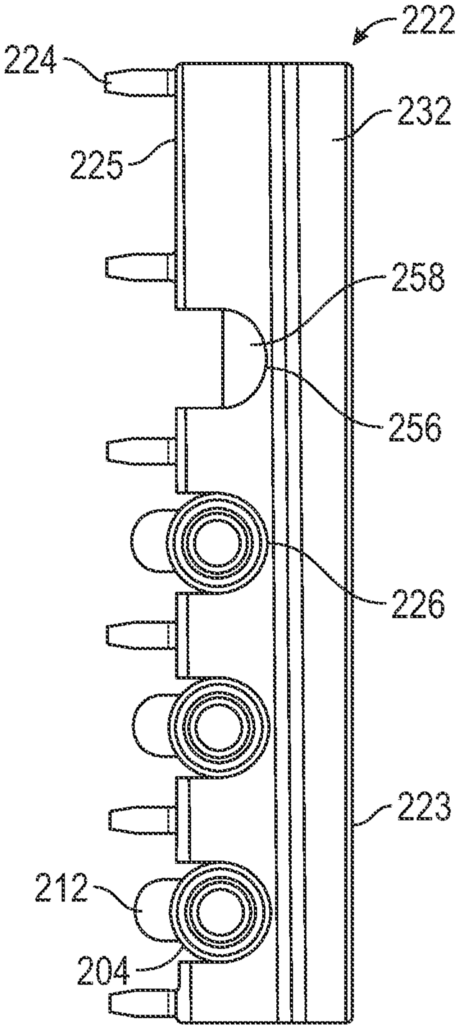
FIG. 14B is a top view of the sidebar and secondary pins, showing the sidebar in an unlocked position relative to the secondary pins.

As shown in FIGS. 14A and 14B, the secondary pin cutouts 226 of the sidebar 222 are located between the blocking lugs 224 and correspond to the number and shape of the secondary pins 204. A secondary blocking shelf 228 (e.g. rectangular or curved projection) extends across a portion of each secondary pin cutout 226. When the lock assembly 100 is in the locked state, as depicted in FIG. 14A, the blocking shelves 228 contact the secondary pins 204 to block the sidebar 222 from moving radially inwardly. When the lock assembly 100 is in the unlocked state, as depicted in FIG. 14B, the secondary pins 204 are elevated by the secondary bittings 136 on a properly bitted key 110 and their transverse sidebar slots 216 are aligned with the blocking shelves 228 so that the blocking shelves 228 can enter the sidebar slots 216, and the secondary pins 204 will not block axial movement of the sidebar 222. See also FIGS. 12A, 12B, 12C.

As noted above, each secondary pin 204 may also optionally include one or more false sidebar slots 218 extending transversely across the body 202 of the secondary pin 204 above and/or below the sidebar slot 216. In the event the lock assembly is being manipulated in an attempt to pick the lock by lifting a secondary pin 204, a secondary blocking shelf 228 of the sidebar 222 may engage the false sidebar slot 218. The false sidebar slot 218 is not deep enough to allow sufficient radial movement of the sidebar 222 to disengage the nose 232 from the sidebar groove 156 of the bore 154, but engagement of the false sidebar slot 218 by the secondary blocking shelf 228 will prevent further manipulation of the lock assembly, thereby foiling the pick attempt.

Figure 15C:
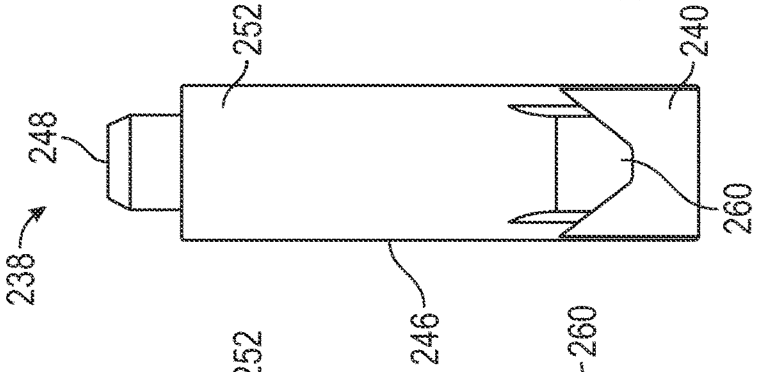
FIGS. 15A-C are a front view, a right side view, and a back view, respectively, of a lift pin.
Figure 15B:
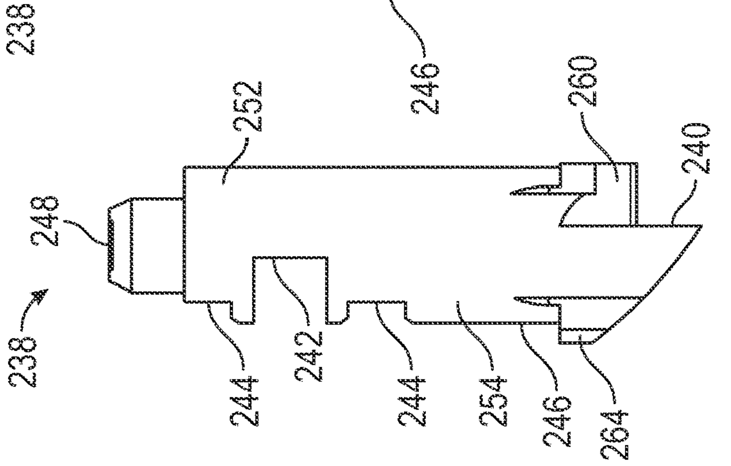
Figure 15A:
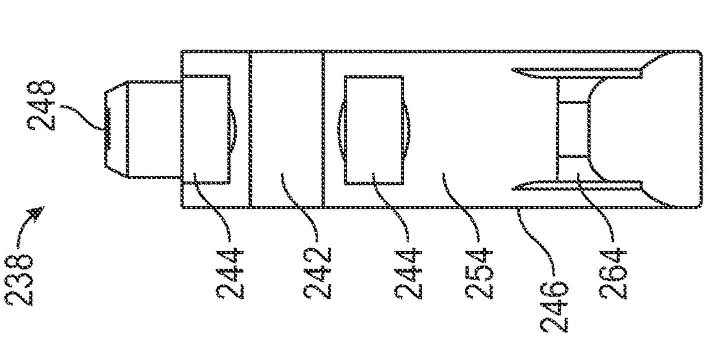

FIGS. 15A, 15B, and 15C depict various views of one embodiment of the lift pin 238. The lift pin 238 has a generally cylindrically-shaped body 246 with a top axial projection 248 that may be seated into a corresponding coil spring 250. On a first side 252, the lift pin 238 has shuttle pin cutout 240 at its lower end and a shuttle pin engaging portion or downwardly pointing beveled edge (or shuttle pin engaging portion) 260. The beveled edge 260 of the lift pin 238 is laterally offset from the transversely extending projection 212 of the side pin(s) 204 so that the lift pin 238 is not actuated by the secondary cuts 136 of the rib 132 on the key 110. On a second side 254, the lift pin 238 has a sidebar engagement feature, such as a transverse sidebar slot 242 extending transversely across the body 246 of the lift pin 238. The second side 254 further has a transversely extending projection 264 to limit rotation of the lift pin 238 within the lift pin hole 262 in the plug 160.

Optionally, the lift pin 238 may have one or more false sidebar slots 244 above and/or below the sidebar slot 242. As with the false sidebar slot 218 on the secondary pins 204, the false sidebar slot 244 on the lift pin 238 extends transversely across the body 246 of the lift pin 238. If the lock assembly is being manipulated in an attempt to pick the lock by lifting the lift pin 238, the supplemental blocking shelf 258 on the sidebar 222 may engage the false sidebar slot 244. The false sidebar slot 244 is not deep enough to allow sufficient radial movement of the sidebar 222 to disengage the nose 232 from the sidebar groove 156 of the bore 154, and engagement of the false sidebar slot 244 by the supplemental blocking shelf 258 will prevent further manipulation of the lock assembly, thereby foiling the pick attempt.

Figure 16:
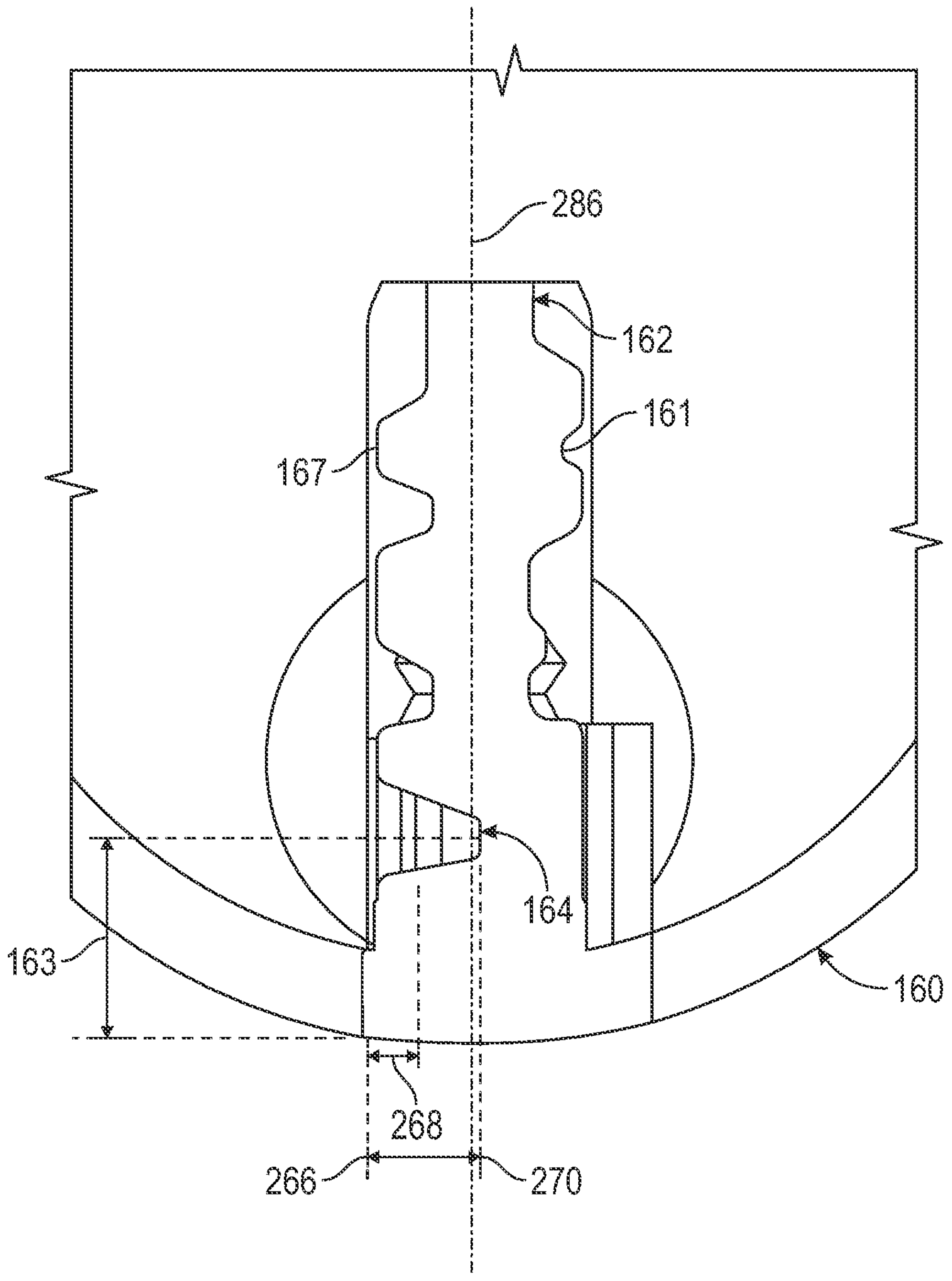
FIG. 16 is a partial front view of one embodiment of a keyway in a plug, wherein the keyway includes a multi-level ridge for actuating a transversely movable shuttle pin within the blade of a key inserted into the keyway.

FIG. 16 show one embodiment of the keyway 162 that includes a multi-level ridge, or rib, 164 (forming part of the profile of the cylinder keyway 162) having ridge 164 features of different heights and located at different locations along the length of the cylinder keyway 162 for actuating a movable element, such as shuttle pin 138, movably mounted within key blade 116. As further described below, these features interact with elements of key 110 to operate the cylinder lock 100.

As shown in FIG. 16, multi-level ridge 164 in the keyway 162 is located at a vertical height 163 within the keyway 162, has different heights (e.g., first height 266, second height 268, and third height 270) along the length of the ridge 164, and may take on different transverse shapes, or profiles, to correspond to the shape of a corresponding groove 127 in the key 110. The multi-level ridge 164 may not run the entire length of the keyway 162.

Figure 17A:
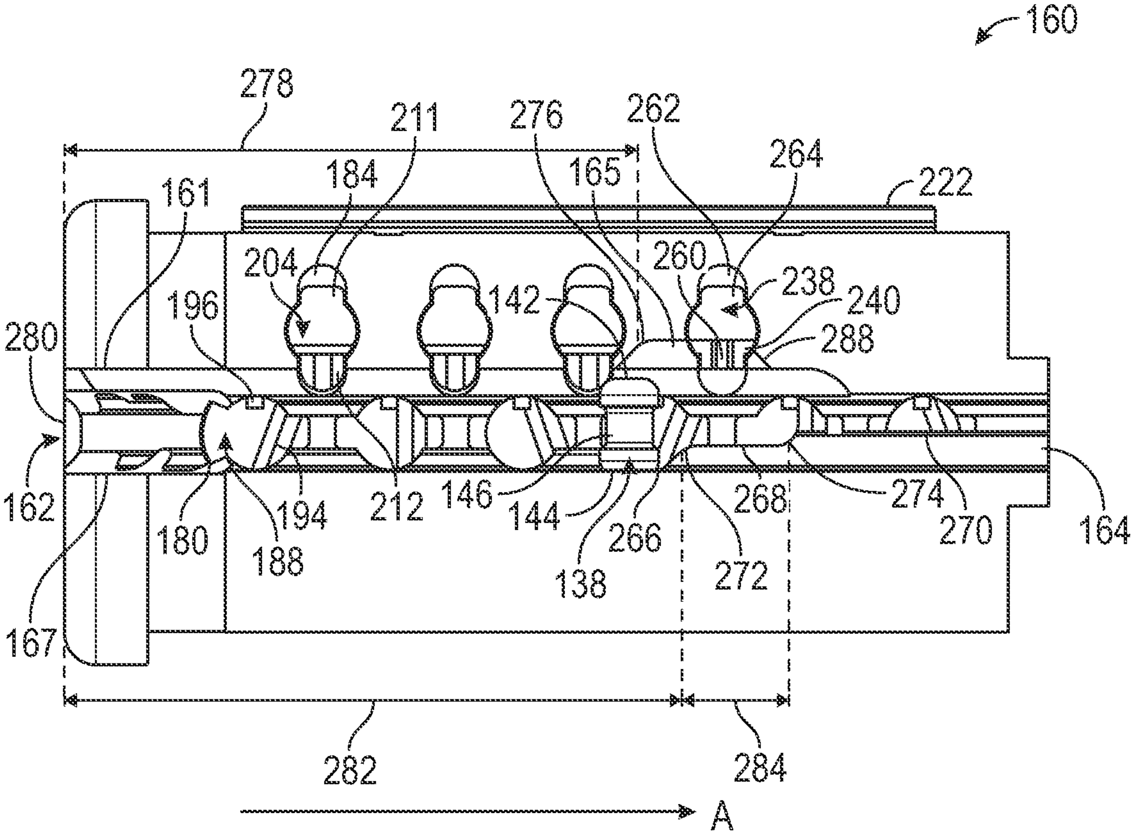
FIG. 17A is a bottom view of the plug, the shuttle pin, and the lift pin, with the key (omitted) partially inserted with the shuttle pin seated on a first level of the multi-level ridge and in a first position.
Figure 17B:
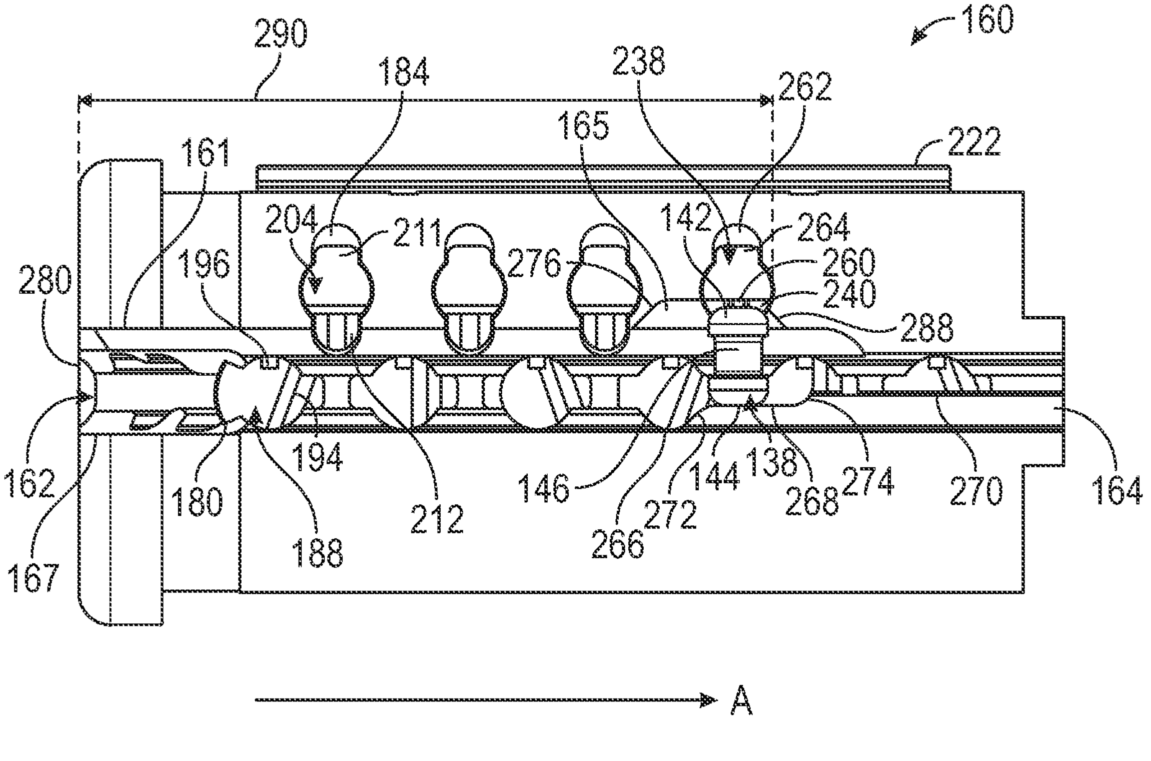
FIG. 17B is a bottom view of the plug, the shuttle pin, and the lift pin, with the key (omitted) fully inserted with the shuttle pin seated on a second level of the multi-level ridge and moved transversely with respect to the key to engage a supplemental sidebar control element on an opposite side of the keyway from the multi-level ridge.

FIGS. 17A, and 17B show one embodiment of keyway 162 within the plug 160 having multi-level ridge 164 extending into the keyway 162, relief 165, and a hole for a sidebar control element (e.g., lift pin hole 262 for lift pin 238). The shuttle pin 138 is shown within the keyway 162 as it would be positioned if disposed within the key 110 inserted into the keyway 162 but, to illustrate the manipulation of the shuttle pin 138, the key is omitted from FIGS. 17A, and 17B. Although the embodiment shown in FIGS. 17A and 17B depict multi-level ridge 164 configured to engage one shuttle pin 138, as further explained below, multi-level ridge 164 may be configured to engage more than one shuttle pin 138 within key blade.

As the key 110 (not shown) is inserted into the cylinder keyway 162, the shuttle pin 138 (located in the groove 127 of the key 110) engages the multi-level ridge 164 and moves across the width of the key 110 to engage the lift pin 238 on an opposite side (first side) 161 of the keyway 162. For the key 110 to successfully unlock the lock 100, a correct alignment between the shuttle pin 138 and the lift pin 238 must occur. The multi-level ridge 164 must be in a location along the length of the cylinder keyway 162 that corresponds to the location of the lift pin 238 in the cylinder 160 and the shuttle pin 138 in the key 110. This alignment occurs when the key 110 is fully inserted into the cylinder 160 keyway 162. In addition, the shuttle pin 138 must be moved the correct distance across the width of the key 110 to properly engage the lift pin 238.

In traditional keyway designs, ridges begin at a front end of the cylinder and are continuous through the length of the cylinder. As disclosed herein, the multi-level ridge 164 is located a distance back from a front end 280 of the keyway 162 to provide clearance for the shuttle pin 138 during initial insertion of the key 110. The location of the multi-level ridge 164 features (referred to herein as levels, planes, or surfaces of different heights and transitions between the levels) is different depending on the location of the lift pin 238 of the cylinder lock 100.

Referring to FIGS. 17A and 17B, the multi-level ridge 164 may have three distinct levels, or planes or surfaces, (first level 266, second level 268, and third level 270) at different heights from a multi-level ridge side (second side) 167 of the keyway 162. The multi-level ridge 164 may further include two transition zones or ramps (first transition ramp 272 between first level 266 and second level 268 and second transition ramp 274 between second level 268 and third level 270) utilized to engage and interact with the shuttle pin 138 in the key 110. The first transition ramp 272 moves the shuttle pin 138 from the first level 266 to the second level 268 as the key 110 is inserted into the cylinder 160 keyway 162. The second transition 274 blocks the shuttle pin 138 from progressing past the second level 268, thus preventing the key 110 from further insertion as will be described below.

The extent of the multi-level ridge 164 having the first level 266 may be referred to as a first segment of the multi-level ridge 164, the extent of the multi-level ridge 164 having the second level 268 may be referred to as a second segment of the multi-level ridge 164, and the extent of the multi-level ridge 164 having the third level 270 may be referred to as a third segment of the multi-level ridge 164.

Keyway 162 may further include a distal transition feature 288 and a third transition feature (e.g., ramp) 276 on side 161 of the keyway 162 opposite the multi-level ridge 164. The distal transition feature 288, in combination with the second transition 274 and third level 270, blocks the shuttle pin from traveling further into the keyway and prevents further insertion of an improper key as further described below. Referring to FIG. 17B, a dimension 290 from the front end 280 of cylinder keyway 162 to distal transition feature 288 is determined by the location of the lift pin 238 in cylinder 160.

The third transition feature 276 moves the shuttle pin 138 back to the first position primarily contained within the groove 127 of the key 110 as the key 110 is being removed from the cylinder keyway 162. This is required to allow clearance for the shuttle pin 138 in the keyway 162 as the key 110 is removed. Referring to FIG. 17A, a dimension 278 from the front end 280 of cylinder keyway 162 to third transition feature 276 is determined by the location of the lift pin 238 in cylinder 160. Note that as the key blade is retracted from the keyway 162, the left side of head 142 (i.e., the side of head 142 closest to the front end 280) moves down transition 276 while the right side of head 144 (i.e. the side of head 144 furthest from front end 280) moves down transition 272. The left side of head 142 reaches the end of transition 276 at the same time the right side of head 144 reaches the end of transition 272.

Figure 19C:
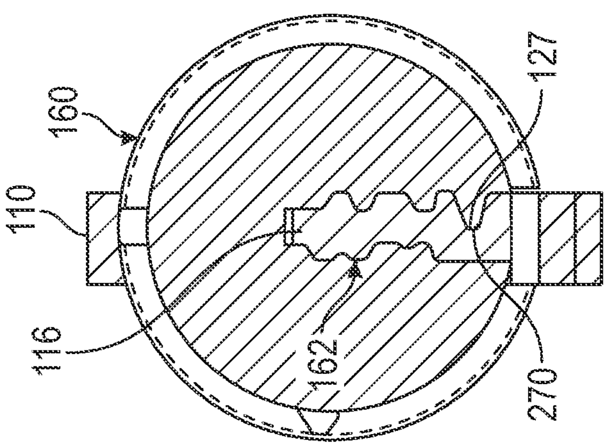
FIG. 19C is a rear view of the keyway with the key fully inserted and a third level of the multi-level ridge fully engaging the groove of key.
Figure 19A:
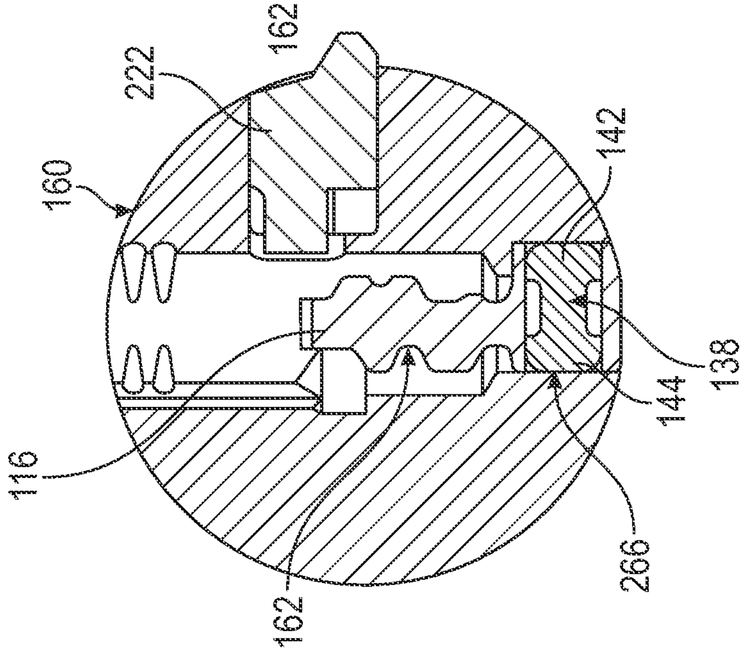
FIG. 19A is a front cross-sectional view through the cylinder lock and shuttle pin of FIG. 17A with the shuttle pin in the first position and contained within a groove of the key.
Figure 20A:
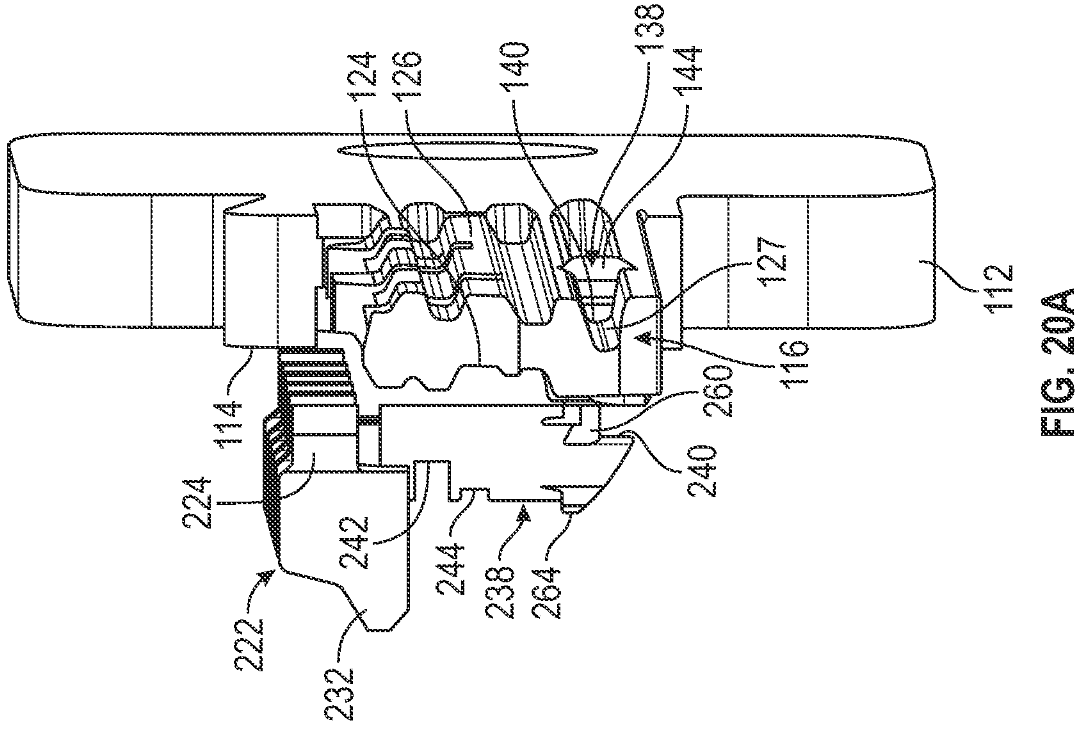
FIG. 20A is a front perspective view of the key blade, shuttle pin, lift pin, and sidebar, with the shuttle pin in a retracted position.

As the key (not shown) is inserted into the keyway 162, the shuttle pin 138 travels through the keyway 162 to a first position as shown in FIG. 17A. In the first level 266, the multi-level ridge 164 is sufficiently removed from the keyway 162 (i.e., the height of first level 266 from the side 167 of the keyway 162 is small (possibly zero)) to provide clearance for the shuttle pin 138 when the key 110 is being inserted into the keyway 162 and the shuttle pin 138 is primarily contained in the groove 127 of the key 110 so that the shuttle pin blocks the groove 127. Without the shuttle pin clearance provided by the first level 266, the key 110 could not be inserted into the cylinder 160 keyway 162. FIG. 19A is a front view section showing the shuttle pin 138 positioned in the first position at first level 266 (first plane) of multi-level ridge 164. Shuttle pin 138 is not engaged with the multi-level ridge 164 at this point and has clearance to pass through keyway 162. In this position, as also shown in FIG. 20A, the second end 144 of the shuttle pin 138 extends into a groove 127 on the second side 126 of the key blade 116 and the lift pin 238 is in a position (or locked state) where the sidebar slot 242 is not aligned with the supplemental blocking shelf 258 (see FIG. 10), preventing the sidebar 222 from moving radially.

Figure 21:
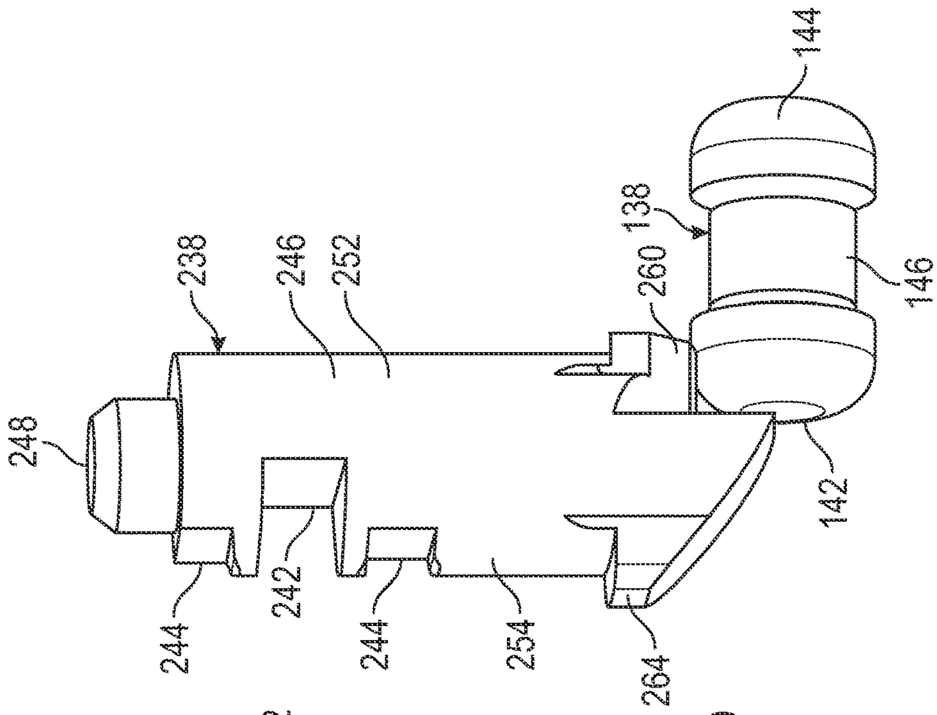
FIG. 21 is a perspective view of the shuttle pin and the lift pin engaged by the shuttle pin.
Figure 20B:
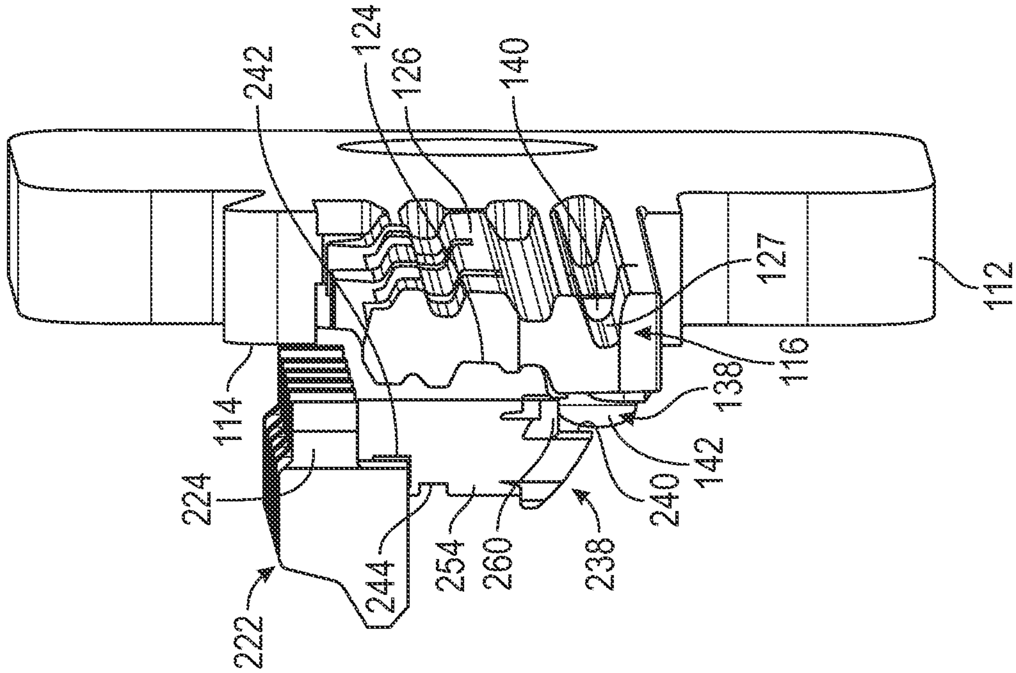
FIG. 20B is a front perspective view of the key blade, shuttle pin, lift pin, and sidebar, with the shuttle pin in an extended position engaging the lift pin.

Referring to FIG. 17B, as the key 110 continues through the keyway 162 in the insertion direction A, the shuttle pin 138 engages the first transition ramp 272 (i.e., the shuttle pin 138 contacts the first transition ramp 272) in the key 110 groove 127, and the first transition ramp 272 pushes the shuttle pin 138 from the first level 266 to the second level 268 of the multi-level ridge 164. Positioning the shuttle pin 138 to the second level 268 of the multi-level ridge 164 moves the shuttle pin 138 across the width of the key 110, into the relief 165 formed in the keyway 162. When the key 110 is fully inserted into the keyway 162, the shuttle pin 138 aligns with the lift pin hole 262. As further shown in FIGS. 20B and 21, the enlarged head portion 142 of the shuttle pin 138 contacts the beveled edge 260 of the lift pin 238, which causes the beveled edge 260 to ride up onto the enlarged head portion 142 and elevate the lift pin 238. The shuttle pin 138 remains in the extended position, resting in the cutout 240 of the lift pin 238, and holding the lift pin 238 in the elevated position (or unlocked state). In the elevated position, the sidebar slot 242 is aligned with the supplemental blocking shelf 258 (see FIG. 10) so the supplemental blocking shelf 258 can enter the sidebar slot 242, and the sidebar 222 is no longer blocked by the lift pin 238.

Figure 18A:
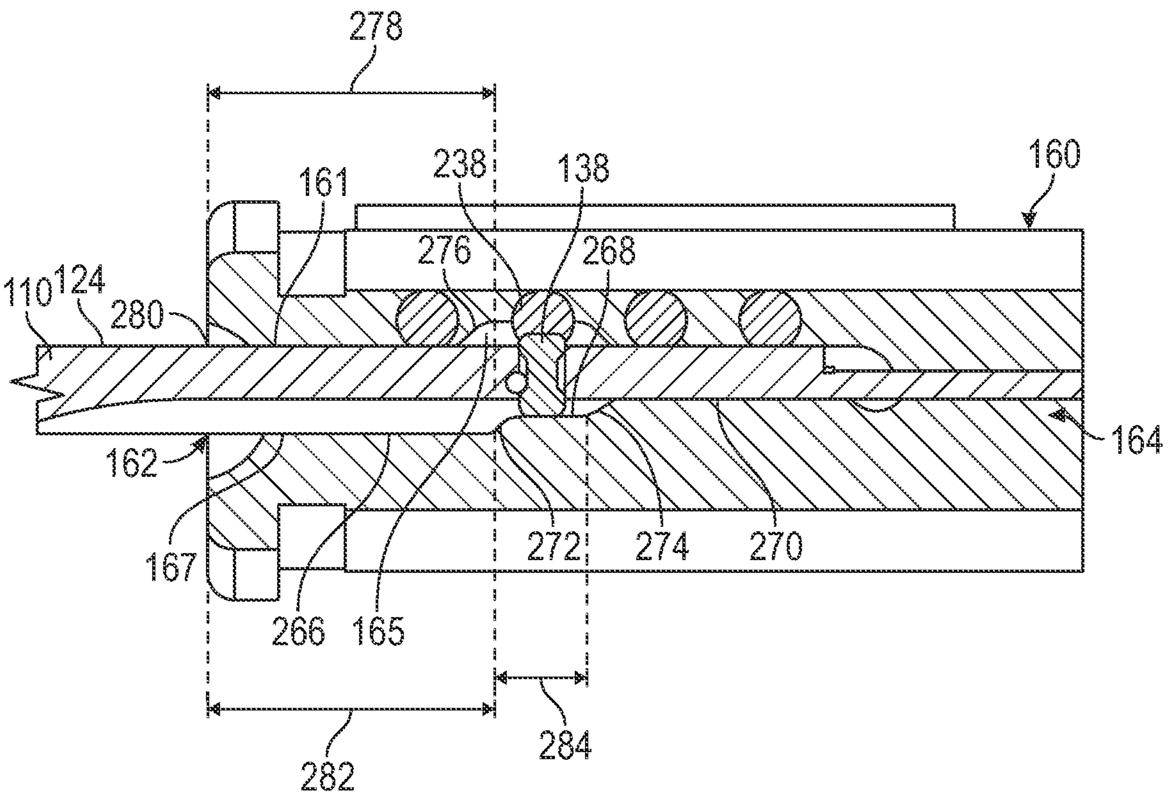
FIG. 18A is a transverse cross-sectional view of the plug depicting the multi-level ridge configured to actuate the shuttle pin at a second location of four supplemental locking element locations and having a key fully inserted with a shuttle pin seated on the second level of the multi-level ridge and moved transversely with respect to the key to engage a supplemental sidebar control element on an opposite side of the keyway from the multi-level ridge.
Figure 18B:
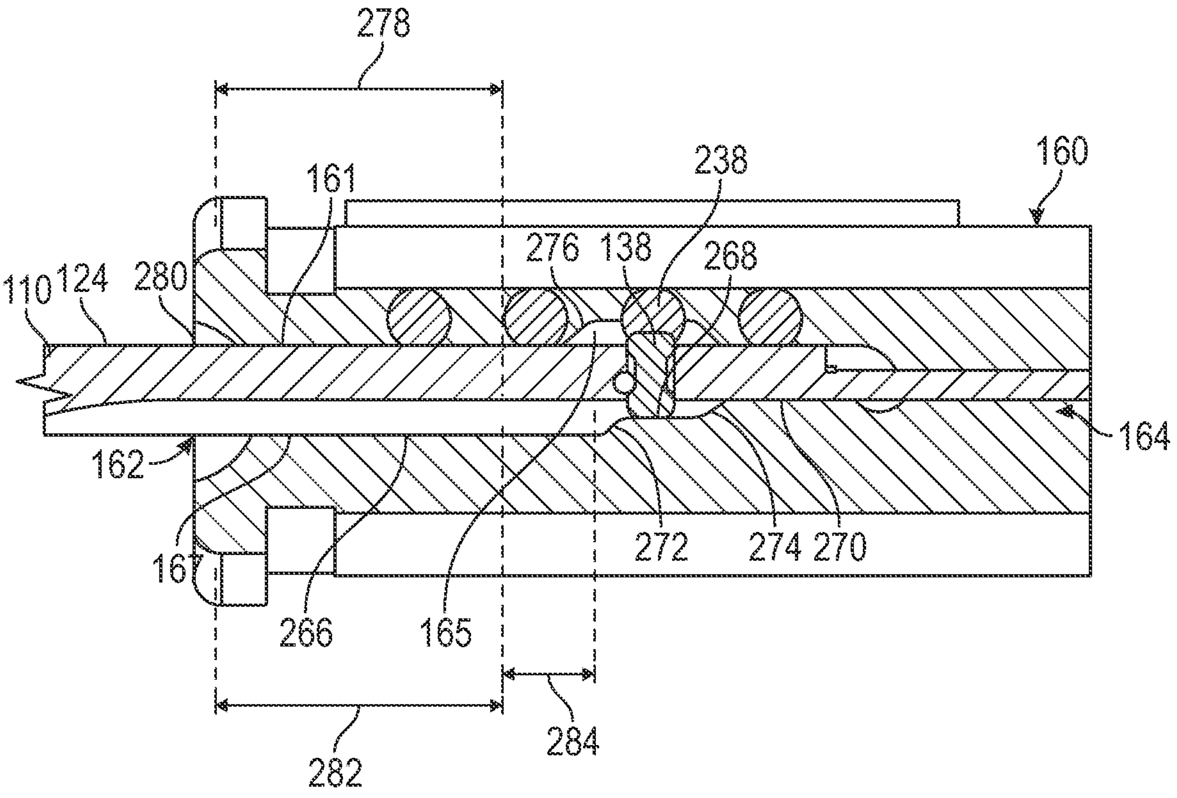
FIG. 18B is a transverse cross-sectional view of the plug depicting the multi-level ridge configured to actuate the shuttle pin at a third location of four supplemental locking element locations and having a key fully inserted and a shuttle pin seated on the second level of the multi-level ridge and moved transversely with respect to the key to engage a supplemental sidebar control element on an opposite side of the keyway from the multi-level ridge.
Figure 19B:
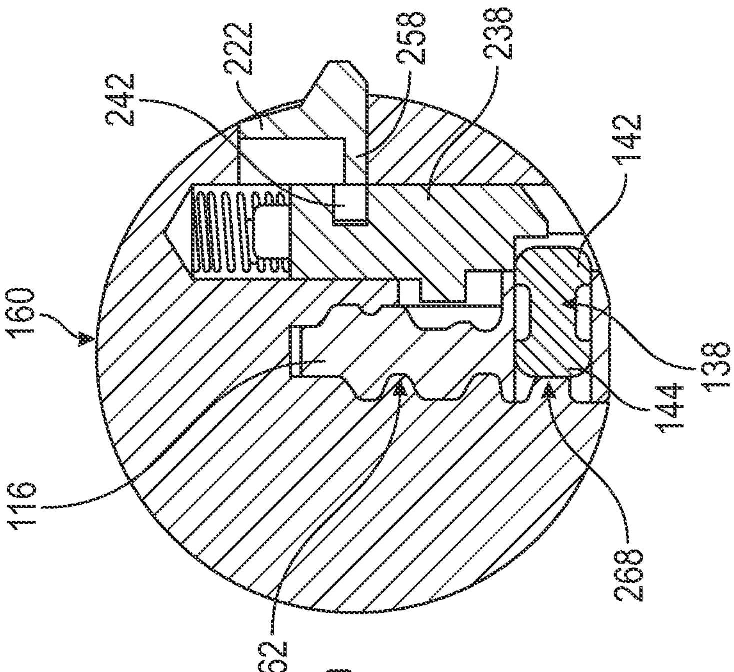
FIG. 19B is a front cross-sectional view through the cylinder lock and the shuttle pin of FIG. 17B with the shuttle pin extending beyond a first side of the key to engage the supplemental sidebar control element on the opposite side of the keyway from the multi-level ridge.

FIG. 19B is a front view section showing shuttle pin 138 positioned at second level 268 (second plane) of multi-level ridge 164. Shuttle pin 138 is properly engaging the lift pin 238 on the opposite side 161 of the keyway 162. FIG. 18A is a section view of shuttle pin 138 in position two (i.e., the second of four possible supplemental locking element locations) with the key 110 fully inserted and the shuttle pin 138 seated on second level 268 (second plane) of the multi-level ridge 164 and moved across key 110 to engage the lift pin 238 on the opposite side 161 of keyway. FIG. 18B is a section view of shuttle pin 138 in position three (i.e., the third of four possible supplemental locking element locations) with the key 110 fully inserted and the shuttle pin 138 seated on second level 268 (second plane) of the multi-level ridge 164 and moved across key 110 to engage the lift pin 238 on the opposite side 161 of keyway.

Referring to FIGS. 18A and 18B, the first transition ramp 272 is precisely located to be aligned with the position of the lift pin 238 in the cylinder 160. Since the shuttle pin 138 in the key 110 and the lift pin 238 in the cylinder 160 can be in different locations along the keyway 162 length, the first transition ramp 272 must be in the proper location to allow the shuttle pin 138 in a correct key 110 to align with and cause the shuttle pin 138 to engage the lift pin 238. In other words, a dimension 282 from the front end 280 of cylinder keyway 162 to first transition ramp 272 is determined by the location lift pin 238 in cylinder 160.

The location of the second level 268 is determined by the location of the first transition ramp 272 and is specific to the location of the lift pin 238 in the cylinder 160. The width of the second level 268 relative to how far it extends into the keyway 162 determines the amount of travel the shuttle pin 138 is moved within the groove 127 of key 110 to engage the lift pin 238 on the opposite side 161 of the keyway 162 (see FIG. 19B). If the second level 268 is too shallow, the shuttle pin 138 will not fully engage the lift pin 238 and will not unlock the lock 100. If the second level 268 is too wide, the shuttle pin 138 located in the key 110 groove 127 will jam and the key 110 will not operate the lock 100.

The second transition ramp 274 is located beyond the lift pin 238 in the cylinder 160 where the second level 268 will transition to the third level 270. Second transition ramp 274 is located at a distance 284 from the first transition ramp 272 determined by the position of the lift pin 238 in the cylinder 160.

The third level 270 is where the multi-level ridge 164 extends to its maximum height into the keyway 162 and completely engages in the corresponding groove 127 of the key 110. The third level 270 prevents the shuttle pin 138 disposed within the groove 127 from passing and also provides alignment and tracking of the key 110 in the cylinder keyway 162. FIG. 19C is a rear view of keyway 162 with a fully inserted key 110. The multi-level ridge 164 at third level 270 (third plane) is fully engaged with groove 127 of the key blade 116. As shown in FIGS. 18A and 18B, shuttle pin 138 in key 110 does not have clearance to engage third level 270 (i.e. traverse the second transition 274). In some embodiments, the third level 270 of the multi-level ridge 164 extends across a centerline 286 bisecting the width of the keyway 162 in the cylinder 160 (paracentric) (see also FIG. 16). The groove 127 in the key 110 may also be paracentric to the centerline of the key 110.

The shuttle pin 138 located in the key 110 prevents the key 110 from being inserted beyond the point where the shuttle pin 138 contacts the distal transition feature 288 and second transition ramp 274. This causes the shuttle pin 138 of a non-matching key to jam into the multi-level ridge 164. This becomes important when keys 110 with different shuttle pin 138 positions are inserted into cylinders 100 without matching multi-level ridge 164 locations.

FIGS. 22A-22D show a cylinder 160 with the second level 268 of the multi-level ridge 164 in the second position (i.e., the second from the front end 280 of four possible supplemental locking element locations) and keys 110*a*, 110*b*, 110*c*, and 110*d* having different locations of shuttle pin 138.

Figure 22A:
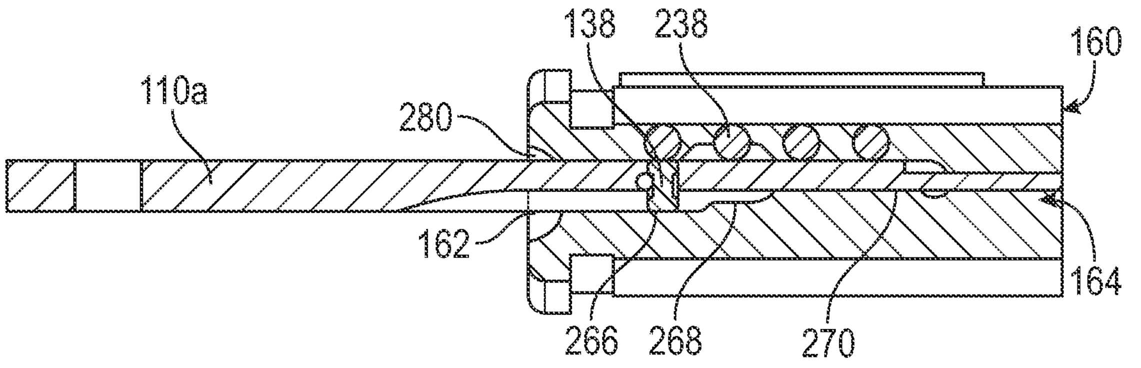
FIG. 22A is a transverse cross-sectional view of the cylinder lock of FIG. 18A and a fully-inserted, non-corresponding key having the shuttle pin located in a first location of four locations corresponding to supplemental locking element locations.

FIG. 22A shows key 110*a* with shuttle pin 138 located in the first location fully inserted into a cylinder 160 with second level 268 of multi-level ridge 164 in the second position. Shuttle pin 138 does not extend far enough into the keyway 162 to reach the second level 268, and thus shuttle pin 138 will not be extended to engage the lift pin 238, in which case the cylinder 160 will not rotate.

Figure 22B:
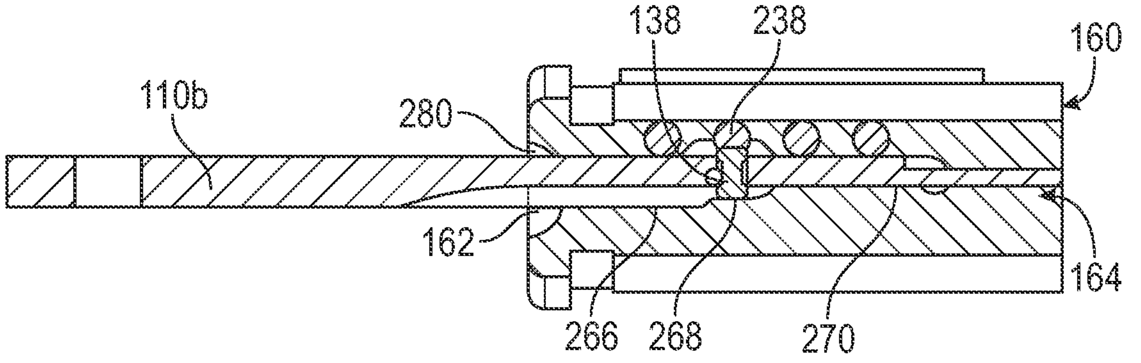
FIG. 22B is a transverse cross-sectional view of the cylinder lock of FIG. 18A and a fully-inserted, corresponding key having the shuttle pin located in the second location.

FIG. 22B shows key 110*b* with shuttle pin 138 located in the second location fully inserted into a cylinder 160 with second level 268 of multi-level ridge 164 in the second position. Shuttle pin 138 extends far enough into the keyway 162 to reach the second level 268, and thus shuttle pin 138 is extended to engage lift pin 238, in which case the cylinder 160 will rotate.

Figure 22C:
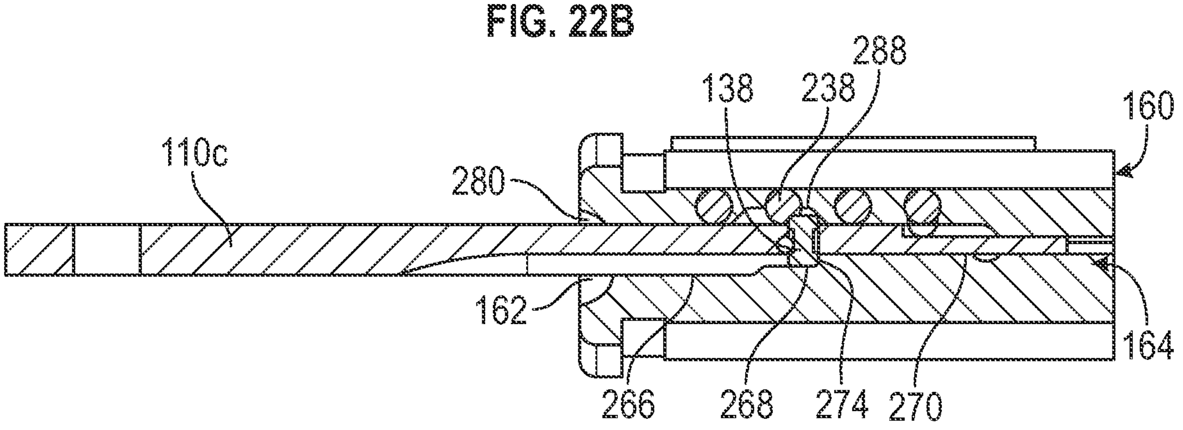
FIG. 22C is a transverse cross-sectional view of the cylinder lock of FIG. 18A and partially-inserted, non-corresponding key having a shuttle pin located in the third location, engaging the third level of the multi-level ridge of the cylinder lock, and preventing the non-corresponding key from being inserted fully into the keyway of the cylinder.

FIG. 22C shows key 110*c* with shuttle pin 138 located in the third location fully inserted into a cylinder 160 with second level 268 of multi-level ridge 164 in the second position. The right side of head 142 (i.e., the side of head 142 furthest from the front end 280) contacts and begins traveling down distal transition feature 288 while the right side of head 144 (i.e. the side of head 144 furthest from front end 280) contacts and begins traveling up transition 274 until the clearance between distal transition feature 288 and transition 274 (and between side 161 and third level 270) is too small for the shuttle pin 138 to continue through the keyway. The engagement of shuttle pin 138 by the distal transition feature 288 and the second transition ramp 274, thereby prevents the key 110*c* from being inserted completely, in which case the cylinder 160 will not rotate.

Figure 22D:
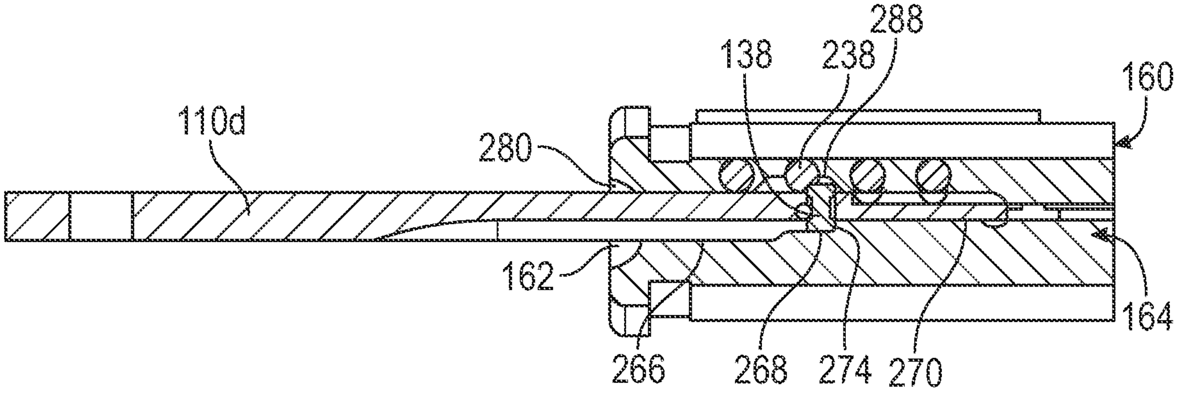
FIG. 22D is a transverse cross-sectional view of the cylinder lock of FIG. 18A and a partially-inserted, non-corresponding key having a shuttle pin located in the fourth location, engaging the third level of the multi-level ridge of the cylinder lock, and preventing the non-corresponding key from being inserted fully into the keyway of the cylinder.

FIG. 22D shows key 110*d* with shuttle pin 138 located in the fourth location fully inserted into a cylinder 160 with second level 268 of multi-level ridge 164 in the second position. Shuttle pin 138 contacts the distal transition feature 288 and the second transition ramp 274, thereby preventing the key 110*d* from being inserted completely, in which case the cylinder 160 will not rotate.

FIGS. 23A-23D show a cylinder 160 with the second level 268 of the multi-level ridge 164 in the third position (i.e., the third from the front end 280 of four possible supplemental locking element locations) and keys 110*a*, 110*b*, 110*c*, and 110*d* having different locations of shuttle pin 138.

Figure 23A:
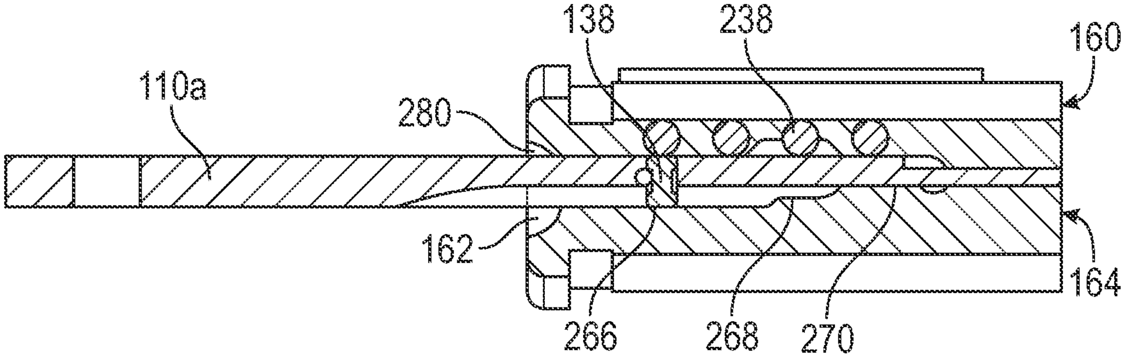
FIG. 23A is a transverse cross-sectional view of the cylinder lock of FIG. 18B and a fully-inserted, non-corresponding key having a shuttle pin located in the first location of four locations corresponding to supplemental locking element locations.

FIG. 23A shows key 110*a* with shuttle pin 138 located in the first location fully inserted into a cylinder 160 with second level 268 of multi-level ridge 164 in the third position. Shuttle pin 138 does not extend far enough into the keyway 162 to reach the second level 268, and thus shuttle pin 138 will not be extended to engage lift pin 238, in which case the cylinder 160 will not rotate.

Figure 23B:
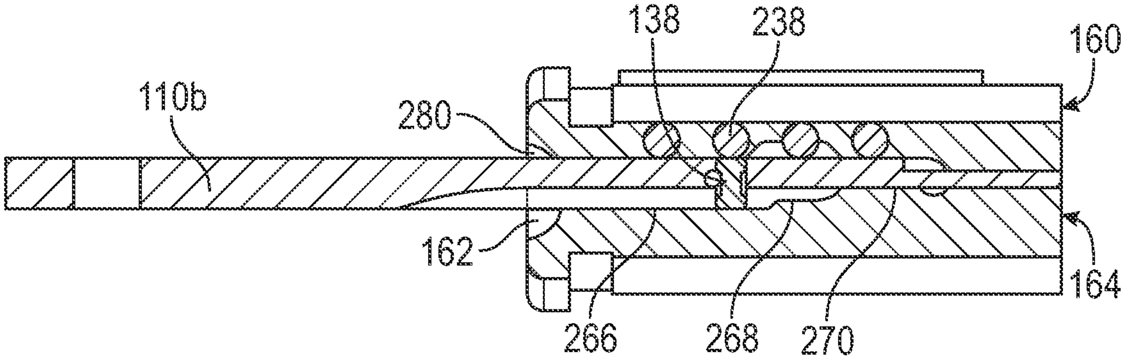
FIG. 23B is a transverse cross-sectional view of the cylinder lock of FIG. 18B and a fully-inserted, non-corresponding key having a shuttle pin located in the second location.

FIG. 23B shows key 110*b* with shuttle pin 138 located in the second location fully inserted into a cylinder 160 with second level 268 of multi-level ridge 164 in the third position. Shuttle pin 138 does not extend far enough into the keyway 162 to reach the second level 268, and thus shuttle pin 138 will not be extended to engage lift pin 238, in which case the cylinder 160 will not rotate.

Figure 23C:
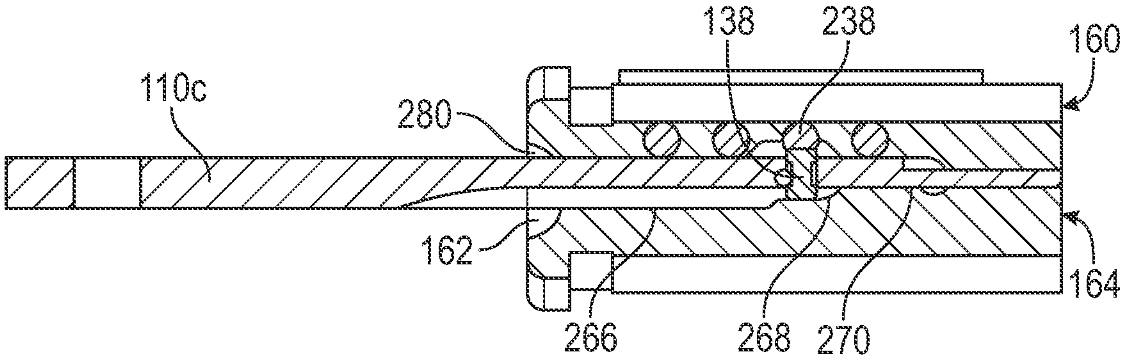
FIG. 23C is a transverse cross-sectional view of the cylinder lock of FIG. 18B and a fully-inserted, corresponding key having a shuttle pin located in the third location.

FIG. 23C shows key 110*c* with shuttle pin 138 located in the third location fully inserted into a cylinder 160 with second level 268 of multi-level ridge 164 in the third position. Shuttle pin 138 extends far enough into the keyway 162 to reach the second level 268, and thus shuttle pin 138 is extended to engage lift pin 238, in which case the cylinder 160 will rotate.

Figure 23D:
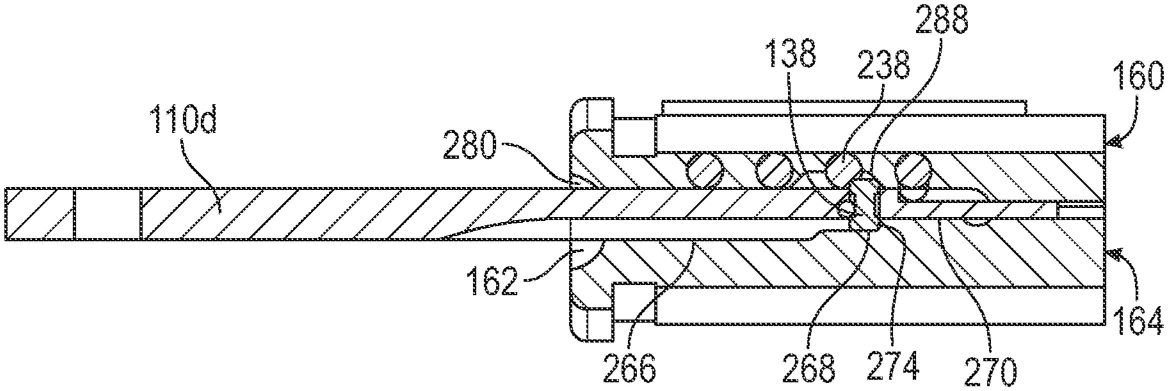
FIG. 23D is a transverse cross-sectional view of the cylinder lock of FIG. 18B and a partially-inserted, non-corresponding key having a shuttle pin located in the fourth location, engaging the third level of the multi-level ridge of the cylinder lock, and preventing the non-corresponding key from being inserted fully into the keyway of the cylinder.

FIG. 23D shows key 110*d* with shuttle pin 138 located in the fourth location fully inserted into a cylinder 160 with second level 268 of multi-level ridge 164 in the third position. Shuttle pin 138 contacts the distal transition feature 288 and the second transition ramp 274, thereby preventing the key 110*d* from being inserted completely, in which case the cylinder 160 will not rotate.

Figure 26:
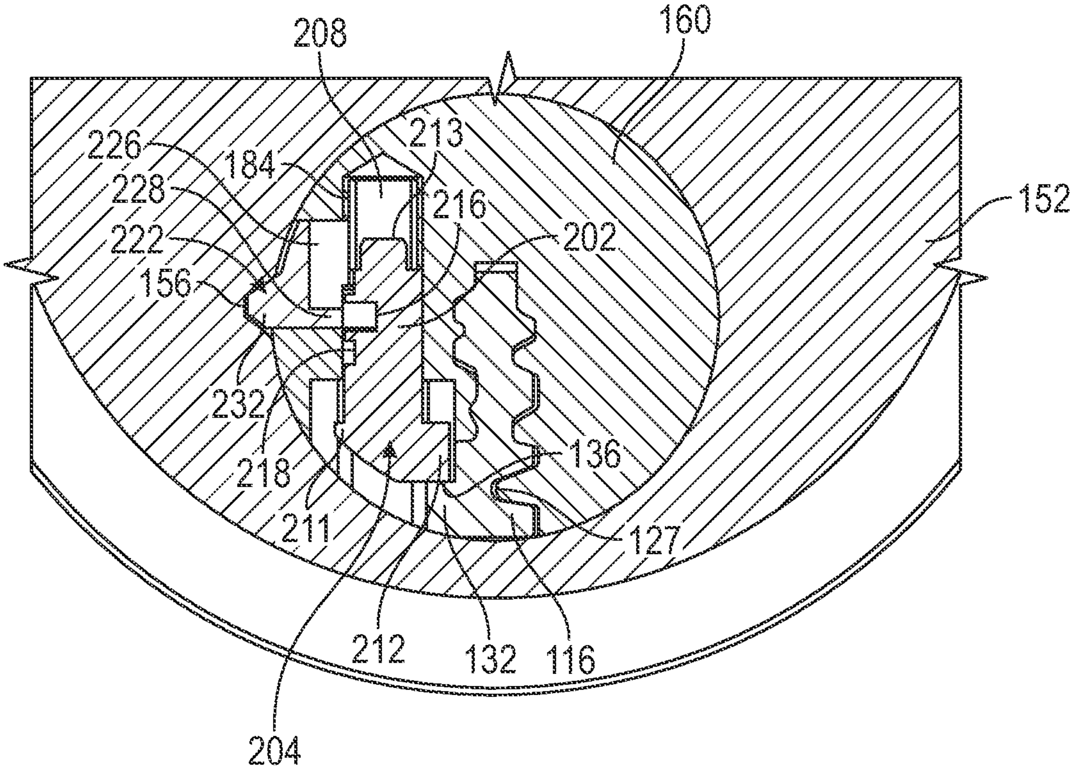
FIG. 26 is a transverse cross-section of the cylinder lock assembly along the line B-B in FIG. 24.
Figure 27:
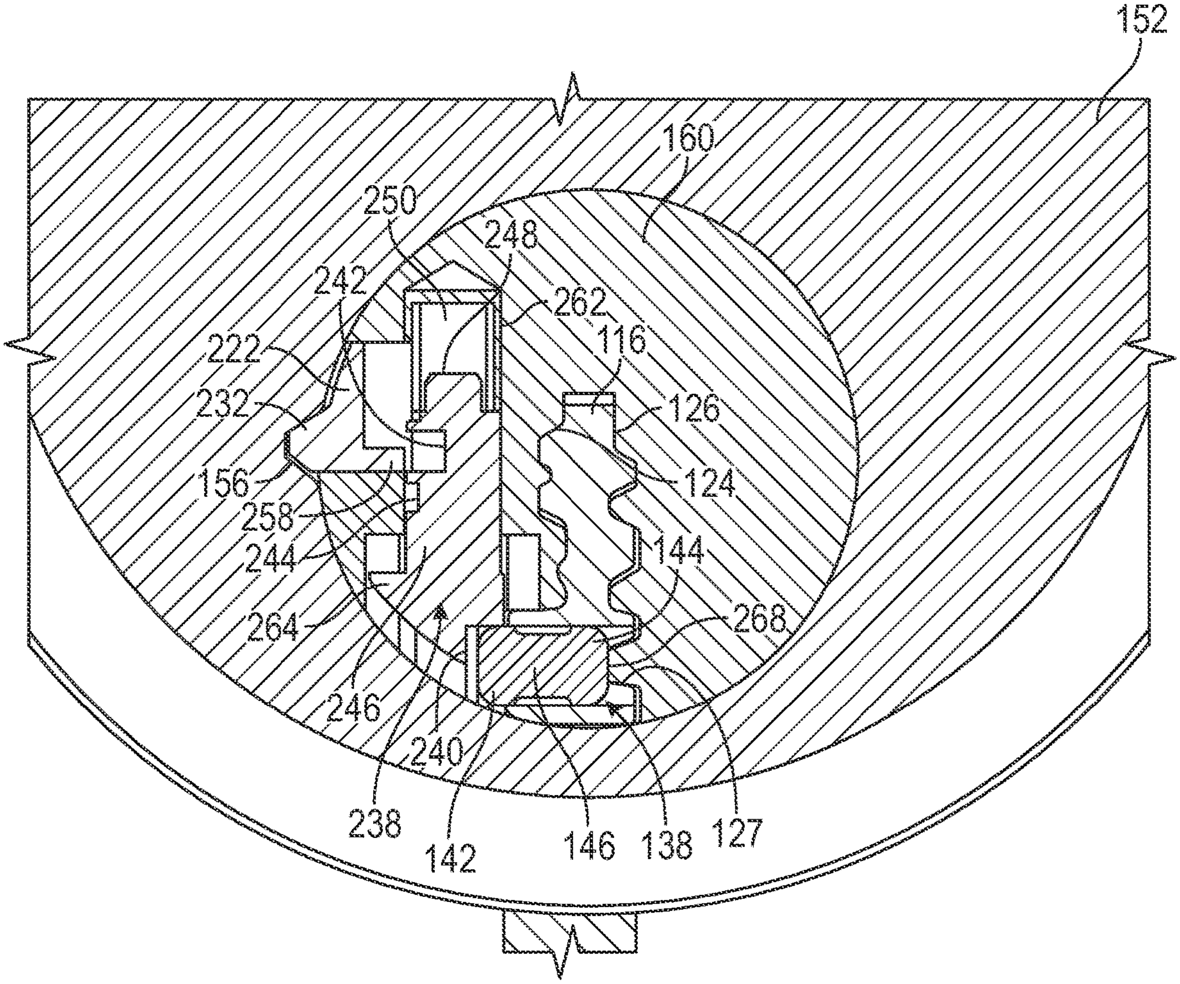
FIG. 27 is a transverse cross-section of the cylinder lock assembly along the line C-C in FIG. 24.

FIG. 24 shows a top cross sectional view of lock assembly 100 having shuttle pin (not shown) located in the fourth location fully inserted into cylinder 160 with second level of multi-level ridge (not shown) and lift pin 238 in the corresponding fourth position. As the key 110 is inserted into the keyway (not shown), the primary bittings 120 elevate and rotate the primary pins 188 to positions shown in FIGS. 24 and 25, the secondary bittings 136 elevate the secondary pins 204 to positions shown in FIGS. 24 and 26, and the shuttle pin 138 elevates the lift pin 238 to a position shown in FIGS. 24 and 27. In FIG. 25, the top pin 188 and the corresponding top pin driver 190 of each top pin set 186 are aligned with a shear line 168 between the plug 160 and the housing 152. Further, the sidebar recesses 196 are aligned with the blocking lugs 224 of the sidebar 222. In FIG. 26, the secondary pins 204, aligned with the cutouts 226 of the sidebar 222 are elevated so that the transverse sidebar slots 216 are aligned with the blocking shelves 228 of the sidebar 222. In FIG. 27, the first end 142 of the shuttle pin 138 is extended into the cutout 240 of the lift pin 238 and elevates lift pin 238 so that the sidebar slot 242 is aligned with the supplemental blocking shelf 258 of the sidebar 222.

Referring to FIG. 24, with the components of the lock assembly 100 aligned, as torque is applied to the key 110, the blocking lugs 224 on the sidebar 222 can move into the respective longitudinal sidebar recesses 196 of primary pins 188, the blocking shelves 228 of sidebar 222 can move into the respective transverse sidebar slots 216 of secondary pins 204, and the supplemental blocking shelf 258 of sidebar 222 can move into the sidebar slot 242 of the lift pin 238 so as to allow the sidebar 222 to move radially inwardly from a locked position to an unlocked position. The longitudinal sidebar recesses 196, transverse sidebar slots 216, and lift pin sidebar slot 242 are deep enough to allow sufficient radial movement of the sidebar 222 to disengage the nose 232 from the sidebar groove 156 of the bore 154. With the sidebar nose 232 disengaged from the sidebar groove 156 the plug 160 may rotate within the housing 152.

Figure 28A:
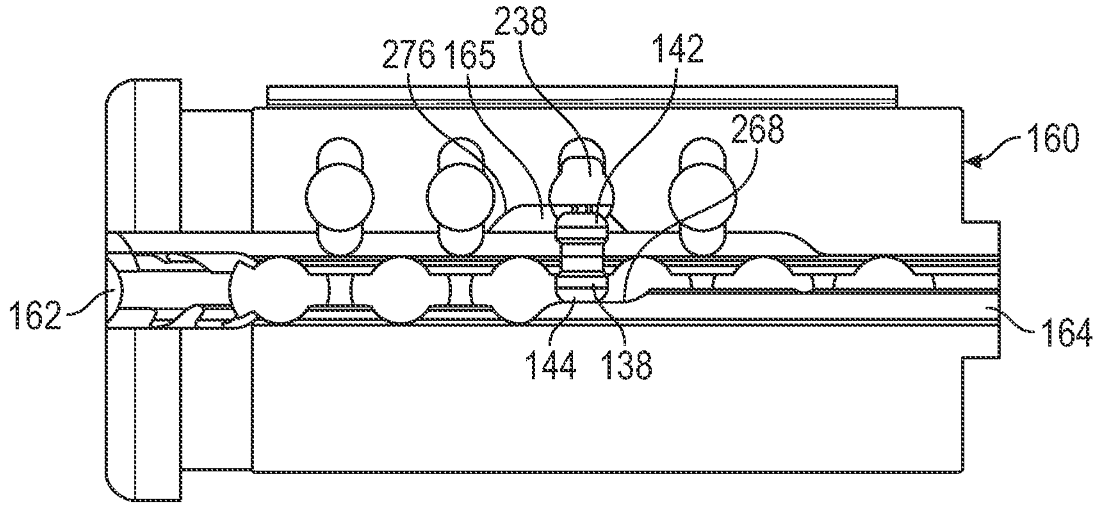
FIG. 28A is a bottom view of the cylinder lock of FIG. 18B and the key (omitted) fully inserted with the shuttle pin seated on the second level of the multi-level ridge and moved transversely with respect to the key to engage the supplemental sidebar control element on the opposite side of the keyway from the multi-level ridge.
Figure 28B:
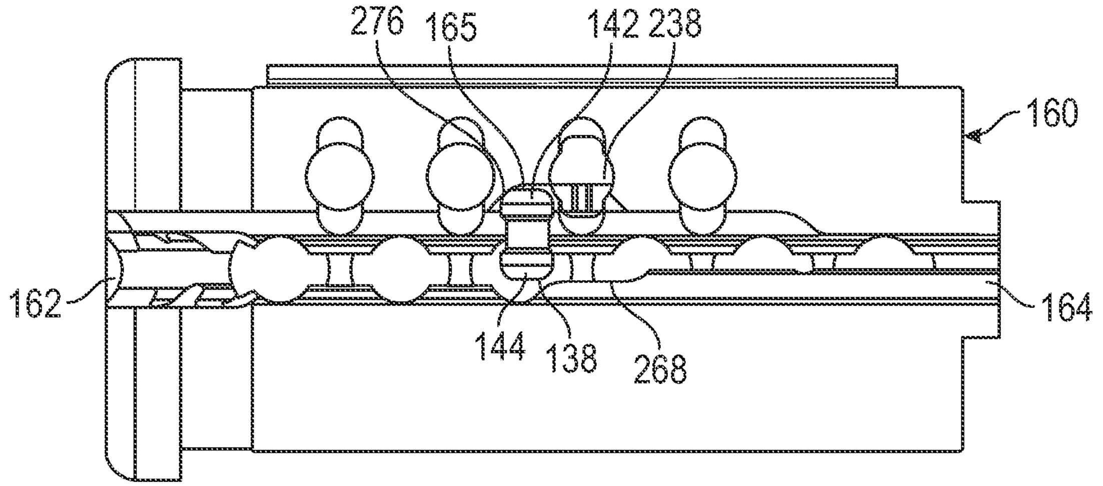
FIG. 28B is a bottom view of the cylinder lock of FIG. 18B and the key (omitted) being withdrawn from the cylinder with the shuttle pin contacting a third transition feature of the keyway to reposition the shuttle pin from extended position to the retracted position as the key moves the shuttle pin from the second level to the first level of the multi-level ridge.
Figure 28C:
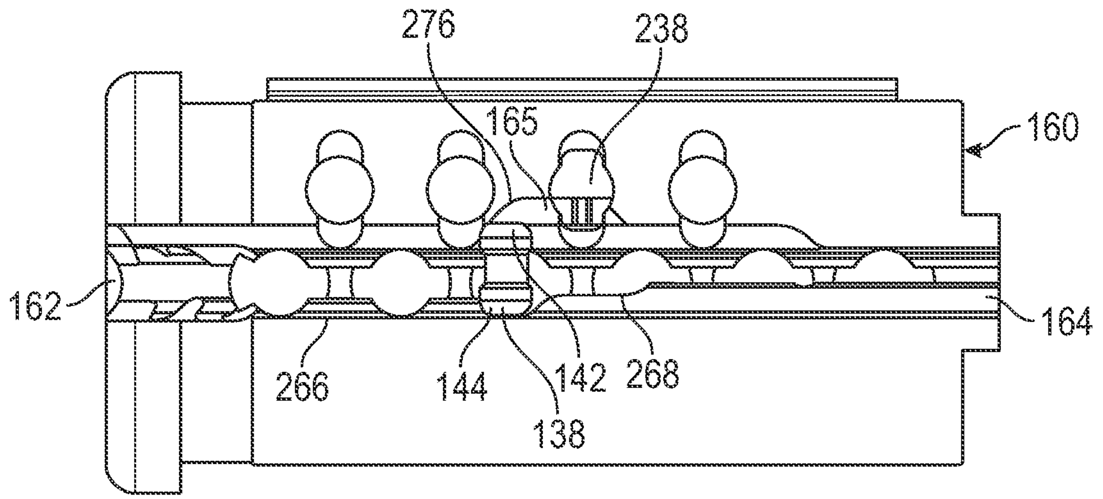
FIG. 28C is a bottom view of the cylinder lock of FIG. 18B and the key (omitted) with the shuttle pin located at the first level of the multi-level ridge.

Referring to FIGS. 28A-28C, the third transition feature 276 opposite the multi-level ridge 164 engages the shuttle pin 138 in the key 110 as the key 110 is removed from the cylinder 160 and the extended end 142 of the shuttle pin 138 leaves the relief 165 and moves the shuttle pin 138 from a position previously determined by the second level 268 back to a position primarily contained within the key 110 groove 127 at the first level 266. Movement of the shuttle pin 138 back to the retracted position allows clearance for the shuttle pin 138 in the keyway 162 as the key 110 is removed.

FIG. 28A shows the position of the shuttle pin 138 with the correct key fully inserted (key is omitted from the figure for clarity). Shuttle pin 138 is seated on the second level 268 of the multi-level ridge 164 and moved across keyway 162 to engage lift pin 238.

FIG. 28B shows the position of shuttle pin 138 with the correct key being withdrawn from the fully-inserted position (key is omitted from the figure for clarity). As the key is withdrawn from cylinder 160, shuttle pin 138 contacts third transition 276 and is moved back toward the key groove 127.

FIG. 28C shows the position of shuttle pin 138 with correct key being further withdrawn from the fully-inserted position (key is omitted from the figure for clarity). As the key is further withdrawn from the cylinder 160, the shuttle pin 138 has been moved by third transition 276 to first level 266 of the multi-level ridge 164 such that the shuttle pin 138 has clearance in the keyway 162 to permit the key to be fully withdrawn.

Lock Assembly—Second Embodiment

Figure 29:
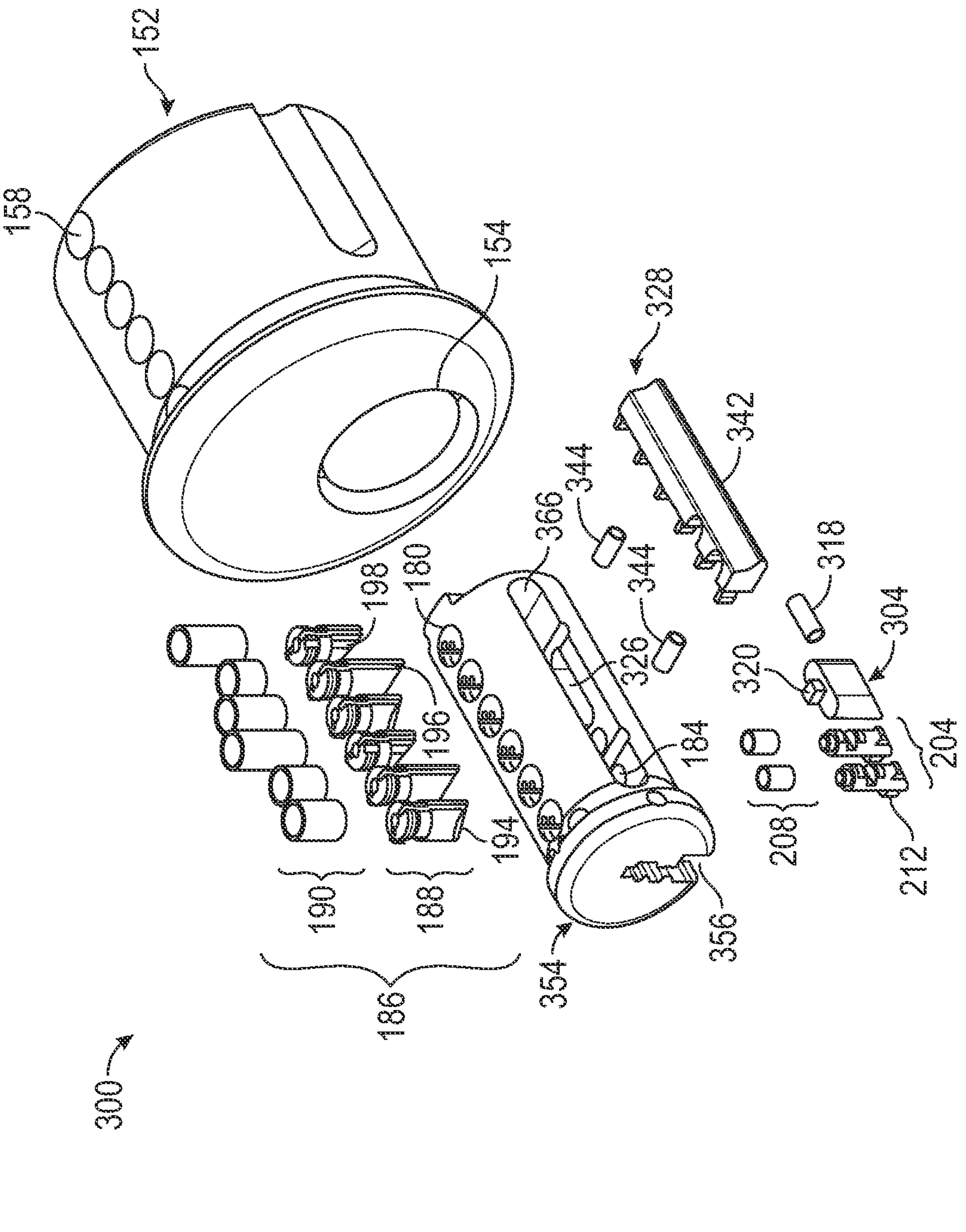
FIG. 29 is an exploded top perspective view of a second embodiment of a cylinder lock assembly with multiple, supplemental locking elements.

FIG. 29 illustrates a second embodiment of lock assembly 300, which is a variation of lock assembly 100 configured for a slider 304 instead of a lift pin 238 as the supplemental sidebar control element. As with lock assembly 100, described above, lock assembly 300 may include housing 152 having a bore 154 and sidebar groove 156 (not shown), primary pin sets 186, and secondary pins 204. A plug 354 is disposed in the bore 154 of the housing 152 with a keyway 356 extending longitudinally through the plug 354. Like plug 160 described above, plug 354 may include sidebar cavity 366, primary pin holes 180, and secondary pin holes

184. Additionally, plug 354 includes a slider hole 326 in which the slider 304 resides. A sidebar 328 is positioned in the sidebar cavity 366 formed in the side of the plug 354 and a beveled projection, or nose, 342 on a first side of the sidebar 328 extends into the sidebar groove 156 (see FIG. 36) formed in the sidewall of the axial bore 154 in the housing 152.

Figure 30B:
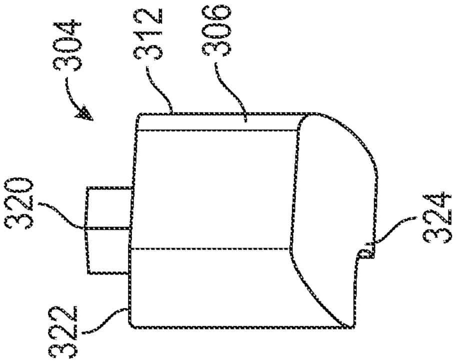
FIGS. 30A and 30B are a top perspective view and bottom perspective view, respectively, of one embodiment of a slider of the second embodiment of the lock assembly.
Figure 30A:
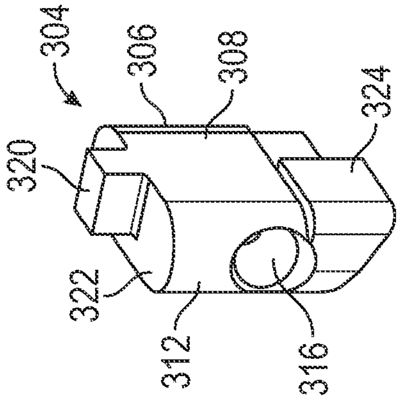

FIGS. 30A and 30B depict one embodiment of the slider 304. The slider 304 has a body 306 with a sidebar blocking lug 320 projecting above a top surface 322 and a shuttle pin engaging portion or projection 324 which extends into the keyway 356 on a medial side 308 (or inner side facing the keyway 356) of the body 306 when the slider is disposed in the slider hole 326. The projection 324 is laterally offset from a transversely extending projection 212 of the side pin(s) 204, and thus the projection 324 is not engaged or contacted by secondary cuts 136 of the rib 132 on the key 110. On a first end 312 of body 306, the slider 304 has a cylindrical hole 316 to receive a spring 318, which spring-biases the slider 304 within the slider hole 326 in a blocking position (see FIG. 35A) whereby a portion of the sidebar 328 contacts blocking lug 320, which prevents the sidebar 328 from moving radially into an unlocked position.

Figure 31:
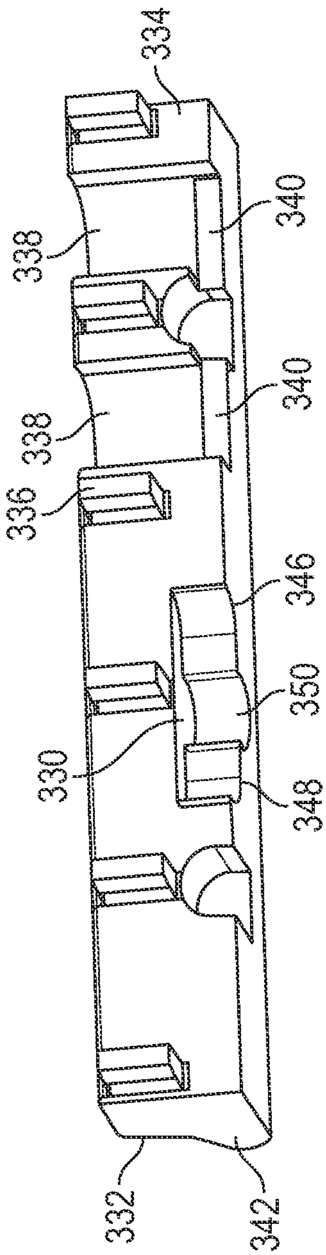
FIG. 31 is a bottom perspective view of a sidebar of the second embodiment.

FIG. 31 shows one embodiment of a sidebar 328 corresponding to the slider 304. Similar to the sidebar 222 in lock assembly 100, the sidebar 328 has a first side 332 having a beveled projection or nose 342 and a second side 334 having various blocking elements to block the sidebar 328 from moving radially when the lock assembly 300 is in the locked state (see FIG. 35A) and allow radial movement of the sidebar when the lock assembly is in the unlocked state (see FIGS. 35B and 35C). The sidebar 328 includes primary pin blocking lugs 336, secondary cutouts 338 formed in the second side 334 between adjacent pairs of blocking lugs 336, secondary blocking shelves 340 extending across each cutout 338, and a slider cutout 330 corresponding to the slider 304. The slider cutout 330 comprises a first cutout portion 346, a second cutout portion 348, and a third cutout portion 350. In one embodiment, the slider cutout 330 is generally in the shape of a trefoil cutout. The first cutout portion 346 and the second cutout portion 348 are shallow and receive the blocking lug 320 of the slider 304 in a locked, blocking position (see FIG. 35A). That is the blocking lug 320 when residing in cutout portion 346 or cutout portion 348 will contact a back wall of the respective cutout portion to block the sidebar 328 from inward radial movement. The third cutout portion 350 is deeper than the first 346 and second 348 cutout portions and receives the blocking lug 320 of the slider 304 in an unlocked, non-blocking position (see FIGS. 35B and 35C).

Figure 32:
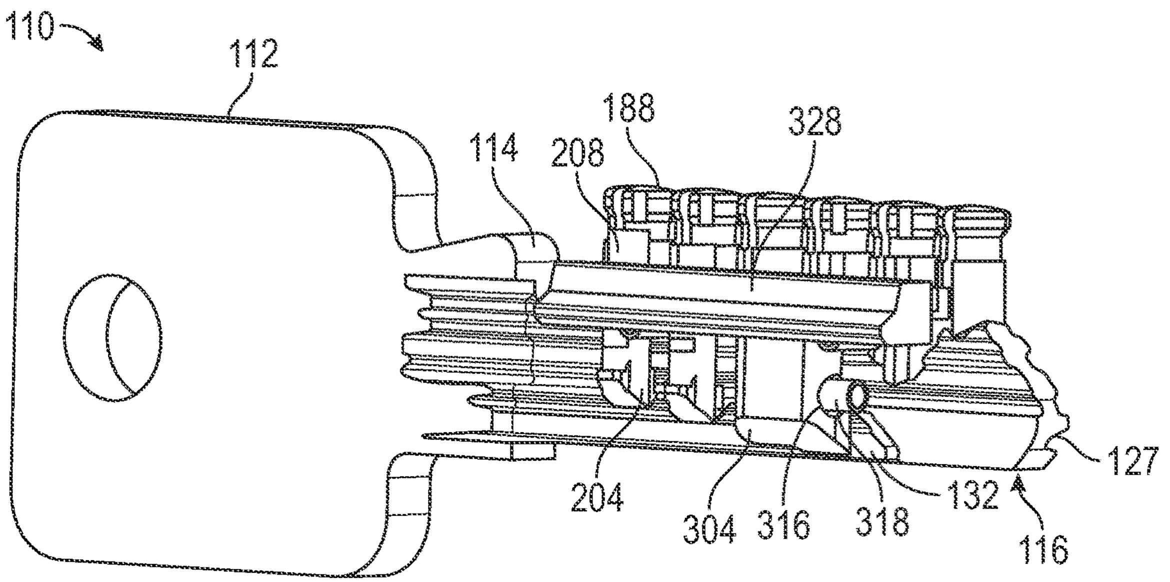
FIG. 32 is a perspective view of the key, the primary pins, the secondary pins, the slider, and the sidebar of the lock assembly of FIG. 29.
Figure 33:
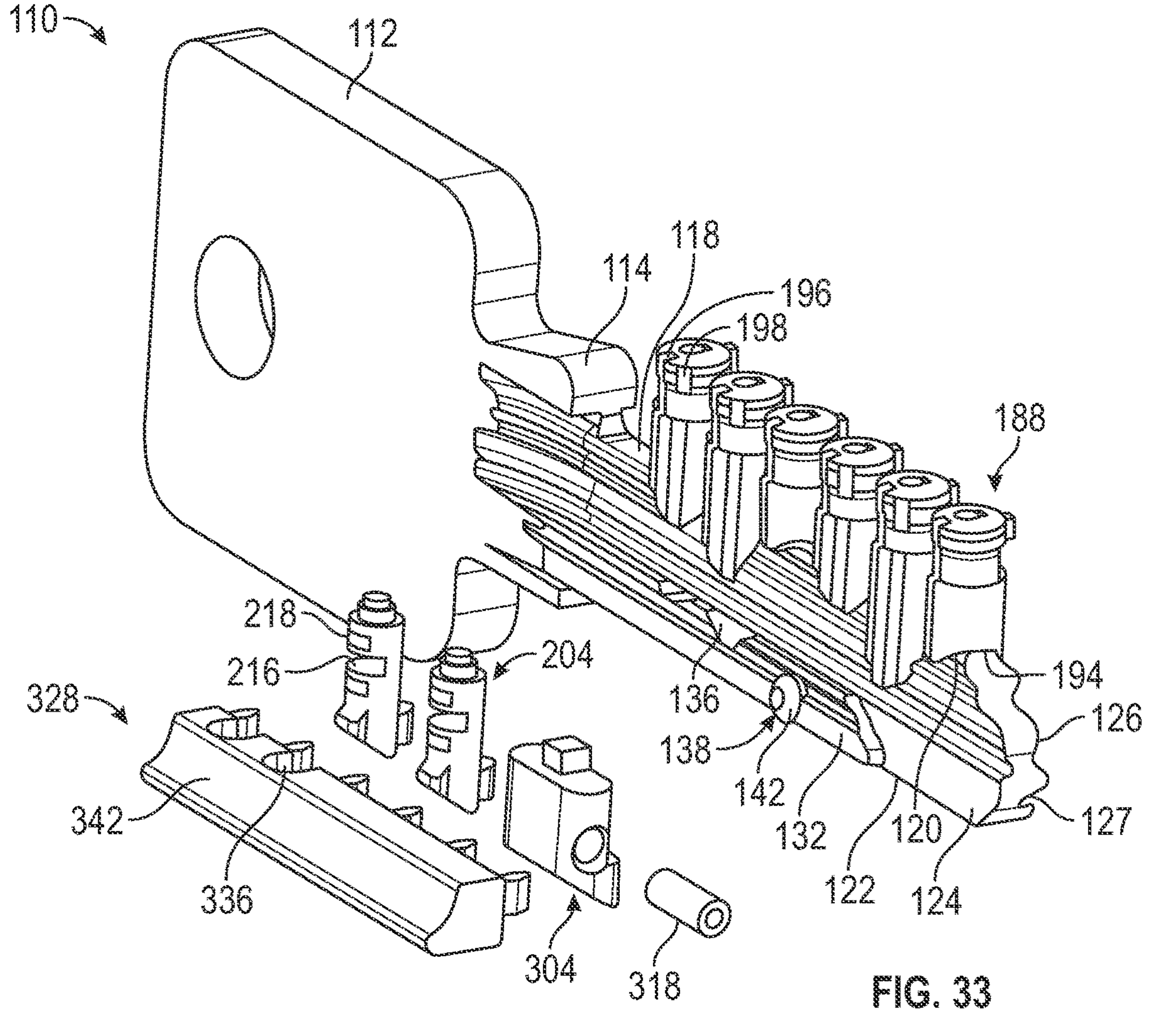
FIG. 33 is an exploded, top perspective view of the key, the primary pins, the secondary pins, the slider, and the sidebar of the lock assembly of FIG. 29.

Referring to FIGS. 32 and 33, the key 110 may be the same key 110, described above, used in lock assembly 100 with key blade 116, primary bittings 120 on a top edge 118, secondary bittings 136 on a secondary top edge 134 of rib 132, and a shuttle pin 138 contained within a through-hole 140 extending transversely through the key blade 116.

The slider 304 resides in the slider hole 326 in the plug 354 (see FIG. 29), and is spring-biased by a spring 318 in a locked position. The illustrated embodiment of FIG. 29 depicts two secondary pins 204 with one slider 304 disposed to one side of the two secondary pins 204, and this is also shown in FIGS. 32 and 33. In other embodiments, the secondary pin(s) may be located on an opposite side of the slider, or one or more secondary pins may be located on either side of the slider. As shown in FIGS. 4A-4D, the shuttle pin 138 can be positioned at varying longitudinal positions along the length of the blade 116*a*-116*d* to accommodate various numbers and arrangements of the secondary pins and supplemental lift pins or slider. In some embodiments, the lock assembly may have no secondary pins. In various embodiments, the sidebar may be controlled by only one or more supplemental sidebar control elements (e.g., one or more sliders), or by any combination of primary pins, secondary pins, and supplemental sidebar control elements.

Figure 34A:
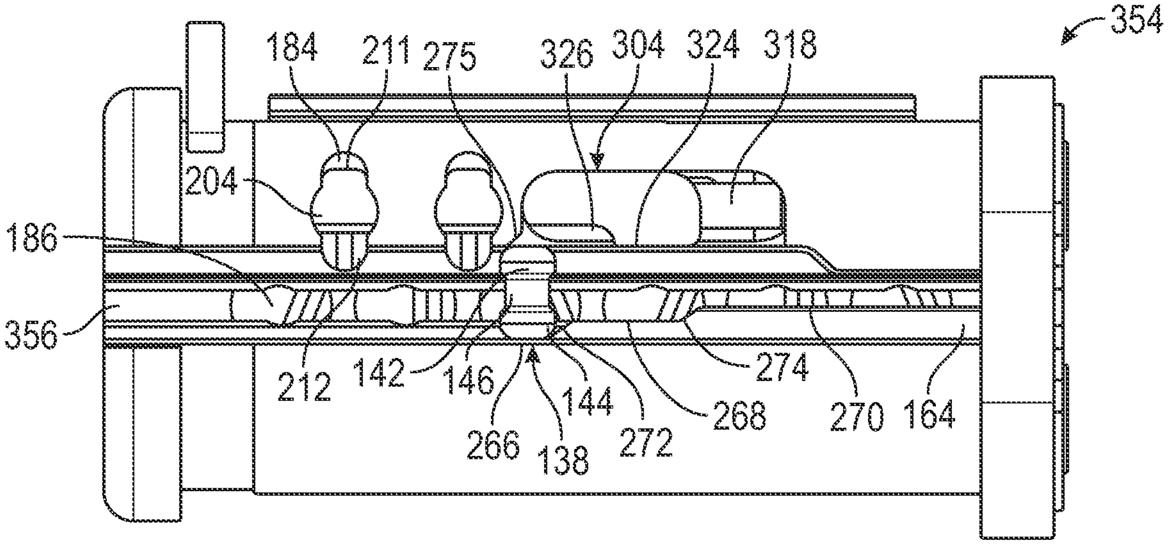
FIG. 34A is a bottom view of the plug, the shuttle pin, and the slider, with the key omitted from the figure and with the shuttle pin in a retracted position.
Figure 34B:
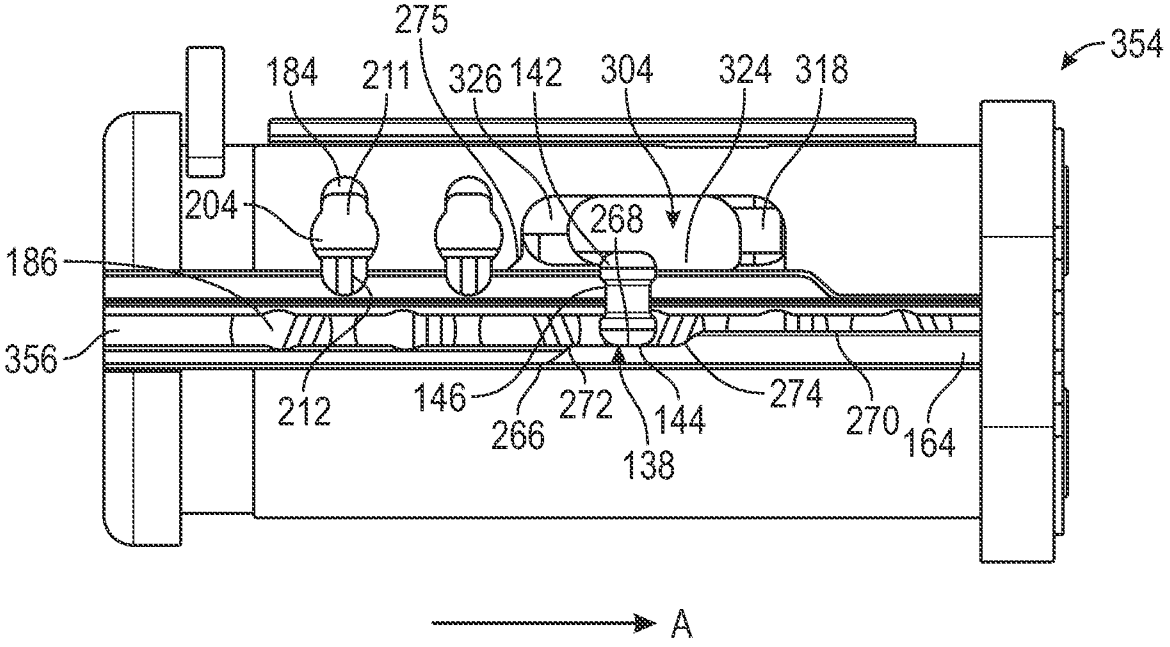
FIG. 34B is a bottom view of the plug, the shuttle pin, and the slider, with the key omitted from the figure and with the shuttle pin in an extended position engaging the slider.

FIGS. 34A and 34B show the keyway 356 within the plug 354 having a multi-level ridge 164 and a slider 304 disposed within slider hole 326. The slider 304 is shown within the keyway 356 as it would be positioned by the shuttle pin 138 of a key 110 inserted into the keyway 356. To illustrate the manipulation of the shuttle pin 138 more clearly, the key 110 is omitted from FIGS. 34A and 34B.

Figure 35A:
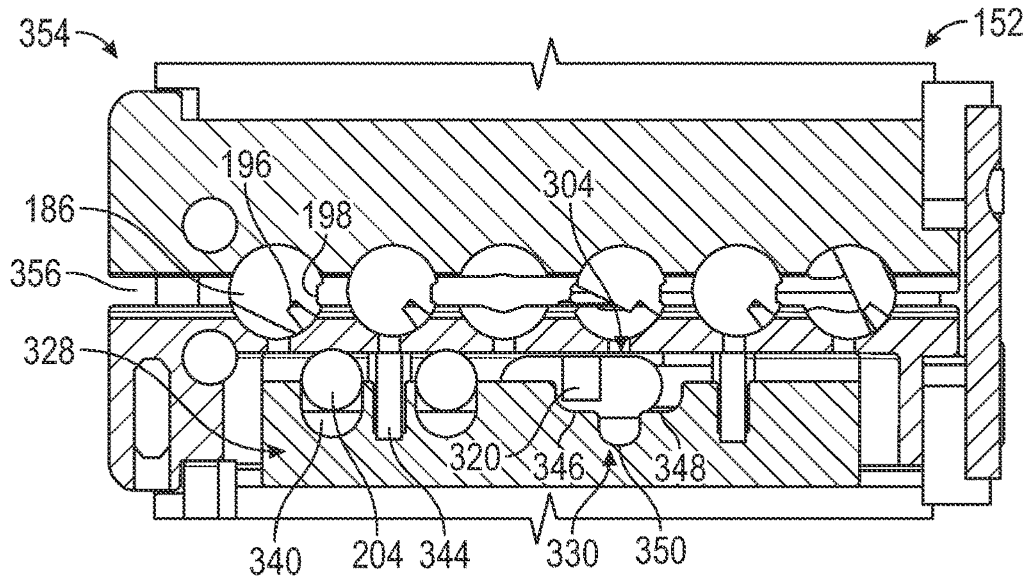
FIG. 35A is a top longitudinal cross-section of the second embodiment of the cylinder lock assembly with the slider in a locked, blocking position.

Referring to FIG. 34A, as the key 110 is inserted into the keyway 356, the shuttle pin 138 travels through the keyway 356 to a first position. In the first position, a second end 144 of the shuttle pin 138 extends into a groove 127 on the second side of the key blade 116. The slider 304 is in a resting position where the blocking lug 320 is in a locked position, not aligned with the third cutout portion 350 of sidebar 328, as shown in FIG. 35A, and the sidebar 328 is prevented from moving radially inwardly to retract from the groove 156.

Figure 35B:
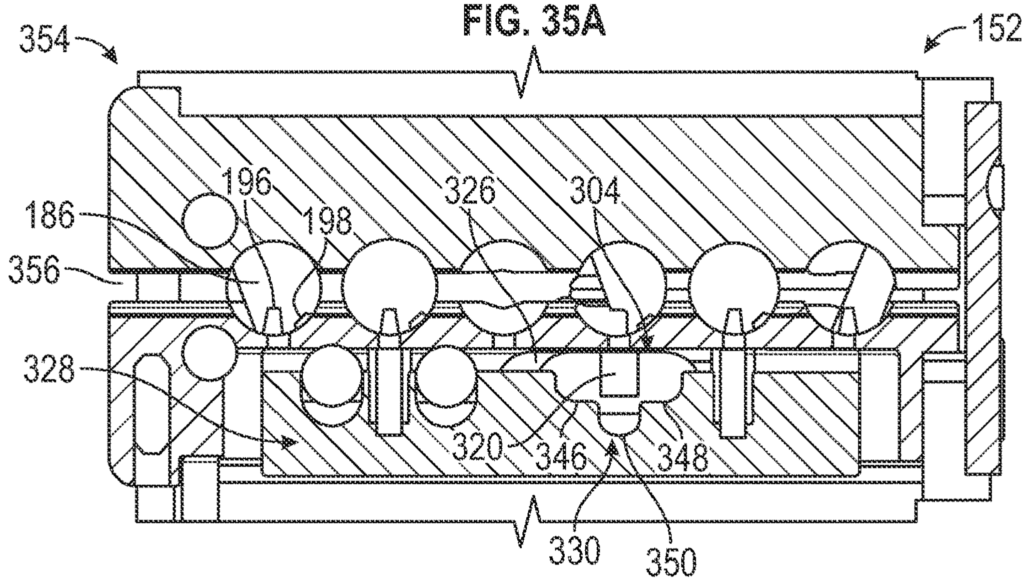
FIG. 35B is a top longitudinal cross-section of the second embodiment of the cylinder lock assembly with the slider in an unlocked position and with the sidebar in a locked position engaging a sidebar groove in a housing.
Figure 36:
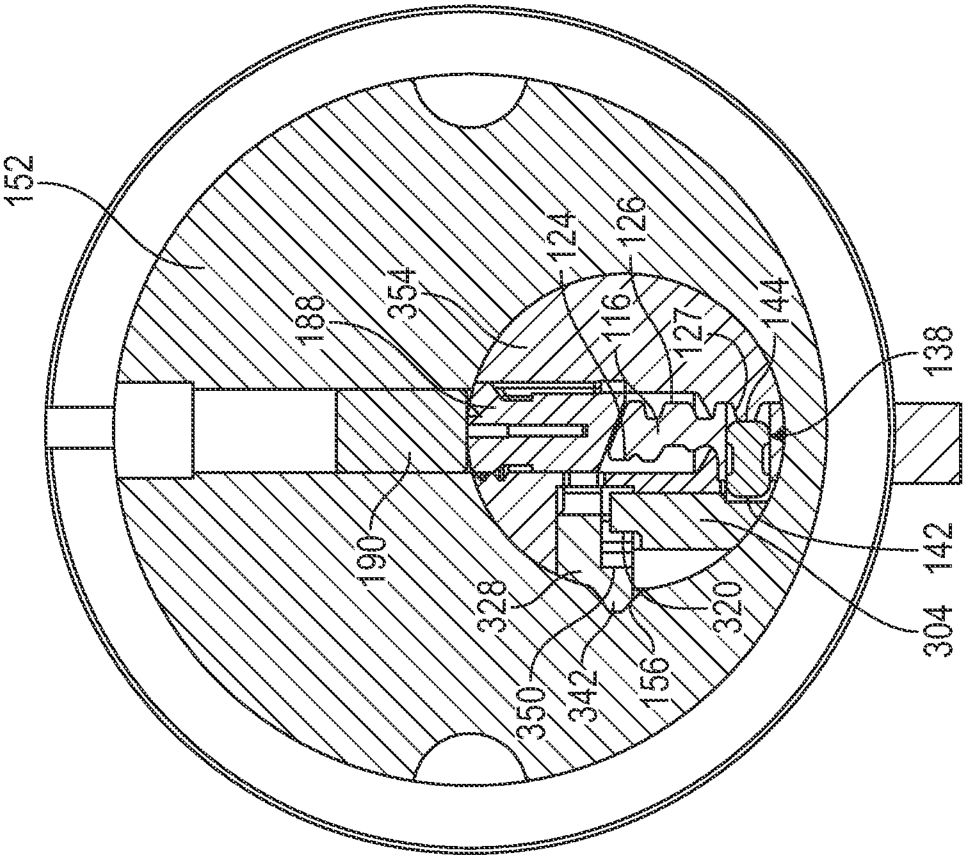
FIG. 36 is a transverse cross-section of the cylinder lock assembly with the shuttle pin in an extended position to move the slider to an unlocked position.

Referring to FIG. 34B, as the key 110 continues through the keyway 356 in the insertion direction A, the shuttle pin 138 engages a first transition ramp 272 of the multi-level ridge 164 extending into the groove 127 in the key blade 116 and moves from a first level 266 to a second level 268 of the multi-level ridge 164. Positioning the shuttle pin 138 at the second level 268 of the multi-level ridge 164 pushes the shuttle pin 138 into the slider hole 326 opposite the multi-level ridge 164. In this position, as shown in FIG. 36, the enlarged first end 142 of the shuttle pin 138 extends out of the first side 124 of the key blade 116. As the key 110 moves forward into a fully inserted position, the first end 142 of the shuttle pin 138 slides forward to contact the projection 324 on the slider 304 and pushes the slider 304 forward until the top blocking lug 320 on the slider 304 is aligned with the third cutout portion 350, as shown in FIG. 35B.

Figure 35C:
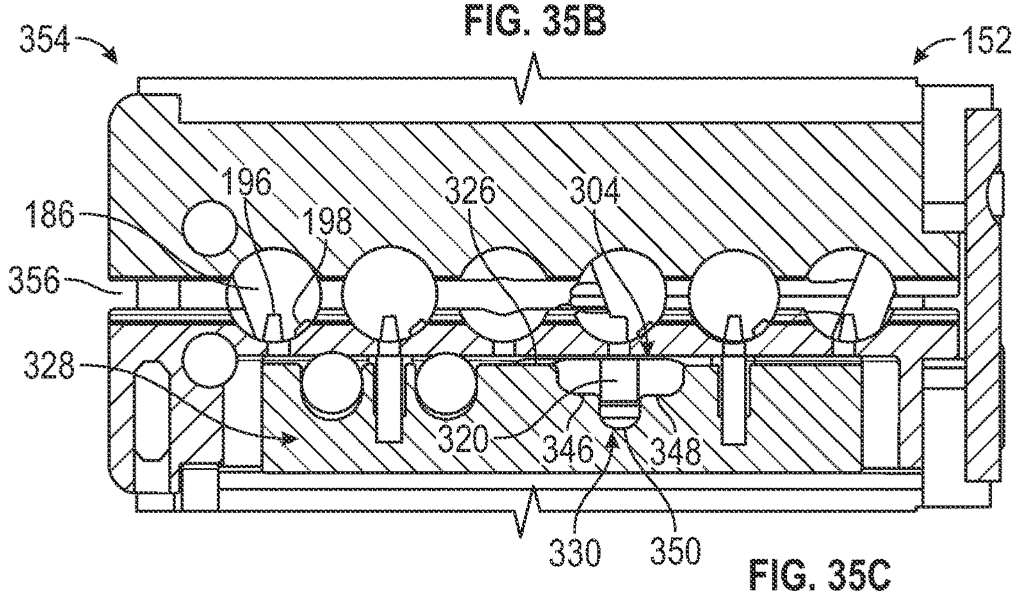
FIG. 35C is a top longitudinal cross-section of the second embodiment of the cylinder lock assembly with the slider in an unlocked position and with the sidebar in an unlocked position disengaged from the sidebar groove in the housing.

The shuttle pin 138 remains in the extended position holding the slider 304 in the unlocked, forward position with the top blocking lug 320 aligned with the third cutout portion 350. As a torque is applied to the key 110, the sidebar 328 may move radially into the plug 354, with the third cutout portion 350 receiving the blocking lug 320, as shown in FIG. 35*c*. The third cutout portion 350 is sufficiently deep to enable the sidebar 328 to move radially inward. As the sidebar 328 moves radially inward, the beveled projection 342 withdraws from the axial groove 156 and permits the plug 354 to rotate within the housing 152.

As the key blade 116 is removed from the plug 354, the extended end 142 of the shuttle pin 138 engages third transition feature 275 opposite the multi-level ridge 164. The third transition feature 275 moves the shuttle pin 138 from a position previously determined by the second level 268 back to a position primarily contained within the key blade 116 groove 127 at the first level 266. Movement of the shuttle pin 138 back to the retracted positions allows clearance for shuttle pin 138 in the keyway 356 as the key blade 116 is removed.

In an alternate embodiment, the sidebar includes a protruding blocking lug and the slider includes a lug-receiving recess (not shown) Movement of the slider from a locked state or position to an unlocked state or position comprises engaging the slider with the shuttle pin as described above to move the slider from a first position, in which the lug-receiving recess is not aligned with the blocking lug of the sidebar so that the blocking lug contacts the slider to prevent lateral (e.g., radial) movement of the sidebar within the sidebar cavity, to a second position, in which the lug-receiving recess is aligned with the blocking lug of the sidebar so that the blocking lug can enter the lug-receiving recess to permit lateral (e.g., radial) movement of the sidebar within the sidebar cavity.

Lock Assembly—Third Embodiment

Figure 37:
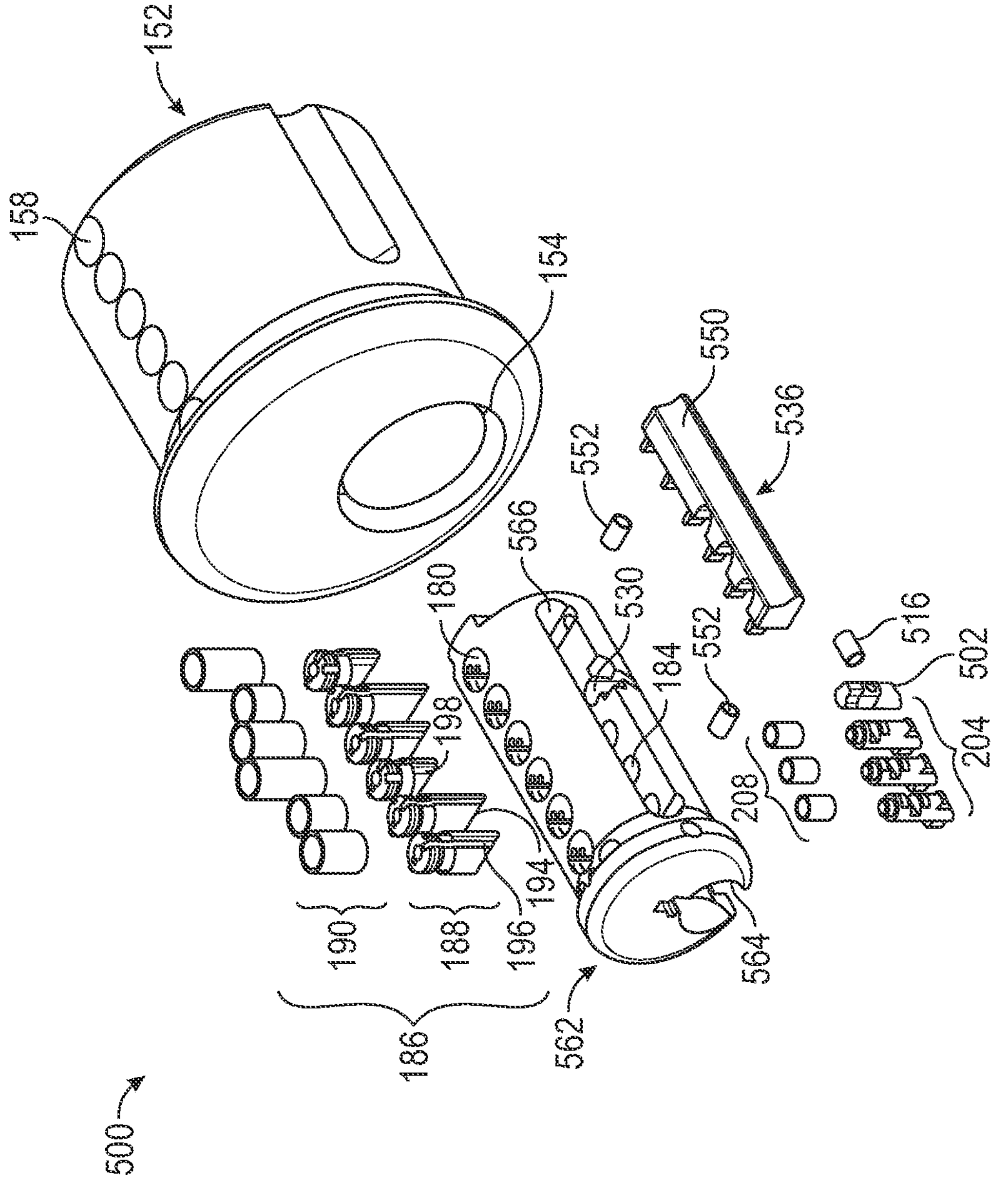
FIG. 37 is an exploded, top perspective view of a third embodiment of a cylinder lock assembly with multiple, supplemental locking elements.

FIG. 37 illustrates a third embodiment of a lock assembly 500. As with lock assembly 100, described above, lock assembly 500 includes housing 152 having axial bore 154 in which a cylindrical plug 562, having a longitudinally-extending keyway 564, is rotatably disposed. Primary pin sets 186, as described above, control rotation of the plug 562 within the bore 154 and secondary pins 204, as described above, are positioned by the secondary bitting cuts 136 of key 110. Lock assembly 500, includes a side bar 536 disposed within a sidebar cavity 566 formed in plug 562 and is operable to engage a sidebar groove 156 formed in the wall of bore 154 as described above. Sidebar 536 includes a beveled nose 550 that engages the sidebar groove 156. The lock assembly 500 includes a supplemental sidebar control element comprising a supplemental pin, e.g., in the form of a flipper pin 502 rotationally oriented by shuttle pin 138 of key 110 to control movement of the sidebar 536 out of engagement with the sidebar groove 156, as will be described below.

As shown in FIGS. 4A-4D, the shuttle pin 138 can be positioned at varying longitudinal positions along the length of the blade 116*a*-116*d* to accommodate various numbers and arrangements of the supplemental sidebar control element. In some embodiments, the lock assembly may have no secondary pins. In various embodiments, the sidebar may be controlled by only one or more supplemental sidebar control elements (e.g., one or more flipper pins), or by any combination of primary pins, secondary pins, and supplemental sidebar control elements.

Figure 40:
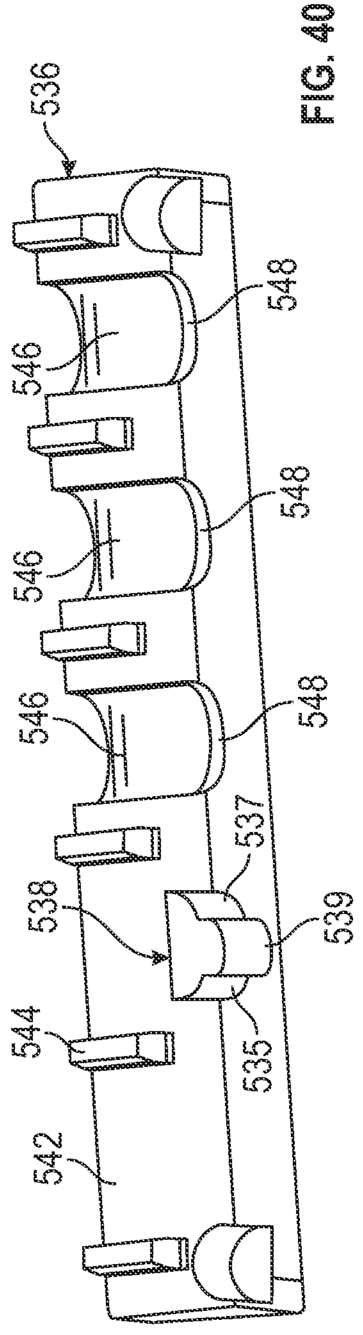
FIG. 40 is a bottom perspective view of a sidebar of the third embodiment.
Figure 41:
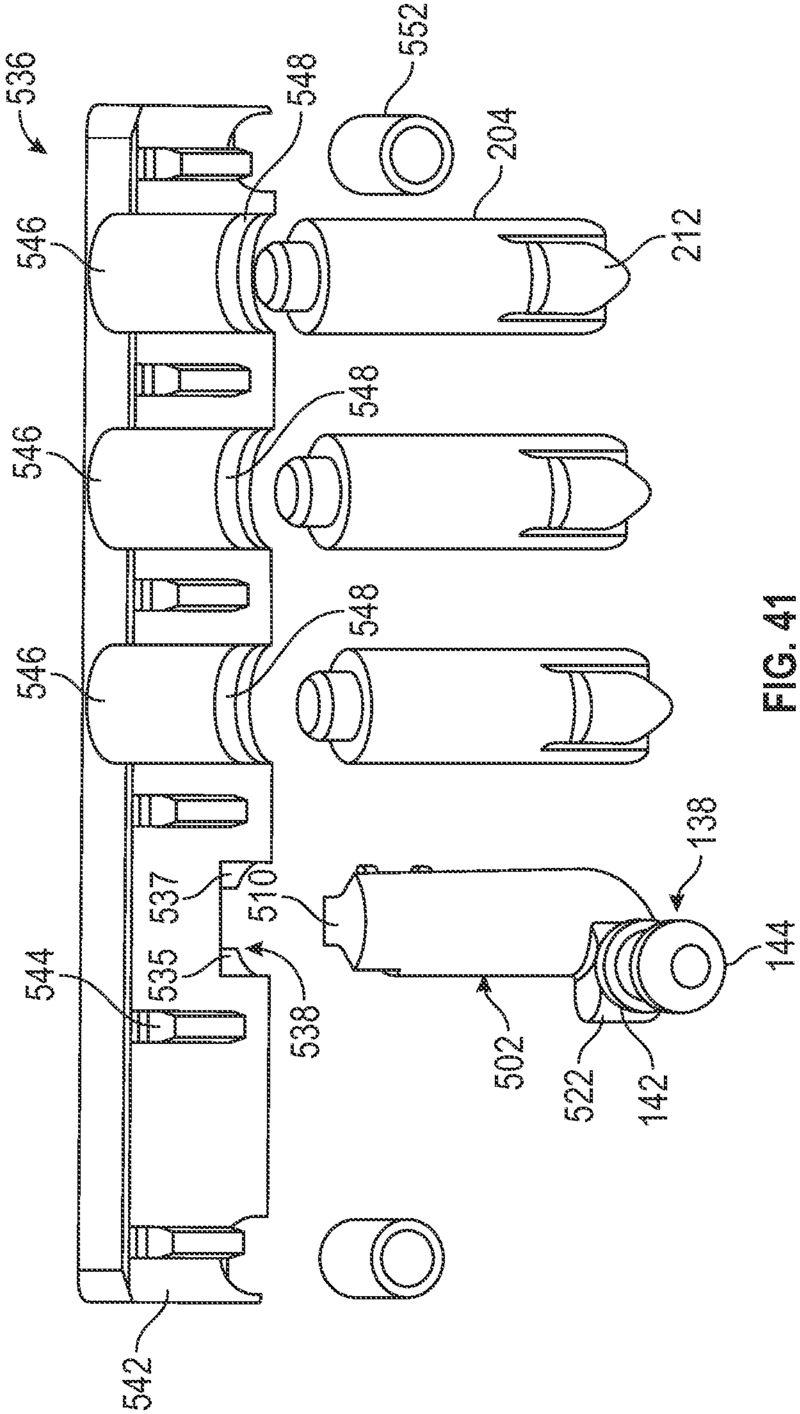
FIG. 41 is a top perspective view of the sidebar, secondary pins, flipper pin, shuttle pin, and sidebar springs.
Figure 47C:
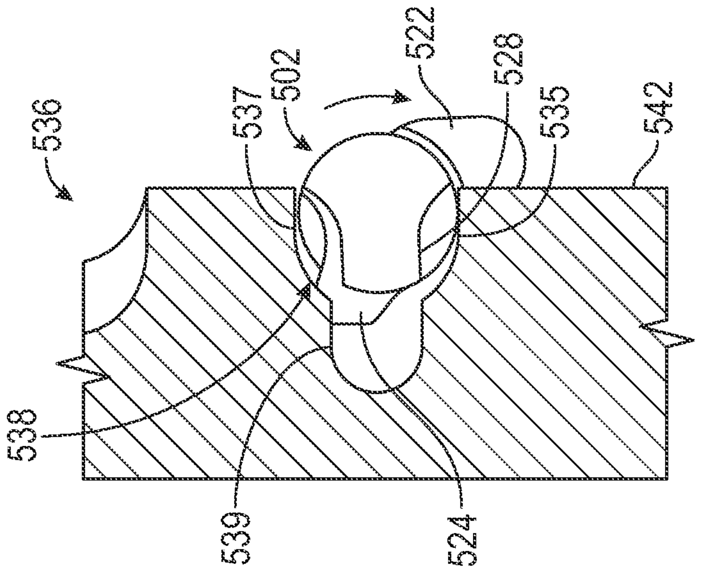
FIG. 47C is a partial top view of the flipper cutout of the sidebar of the third embodiment and the flipper pin in a non-blocking orientation.
Figure 47B:
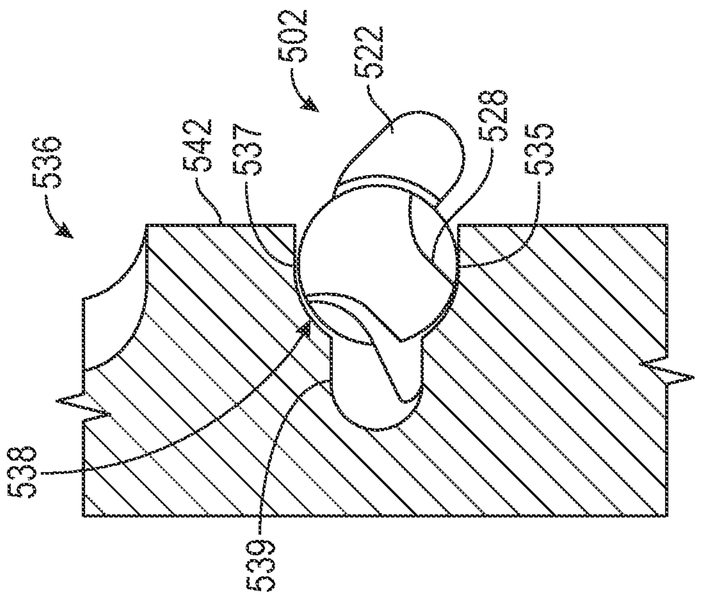
FIG. 47B is a partial top view of the flipper cutout of the sidebar of the third embodiment and the flipper pin in a blocking orientation.
Figure 47A:
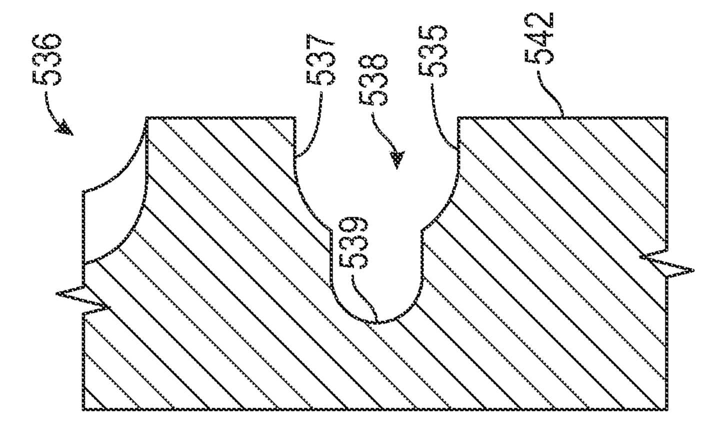
FIG. 47A is a partial top view of a flipper cutout of the sidebar of the third embodiment.

FIGS. 40 and 41 illustrate features of one embodiment of the sidebar 536. Similar to sidebar 222 in lock assembly 100, sidebar 536 has various blocking elements to block the sidebar 536 from moving radially when the lock assembly 500 is in the locked state and allow radial movement of the sidebar 536 when the lock assembly 500 is in the unlocked state. The sidebar 536 includes primary pin blocking lugs 544 projecting from a second side 542 of the sidebar 536, secondary pin cutouts 546 formed in the second side 542 between adjacent pairs of blocking lugs 544, secondary pin blocking shelves 548 (e.g., curved) extending across each cutout 546, and a supplemental blocking feature, such as a flipper pin cutout 538. The flipper pin cutout 538 is a cutout that received a portion of the flipper pin 502 in the unlocked state after the shuttle pin 138 rotates the flipper 502. As shown in FIG. 47A, the flipper pin cutout 538 includes first and second initial cutouts 535, 537 extending from the second side 542 of the sidebar 536, and a center cutout 539 between the initial cutouts 535, 537 and extending deeper into the sidebar 536 than the initial cutouts 535, 537.

Figure 38B:
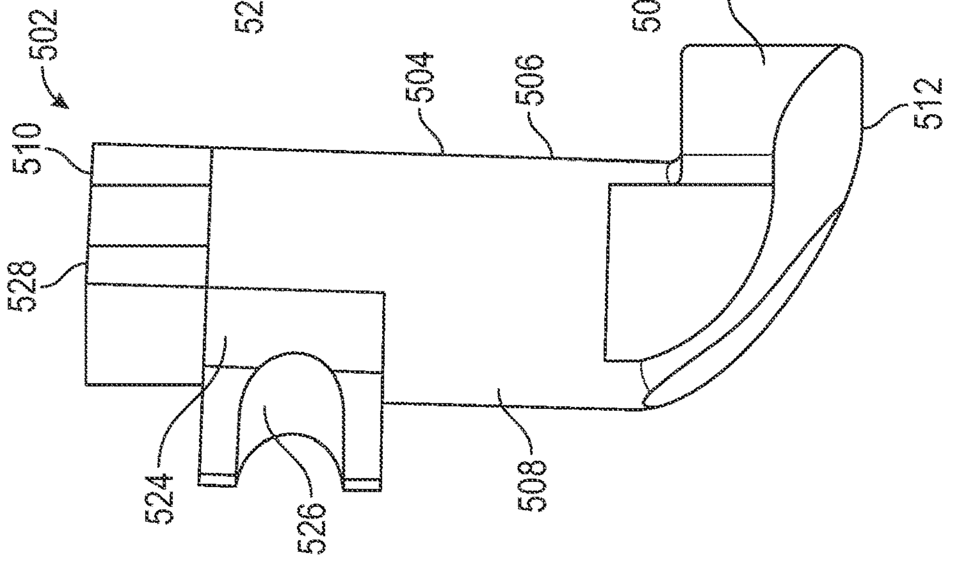
FIGS. 38A and 38B are a top perspective view and a side view, respectively, of one embodiment of a flipper pin of the third embodiment of the lock assembly.
Figure 38A:
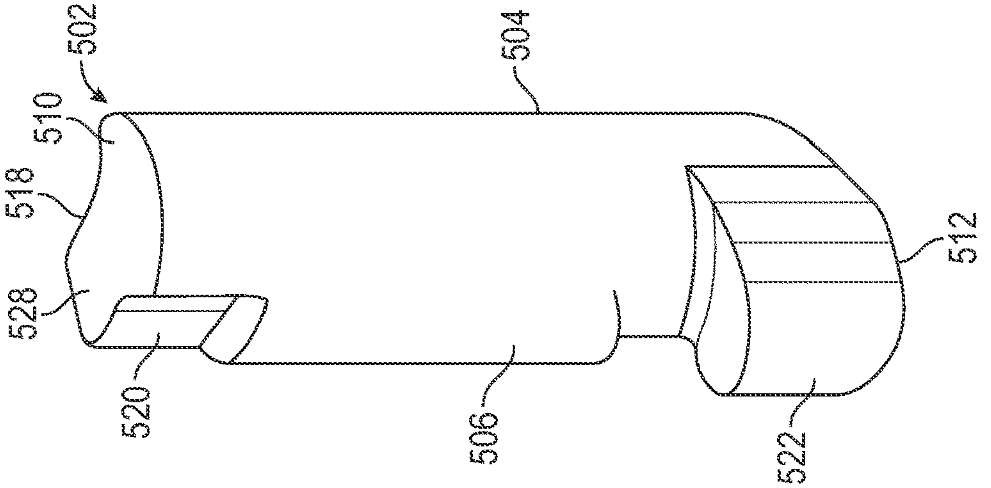

FIGS. 38A and 38B depict one embodiment of the flipper pin 502. The flipper pin 502 has a body 504, which is generally cylindrical in shape. On a first side 506 of the flipper pin 502 near a bottom end 512, a transversely extending shuttle pin engaging portion (lobe, or flipper) 522 extends into the keyway 564 to be engaged by shuttle pin 138 on key blade 116. The flipper 522 is laterally offset from a transversely extending projection 212 of the side pin(s) 204, and thus the flipper 522 is not engaged or contacted by secondary cuts 136 of the rib 132 on the key 110.

Figure 39:
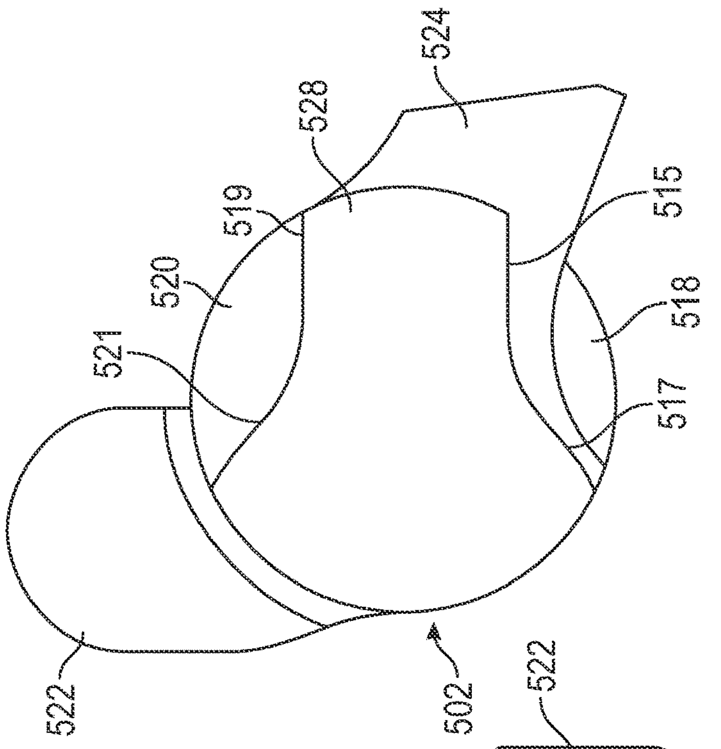
FIG. 39 is a top view of the flipper pin.

On a second side 508 of the flipper pin 502, near a top end 510, the flipper pin 502 has a lateral projection 524 with a cutout 526. In the illustrated embodiment, the top end 510 has two cutouts 518, 520 on opposite sides of the body 504 to form a sidebar engagement feature, such as sidebar engaging lug 528, on the top end 510 of the flipper pin 502. As shown in FIG. 39, cutout 518 is defined by a first portion 515 and a second portion 517, and cutout 520 is defined by a first portion 519 and a second portion 521. Sections 515 and 519 may be parallel to one another, thereby defining the sidebar engaging lug 528. Portions 517 and 521 diverge away from each other extending from the first portions 515, 519, respectively, toward the outer periphery of the body 504. Other embodiments may contemplate various shapes on the top end 510, which are configured to operate with the sidebar 536. The flipper pin 502 is spring-biased by a spring 516 (see FIG. 37) to maintain a position with the flipper 502 positioned into the keyway 564. The spring 516 is positioned off-center from a longitudinal center line through the body 504 and engages projection 524, thereby creating a rotational bias on the flipper pin 502.

Figure 42:
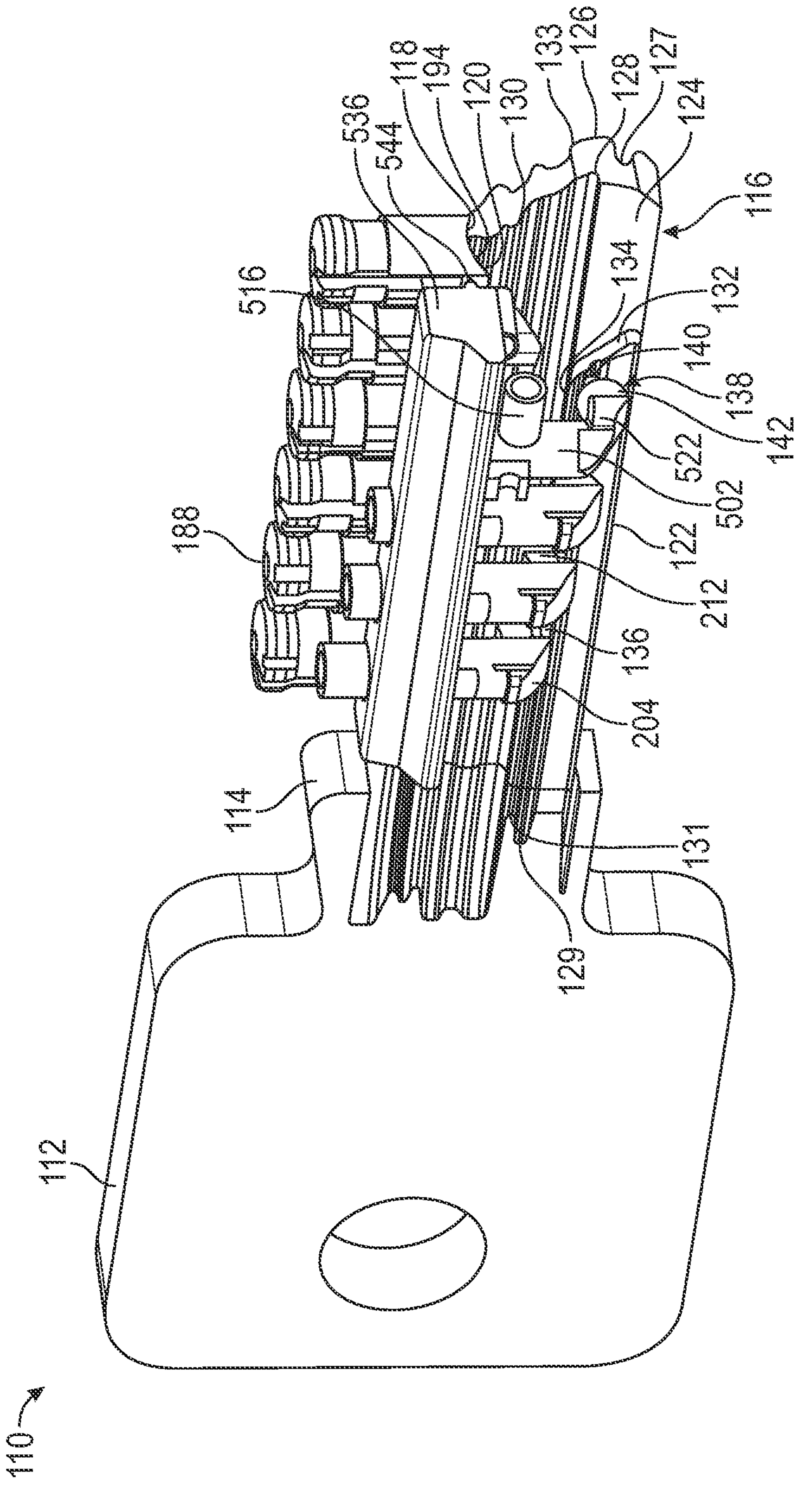
FIG. 42 is a top perspective view of the key, the primary pins, the secondary pins, the flipper pin, the flipper pin spring, the shuttle pin, and the sidebar of the third embodiment of the lock assembly.

As shown in FIG. 42, the key 110 may be the same key 110, described above, used in lock assembly 100 with key blade 116, primary bittings 120 on a top edge 118, secondary bittings 136 on a secondary top edge 134 of rib 132, and a shuttle pin 138 contained within a through-hole 140 extending transversely through the key blade 116. FIG. 42 further shows the positional relationship between the key 110, primary pins 188, secondary pins 204, flipper pin 502, flipper spring 516, and sidebar 536. The beveled tips 194 of the primary pins 188 engage the primary bittings 120 on the top edge 118 of the key 110 to elevate and rotate the primary pins 188. The transversely extending projections 212 of the secondary pins 204 engage the secondary bittings 136 on the secondary top edge 134 of the rib 132 to elevate the secondary pins 204. The shuttle pin 138 is protruding from the first side 124 of the key 110 in an unlocked position, and the flipper pin 502 is rotated into an unlocked orientation by the shuttle pin 138. The sidebar 536 is engaging the primary pins 186, secondary pins 204, and flipper pin 502.

Figure 43A:
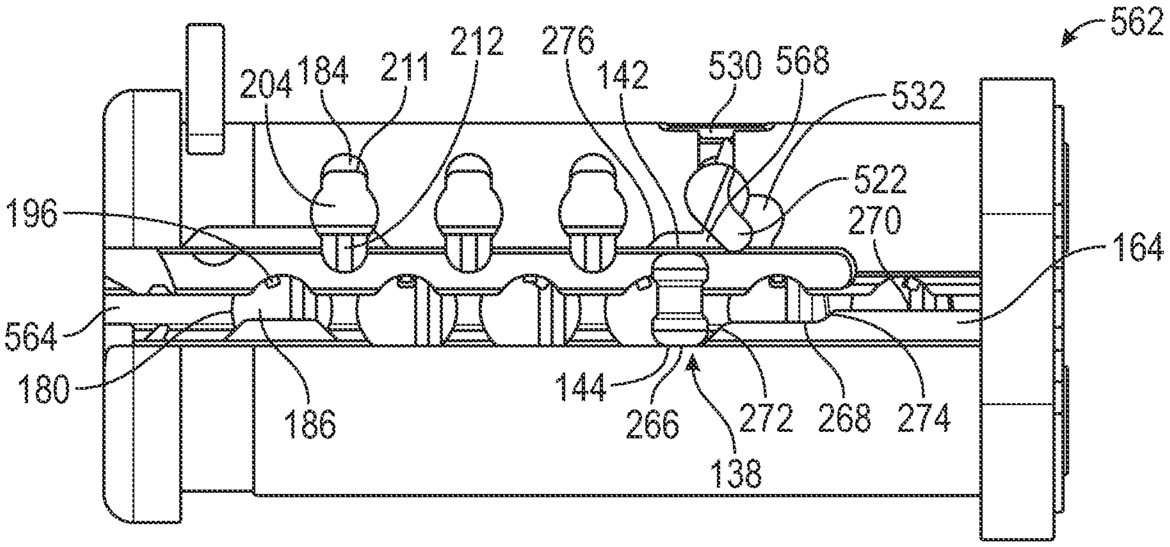
FIG. 43A is a bottom view of the plug, the shuttle pin, and the flipper pin, with the key omitted from the figure and with the shuttle pin in a retracted position.
Figure 43B:
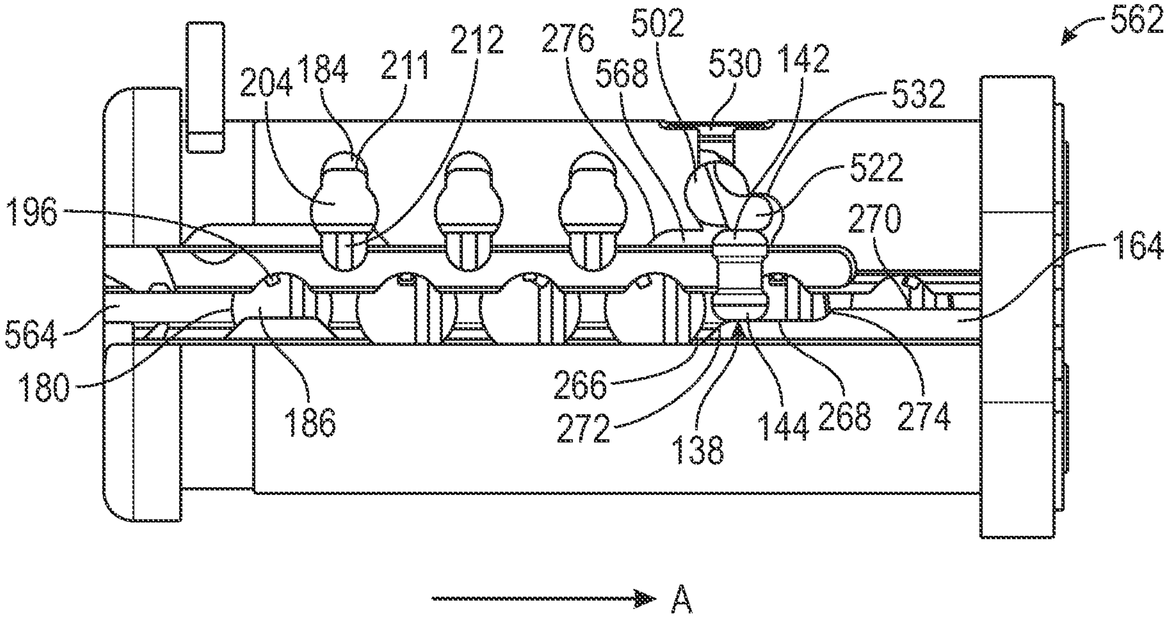
FIG. 43B is a bottom view of the plug, the shuttle pin, and the flipper pin, with the key omitted from the figure and with the shuttle pin in an extended position, engaging the flipper pin.

FIGS. 43A and 43B show the keyway 564 within the plug 562 having a multi-level ridge 164, a flipper pin hole 530 with the flipper pin 502 in a spring-biased resting position, and a flipper pin recess 532 extending from the flipper pin hole 530. The flipper pin 502 is shown within the keyway 564 as it would be positioned by the shuttle pin 138 of a key 110 inserted into the keyway 564. To illustrate the manipulation of the shuttle pin 138 more clearly, the key 110 is omitted from FIGS. 43A and 43B.

Figure 44:
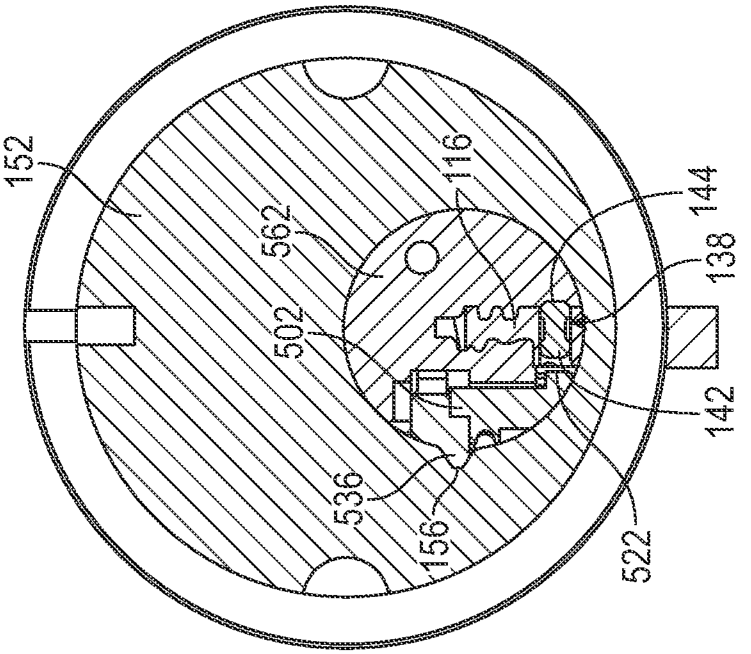
FIG. 44 is a transverse cross-section of the third embodiment of the cylinder lock assembly with the shuttle pin of the key in a retracted position and the flipper pin in a locked, blocking orientation.

Referring to FIG. 43A, as the key (not shown) is inserted into the keyway 564, the shuttle pin 138 travels through the keyway 564 to a first position. In the first position, as shown in FIG. 44, the second end 144 of the shuttle pin 138 extends into a groove 127 on the second side 126 of the key blade 116. The flipper pin 502 is in a spring-biased resting position where sidebar engagement lug 528 on the top end 510 does not align with the flipper pin cutout 538 on the sidebar 536, and the sidebar 536 is prevented from moving radially inwardly to retract from the groove 156.

Figure 45:
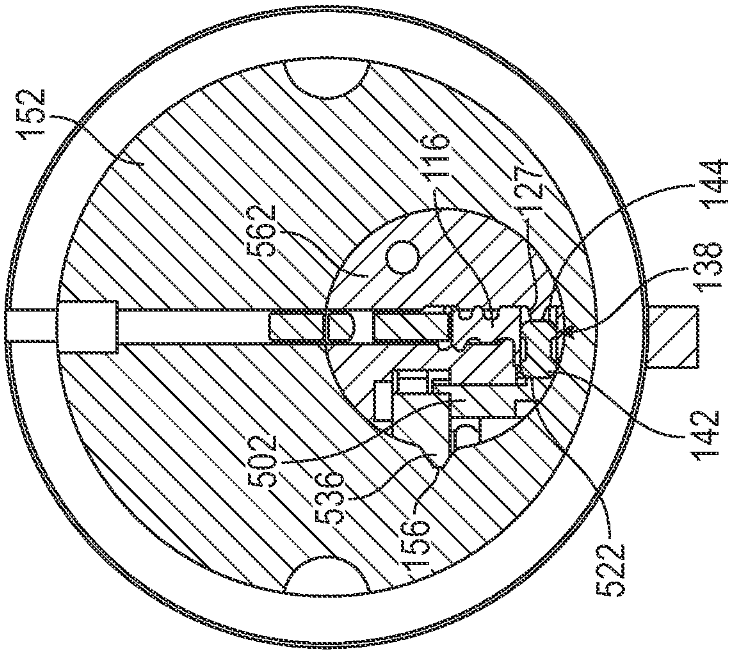
FIG. 45 is a transverse cross-section of the third embodiment of the cylinder lock assembly with the shuttle pin of the key in an extended position moving the flipper pin to an unlocked orientation with the sidebar in a locked position engaging a groove in a housing.

Referring to FIG. 43B, as the key 110 continues through the keyway 564 in the insertion direction A, the shuttle pin 138 engages a first transition ramp 272 of the multi-level ridge 164 extending into the groove 127 in the key blade 116 and moves from a first level 266 to a second level 268 of the multi-level ridge 164. Positioning the shuttle pin 138 at the second level 268 of the multi-level ridge 164 pushes the shuttle pin 138 into a shuttle pin relief 568 formed in the keyway 564 opposite the multi-level ridge 164. In this position, the enlarged first end 142 of the shuttle pin 138 extends out of the first side 124 of the key blade 116 (see FIG. 45), and contacts the flipper 522 that is rotated into the relief 568. As the key 110 moves forward into a fully inserted position, the second end 144 of the shuttle pin 138 continues up the multi-level ridge 164 and moves the shuttle pin 138 forward to rotate the flipper 522 into the flipper recess 532 in the flipper hole 530, thereby rotating the flipper pin 502. In the rotated position, the sidebar engagement lug 528 of the flipper pin 502 is now aligned with center cutout 539 of the flipper cutout 538 on the sidebar 536. This is illustrated in FIGS. 47B and 47C. In FIG. 47B, with the flipper pin 502 rotationally biased into a locked orientation, the sidebar engagement lug 528, is oriented transversely to the center cutout 539 of the flipper cutout 538. Thus, the initial cutouts 535, 537 of the flipper cutout 538 contact the flipper pin 502, thereby blocking radial movement of the sidebar 536. In FIG. 47C, the flipper pin 502 is rotated by the shuttle pin 138 of the inserted key 110 into an unlocked orientation, the side bar engagement lug 528 is aligned with the center cutout 539 of the flipper cutout 538, and the sidebar 536 is able to move radially into an unlocked position.

Figure 46:
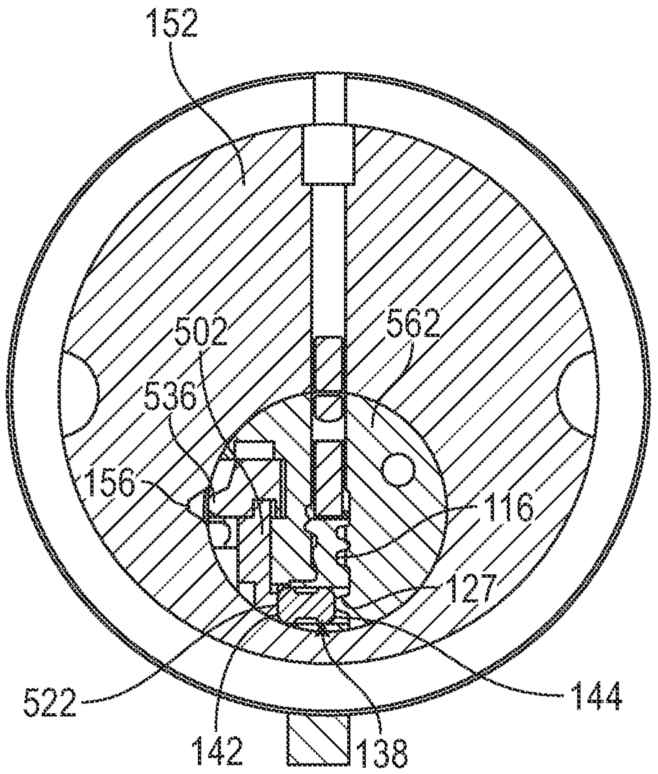
FIG. 46 is a transverse cross-section of the third embodiment of the cylinder lock assembly with the flipper pin in the unlocked orientation and with the sidebar in an unlocked position disengaged from a groove in a housing.

The shuttle pin 138 remains in the extended position holding the flipper pin 502 in the unlocked rotational orientation with flipper 522 in the flipper recess 532 and sidebar engagement lug 528 of the flipper pin 502 aligned with the center cutout 539 of the flipper cutout 538 on the sidebar 536. Once a torque is applied to the plug 562, the sidebar 536 may move radially into the plug 562. As the sidebar 536 moves radially inward, the beveled projection 550 withdraws from the axial groove 156 and permits the plug 562 to rotate within the housing 152 (see FIG. 46).

As the key blade 116 is removed from the plug 354, the extended end 142 of the shuttle pin 138 engages third transition feature 275 opposite the multi-level ridge 164. The third transition feature 275 moves the shuttle pin 138 from a position previously determined by the second level 268 back to a position primarily contained within the key blade 116 groove 127 at the first level 266. Movement of the shuttle pin 138 back to the retracted positions allows clearance for shuttle pin 138 in the keyway as the key blade 116 is removed. Key, Key Blank, and Lock Assembly—Fourth Embodiment As noted above, in other embodiments, lock assemblies 100, 300, and 500 may be configured to have two or more supplemental sidebar control elements (i.e., various combination of two or more lift pins, sliders, and/or flipper pins located at various positions along the length of the keyway).

Figure 48:
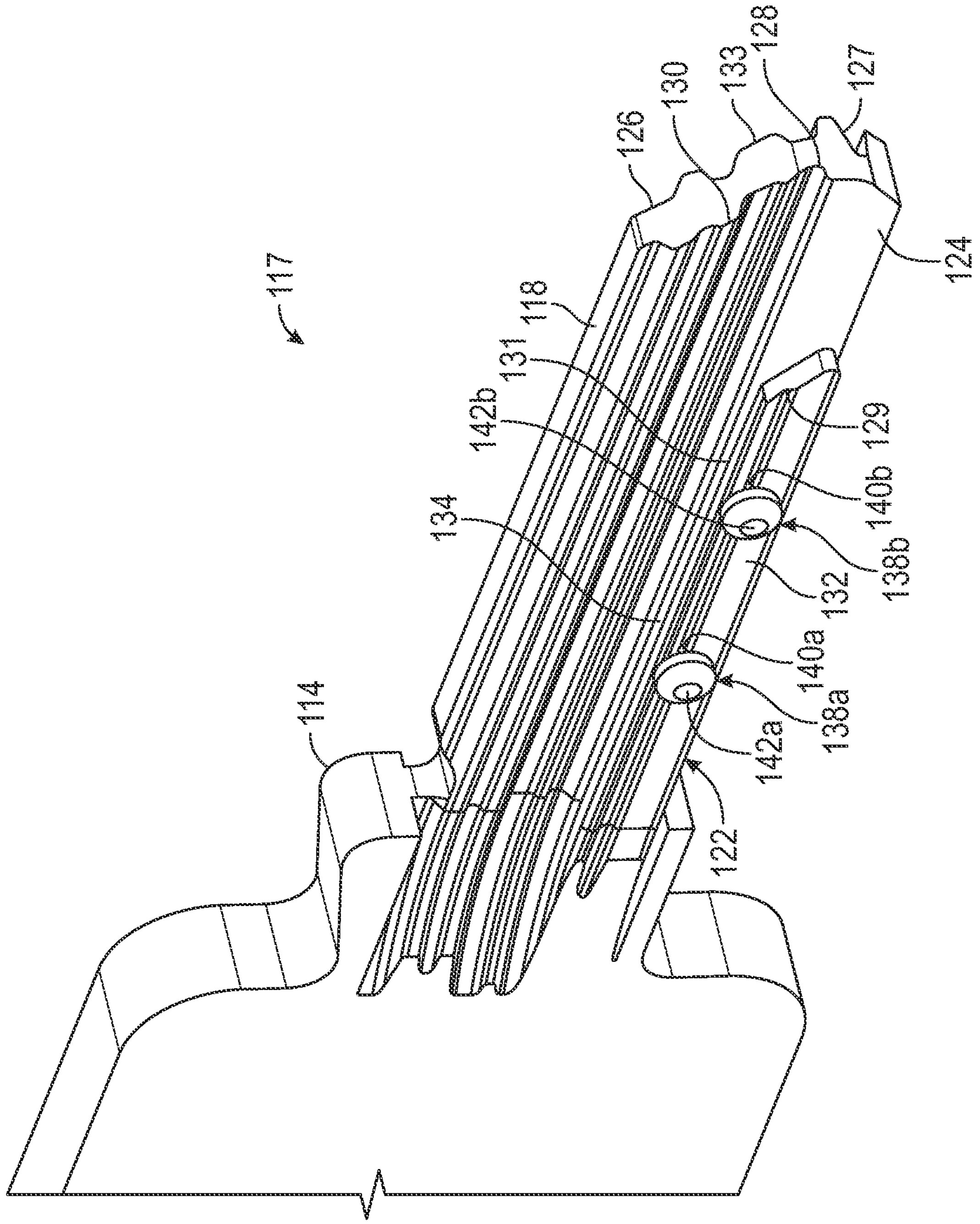
FIG. 48 is a top perspective view of a first side of a key blade blank with a first shuttle pin in an extended position and a second shuttle pin in an extended position.
Figure 49:
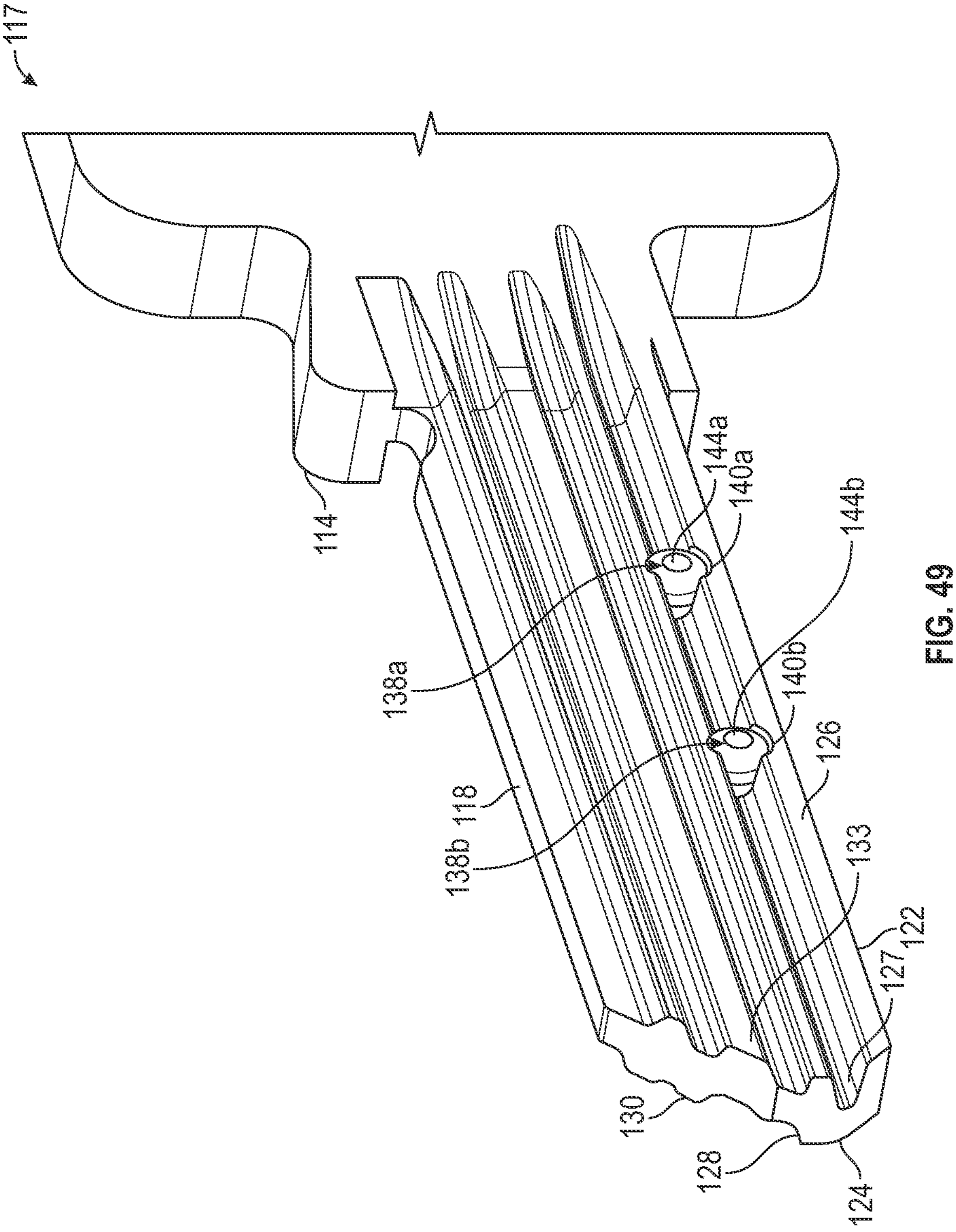
FIG. 49 is a top perspective view of a second side of the key blade blank with the first shuttle pin in the extended position and the second shuttle pin in the extended position.

To operate lock assemblies having two or more supplemental sidebar control elements, key blades/blanks and the corresponding bitted key may have two or more shuttle pins in a single key blade. FIGS. 48 and 49 depict first side 124 and second side 126, respectively, of a key blade blank 117 having a first shuttle pin 138*a* disposed within a through-hole 140*a* and a second shuttle pin 138*b* disposed within a through-hole 140*b*. Key blade blank 117 and shuttle pins 138*a*, 138*b* may have all features shown and described above with respect to key blade 116 and shuttle pin 138, respectively, except key blade blank 117 has two shuttle pins 138*a*, 138*b* instead of single shuttle pin 138 in key blade 116.

Blade 117 extends from key stop 114 and includes a primary top edge 118 configured to receive primary bitting cuts, a bottom edge 122, and first 124 and second 126 opposed sides extending between the primary top edge 118 and the bottom edge 122. Each side may include warding grooves and ridges extending longitudinally along the blade, such as groove 128 and ridge 130 on the first side 124 and groove 127 and ridge 133 on the second side 126. The first side 124 may further include a rib 132 extending longitudinally along at least a portion of the length of the key blade 117. Rib 132 defines a secondary top edge 134 configured to receive secondary bitting cuts. Rib 132 may include warding grooves and ridges, such as groove 129 and ridge 131, extending longitudinally along the rib.

Shuttle pin 138*a* is positioned at a first longitudinal location proximally located near key stop 114 and extending transversely through blade 117 from the first side 124 to groove 127 on second side 126 of blade 117. Shuttle pin 138*a* is moveable within the through-hole 140*a* across the width of the blade 117 by a corresponding multi-level ridge within a keyway of a lock. In some embodiments, as shown in FIG. 48, the shuttle pin 138*a* may extend through rib 132.

As further described below, multi-level ridge engages shuttle pin 138*a* and moves shuttle pin 138*a* from a first position, in which a second end 144*a* of the shuttle pin 138*a* extends into the groove 127, to a second position, in which the second end 144*a* of the shuttle pin 138*a* is moved out of the groove 127 and a first end 142*a* of the shuttle pin 138*a* extends from the first side 124 of the key blade 117 to actuate movement of a supplemental sidebar control element from a first locked state to an unlocked state. A retainer pin disposed in a retainer hole (not shown) blocks enlarged head portions of first end 142*a* and second end 144*a* to retain the shuttle pin 138*a* within through-hole 140*a* while allowing axial movement of the shuttle pin 138*a* within the through-hole 140*a*.

Shuttle pin 138*b* is positioned at a second longitudinal location at a distance further along the length of the blade 117 from key stop 114 and in line with shuttle pin 138*a* along the length of the key blade 117. Shuttle pin 138*b* extends transversely through blade 117 the first side 124 to groove 127 on second side 126 of blade 117 and is moveable within the through-hole 140*b* across the width of the blade 117 by the corresponding multi-level ridge within the keyway. In some embodiments, as shown in FIG. 48, the shuttle pin 138*b* may extend through rib 132.

As further described below, multi-level ridge engages shuttle pin 138*b* and moves shuttle pin 138*b* from a first position, in which a second end 144*b* of the shuttle pin 138*b* extends into the groove 127, to a second position, in which the second end 144*b* of the shuttle pin 138*b* is moved out of the groove 127 and a first end 142*b* of the shuttle pin 138*b* extends from the first side 124 of the key blade 117 to actuate movement of the lift pin 238*b*. A retainer pin disposed in a retainer hole (not shown) blocks enlarged head portions of first end 142*b* and second end 144*b* to retain the shuttle pin 138*b* within through-hole 140*b* while allowing axial movement of the shuttle pin 138*b* within the through-hole 140*b*.

Although the embodiment in FIGS. 48 and 49 show two shuttle pins 138*a*, 138*b*, disposed within key blade blank 117, other embodiments may include more than two shuttle pins and the shuttle pins may be located in various positions along the length of the key blade. Moreover, the key blade blanks may be machined into bitted keys having primary bittings machined or cut into the top edge and/or secondary bittings machined or cut into the second edge.

Figure 50:
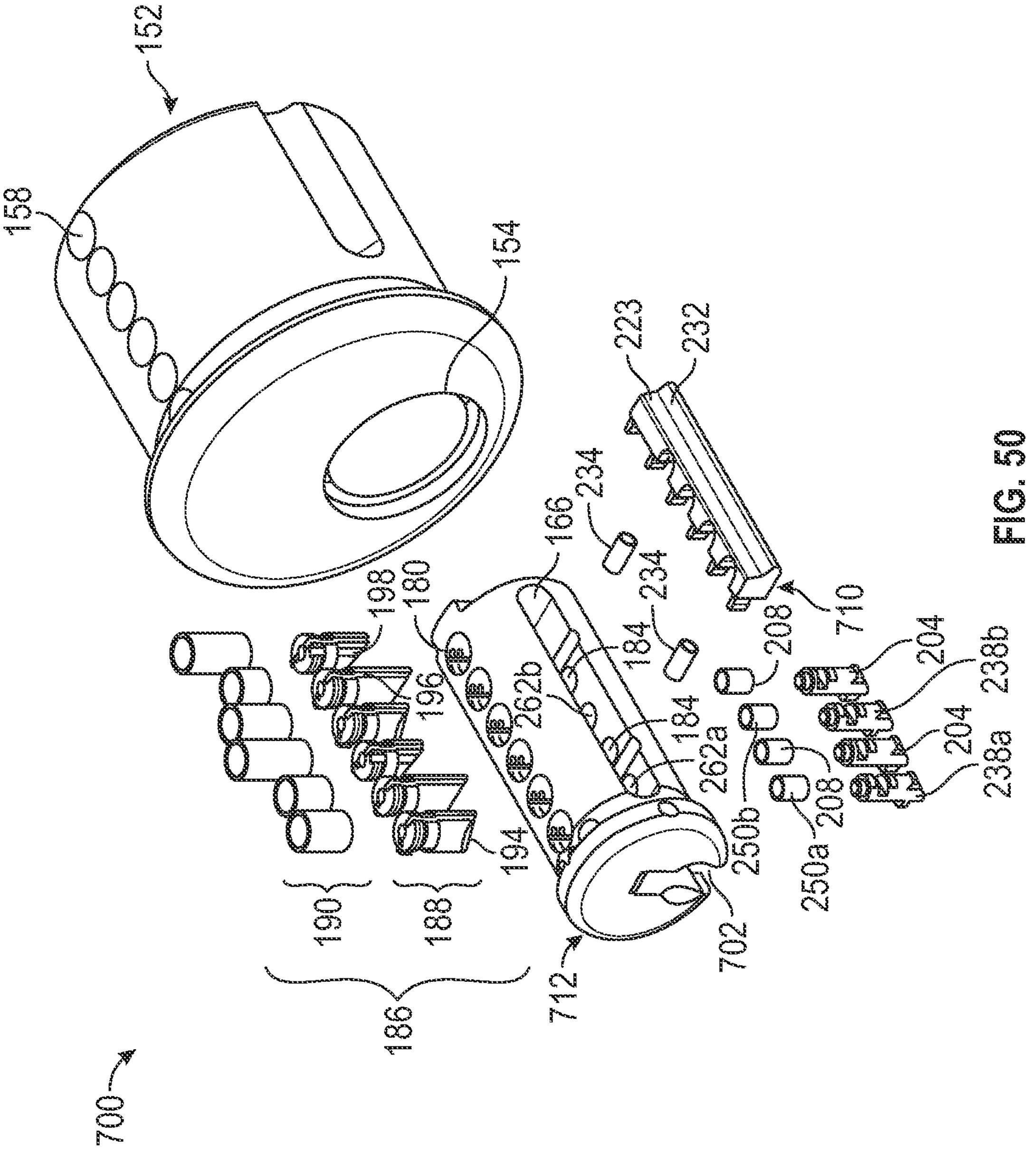
FIG. 50 is an exploded top perspective view of a fourth embodiment of a cylinder lock assembly with multiple, supplemental locking elements.

FIG. 50 illustrates one embodiment of a lock assembly 700 having a first lift pin 238*a* and a second lift pin 238*b* configured to be operated by a properly bitted key from key blade blank 117. Lock assembly 700 may have all features shown and described above with respect to lock assembly 100 except lock assembly 700 is configured for two lift pins 238*a*, 238*b* instead of single lift pin 238.

Referring to FIG. 50, as with lock assembly 100 (see FIG. 9), lock assembly 700 includes housing 152 having bore 154 and sidebar groove 156 (not shown), primary pin sets 186, and secondary pins 204. Plug 712 is disposed in the bore 154 of the housing 152 with a keyway 702 extending longitudinally through the plug 712. Like plug 160 described above, plug 712 may include sidebar cavity 166, primary pin holes 180, and secondary pin holes 184. Additionally, plug 712 includes a first lift pin hole 262*a* to house lift pin 238*a* and a second lift pin hole 262*b* to house lift pin 238*b*. A sidebar 710 is positioned in the sidebar cavity 166 formed in the side of the plug 712 and a beveled projection, or nose, 232 on a first side of the sidebar 223 extends into the sidebar groove 156 (not shown) formed in the sidewall of the axial bore 154 in the housing 152. In various embodiments, the sidebar may be controlled by only two or more supplemental sidebar control elements, or by any combination of primary pins, secondary pins, and supplemental sidebar control elements.

Figure 51:
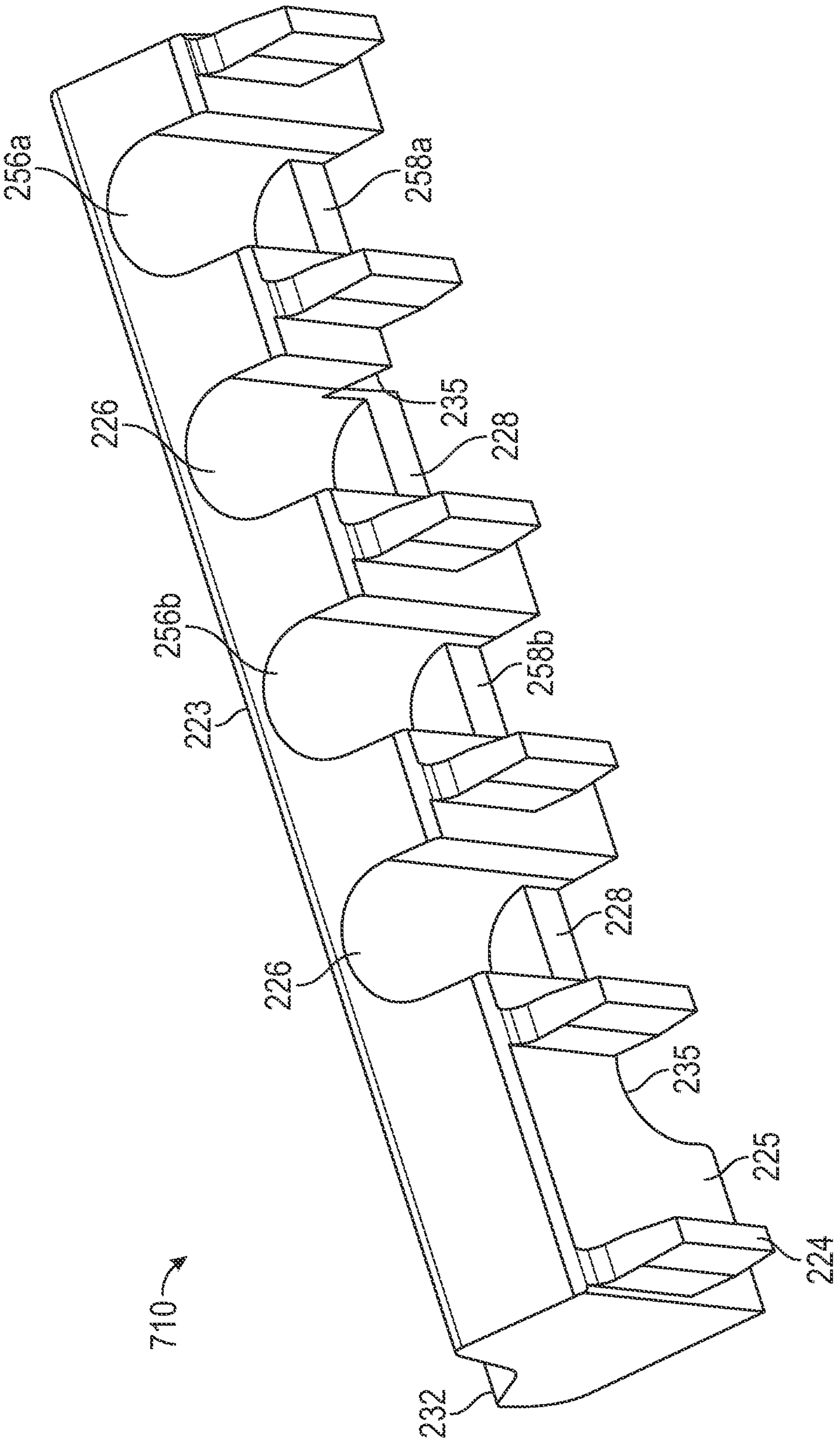
FIG. 51 is a top perspective view of a sidebar of the fourth embodiment of the cylinder lock assembly.

FIG. 51 shows one embodiment of a sidebar 710 corresponding to lock assembly 700 having first lift pin 238*a* and second lift pin 238*b*. Similar to sidebar 222 in lock assembly 100, the sidebar 710 has first side 223 having beveled projection or nose 232 and a second side 225 having various blocking elements to block the sidebar 710 from moving radially when the lock assembly 700 is in the locked state and allow radial movement of the sidebar 710 when the lock assembly 700 is in the unlocked state. The sidebar 710 includes primary pin blocking lugs 224, secondary cutouts 226 formed in the second side 225 between adjacent pairs of blocking lugs 224, and secondary blocking shelves 228 extending across each cutout 226. Sidebar 710 further includes a first supplemental cutout 256*a* and first supplemental blocking shelf 258*a* extending across cutout 256*a* to correspond with first lift pin 238*a*, and second supplemental cutout 256*b* and second supplemental blocking shelf 258*b* extending across cutout 256*b* to correspond with second lift pin 238*b*.

Figure 52:
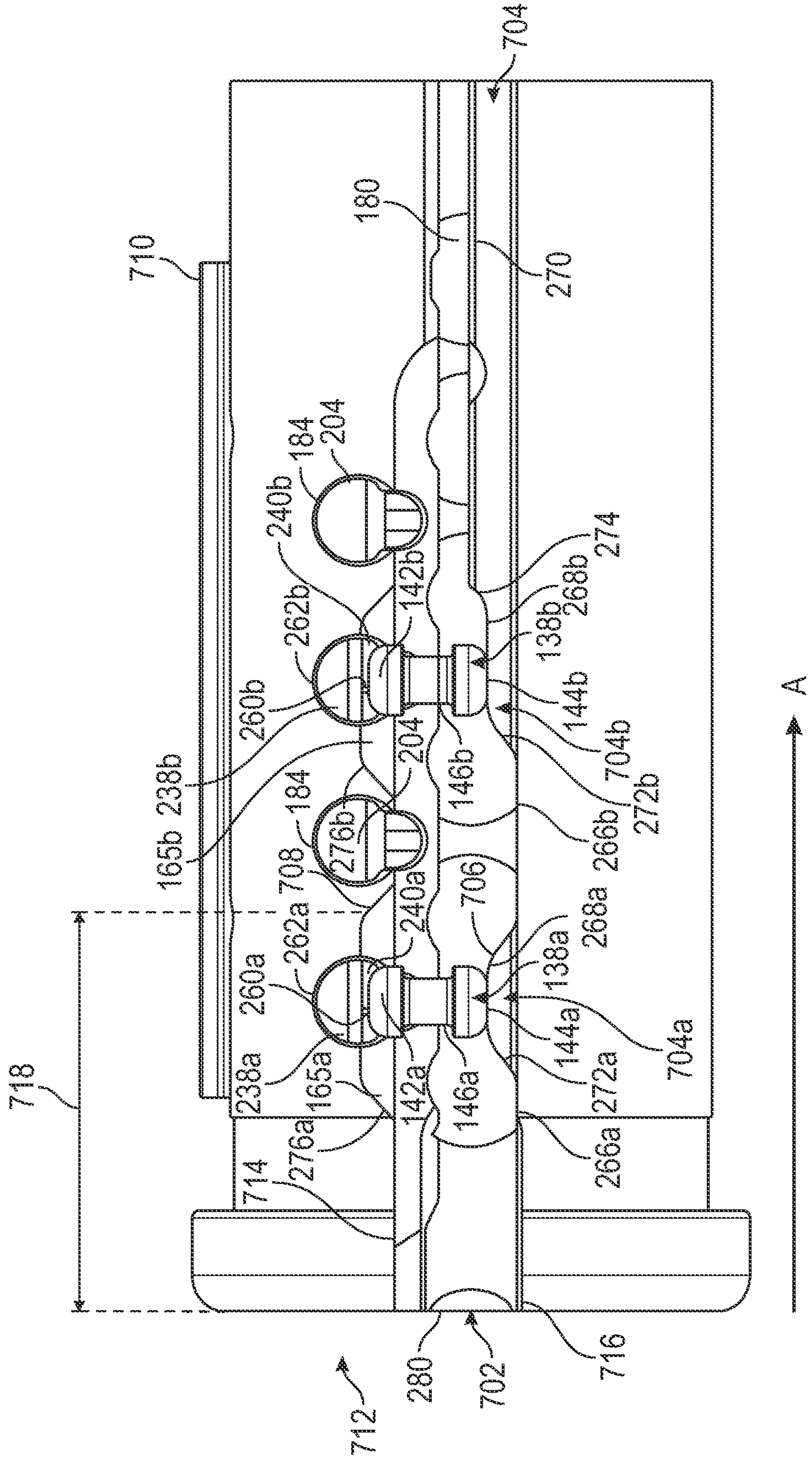
FIG. 52 is a bottom view of the plug, the first shuttle pin, the second shuttle pin, a first lift pin, a second lift pin, and a key (omitted) fully inserted, with a multi-level ridge configured to actuate the first shuttle pin at a first location of four supplemental locking element locations and the second shuttle pin at a third location of four supplemental locking element locations.

FIG. 52 shows the keyway 702 within the plug 712 having a multi-level ridge 704, first lift pin 238*a* disposed in first lift pin hole 262*a*, and a second lift pin 238*b* disposed in second lift pin hole 262*b*. Lift pin 238*a* is shown within the keyway 702 as it would be positioned by shuttle pin 138*a* of key blade 117, and lift pin 238*b* is shown within the keyway 702 as it would be positioned by the shuttle pin 138*b* of key blade 117. To illustrate the manipulation of the shuttle pin 138*a* and shuttle pin 138*b* more clearly, the key blade 117 is omitted from FIG. 52.

As shown in FIG. 52, first lift pin 238*a* has a shuttle pin cutout 240*a* and a downwardly pointing beveled edge 260*a* on a first side and a transverse sidebar slot (not shown) on a second side. Second lift pin 238*b* has a shuttle pin cutout 240*b* and a downwardly pointing beveled edge 260*b* on a first side and a transverse sidebar slot (not shown) on a second side. See also FIGS. 15A, 15B, 15C.

Multi-level ridge 704 is designed with transition ramps and levels to support two shuttle pins in a single key interacting with two lift pins in a single keyway. Multi-level ridge 704 may be referred to as having two sections—a first section 704*a* corresponding to lift pin 238*a* and shuttle pin 138*a* and a second section 704*b* corresponding to lift pin 238*b* and shuttle pin 138*b* when key blade 117 is fully inserted. Lift pin 238*a* is in position one (i.e., a first location of four possible supplemental locking element locations in plug 712) and closest to a front end 280 of keyway 702. The first section 704*a* of multi-level ridge 704 is on a side (second side) 716 of the keyway 702 opposite lift pin 238*a*. Lift pin 238*b* is in position three (i.e., a third location of four possible supplemental locking element locations in plug 712) and is the furthest supplemental sidebar locking element from the front end 280 of keyway 702. The second section 704*b* of multi-level ridge 704 is on the side 716 of the keyway 702 opposite lift pin 238*b*. In various embodiments, the second section 704*b* may be in any location along the length of keyway 702 on side 716 opposite the furthest supplemental sidebar locking element from the front end 280. The first section 704*a* may be in multiple locations and in any location along the length of the keyway on side 716 opposite a supplemental sidebar control element located before the second section 704*b* (i.e., located before the furthest supplemental sidebar locking element from the front end).

As the key blade 117 is inserted into keyway 702, multi-level ridge 704 first section 704*a* engages and moves shuttle pin 138*b* across the width of the key blade 117 to engage lift pin 238*a* on an opposite side (first side) 714 of the keyway 702. As the key blade 117 continues through the keyway 704, shuttle pin 138*b* disengages from lift pin 238*a* and moves away from multi-level ridge 704 first section 704*a* to multi-level ridge 704 second section 704*b*. The multi-level ridge 704 first section 704*a* then engages and moves shuttle pin 138*a* across the width of the key blade 117 to engage lift pin 238*a* on opposite side 714 of the keyway 702. Concurrently, multi-level ridge 704 second section 704*b* engages and moves shuttle pin 138*b* across the width of the key blade 117 to engage lift pin 238*b* on side 714 of the keyway 702. For the key blade 117 to successfully unlock the lock 700, a correct alignment of both shuttle pin 138*a* with lift pin 238*a* and shuttle pin 138*b* with lift pin 238*b* must occur. When key blade 117 is fully inserted into the keyway 702, the first section 704*a* of multi-level ridge location along the length of the cylinder keyway 702 corresponds to the location of lift pin 238*a* in the keyway 702 and shuttle pin 138*a* in the key blade 117, and the second section 704*b* of multi-level ridge location corresponds to the location of lift pin 238*b* in the keyway 702 and shuttle pin 138*b* in the key blade 117.

Referring to FIG. 52, the first section 704*a* of multi-level ridge is similar to the multi-level ridge 164 described above in connection with lock 100 except the first section 704*a* of multi-level ridge 704 has a regression ramp 706 as opposed to the second transition ramp 274 and third level 270 of lock 100. Multi-level ridge 704 first section 704*a* has two distinct levels (first level 266*a* and second level 268*a*) at different heights from the second side 716 of the keyway 702 and two transition zones or ramps (first transition ramp 272*a* between first level 266*a* and second level 268*a* and regression ramp 706 between second level 268*a* and a first level 266*b* of the second section 704*b*). Second transition ramp 274 and third level 270 are omitted from first section 704*a* of multi-level ridge 704 to allow shuttle pin 138*b* to travel over multi-level ridge first section 704*a* to second section 704*b* without being blocked by third level.

In the first level 266*a* of the first section 704*a*, the multi-level ridge 704 is sufficiently removed from the keyway 702 to provide clearance for both the first shuttle pin 138*a* and second shuttle pin 138*b* when the key blade 117 is inserted into the keyway 702 and the shuttle pins 138*a*, 138*b* are primarily contained in groove 127 of the key blade 117. Without the shuttle pin clearance provided by the first level 266*a*, the key blade 117 could not be inserted into the cylinder keyway 702.

The first transition ramp 272*a* moves the second shuttle pin 138*b* and thereafter the first shuttle pin 138*a* from the first level 266*a*, across the width of the key blade 117, into a relief 165*a* formed on side 714 of the keyway 702, and onto the second level 268*a*. When the key blade 117 is fully inserted, first shuttle pin 138*a* is seated on the second level 268*a* and first shuttle pin 138*a* properly engages the first lift pin 238*a* in the plug 712 as shown in FIG. 52.

Regression ramp 706 allows the shuttle pin 138*b* to move from the second level 268*a* of first section 704*a* to the first level 266*b* of second section 704*b* as the key blade 117 is inserted into the keyway 702. Referring to FIG. 52, keyway 702 includes a fourth transition feature (e.g., ramp) 708 on side 714 of the keyway 702 opposite multi-level ridge 704 first section 704*a* to move the second shuttle pin 138*b* down the regression ramp 706 and back to the retracted first position primarily contained within the groove 127 of the key blade 117. A dimension 718 from the front end 280 of cylinder 712 keyway 702 to fourth transition feature 708 is determined by the location of the first lift pin 238*a* in cylinder 712. Regression ramp 706 and fourth transition feature 708 are necessary to allow clearance for the shuttle pin 138*b* to continue traveling through the keyway 702 after engaging the first section 704*a* of the multi-level ridge 704 and to allow shuttle pin 138*b* to properly engage a beveled edge 260*b* of lift pin 238*b*.

The second section 704*b* of multi-level ridge may include all features shown and described above with respect to multi-level ridge 164 in lock 100. Multi-level ridge 704 second section 704*b* has three distinct levels, (first level 266*b*, second level 268*b*, and third level 270) at different heights from side 716 of the keyway 702 and two transition zones or ramps (first transition ramp 272*b* between first level 266*b* and second level 268*b* and second transition ramp 274 between second level 268*b* and third level 270) utilized to engage and interact with the shuttle pin 138*b* in the key blade 117.

In the first level 266*b*, the multi-level ridge 704 second section 704*b* is sufficiently removed from the keyway 702 to provide clearance for shuttle pin 138*b* to travel through the keyway 702 from the first section 704*a* to the second section 704*b* as the key blade 117 is being inserted into the keyway 702. Without the shuttle pin clearance provided by the first level 266*b*, shuttle pin 138*b* may engage side 716 of the keyway 702 or other supplemental locking elements (e.g., side pin 204) and prevent key blade 117 from fully inserting into the cylinder keyway 702.

The first transition ramp 272*b* moves the second shuttle pin 138*b* from the first level 266*b* to the second level 268*b* as the key blade 117 travels through the keyway 702. Positioning shuttle pin 138*b* at the second level 268*b* of the multi-level ridge 704 moves shuttle pin 138*b* across the width of the key blade 117, into a relief 165*b* formed in the keyway 702, and onto the second level 268*b* to properly engage the lift pin 238*b* in the cylinder 712 when the key blade 117 is fully inserted. As shown in FIG. 52, shuttle pin 138*b*, positioned at second level 268*b* of multi-level ridge 704, is properly engaging lift pin 238*b* on the opposite side 714 of the keyway 702.

The second transition 274 blocks the shuttle pin 138*b* from progressing past the second level 268*b*. The third level 270 is where the multi-level ridge 704 extends to its maximum height into the keyway 702 and completely engages in the corresponding groove 127 of the key blade 117. The third level 270 prevents the shuttle pin 138*b* disposed within the groove 127 from passing and also provides alignment and tracking of the key blade 117 in the cylinder keyway 702.

Referring to FIG. 52, as the key blade 117 is inserted into the keyway 702, second shuttle pin 138*b* travels through the keyway 702 to the first level 266*a* of multi-level ridge 704 first section 704*a*. At this point, a second end 144*b* of shuttle pin 138*b* extends into groove 127 on the second side 126 of the key blade 117. The first lift pin 238*a* and second lift pin 238*b* are in a resting position where sidebar slots 242 on first lift pin 238*a* and second lift pin 238*b* are not aligned with supplemental blocking shelf 258*a* and supplemental blocking shelf 258*b*, respectively, and the sidebar 710 is prevented from moving radially inwardly to retract from the groove 156.

As the key blade 117 is inserted further into the keyway 702, the first transition ramp 272*a* engages the second end 144*b* of shuttle pin 138*b* (i.e., the second shuttle pin 138*b* contacts the first transition ramp 272*a*) in the key blade 117 groove 127 and moves shuttle pin 138*b* from the first level 266*a* to the second level 268*a* of the multi-level ridge 704 first section 704*a*. Positioning the shuttle pin 138*b* to the second level 268*a* of the first section 704*a* moves the shuttle pin 138*b* across the width of key blade 117, into relief 165*a* formed in the keyway 162, to properly engage the first lift pin 238*a* in the cylinder 712. In this position, the sidebar slot 242 on the first lift pin 238*a* is aligned with supplemental blocking shelf 258*a*, but second lift pin 238*b* remains in a resting position where sidebar slots 242 on second lift pin 238*b* are not aligned with supplemental blocking shelf 258*b*. The sidebar 710 is prevented from moving radially inwardly to retract from the groove 156.

As the key blade 117 moves forward, shuttle pin 138*b* disengages lift pin 238*a* and continues traveling in the insertion direction A at a position or height within the keyway 702 determined by the second level 268*a*. The extended end 142*b* of shuttle pin 138*b* contacts the fourth transition feature 708 opposite the multi-level ridge 704. The fourth transition feature 708 moves the shuttle pin 138*b* from the position previously determined by the second level 268*a* to the regression ramp 706 and to a position primarily contained within the key blade 117 groove 127 at the first level 266*b* of second section 704*b*. Movement of the second shuttle pin 138*b* back to the retracted position allows clearance for shuttle pin 138*b* in the keyway 702 as the key blade 117 continues traveling in the insertion direction.

In continuing through the keyway 702 in the insertion direction A, the second shuttle pin 138*b* travels to the first level 266*b* of multi-level ridge 704 second section 704*b*. Concurrently, as second shuttle pin 138*b* leaves the first section 704*a* of multi-level ridge 704 and travels to the second section 704*b* of multi-level ridge 704, first shuttle pin 138*a* enters the keyway 702 and travels through the keyway 702 to the first level 266*a* of multi-level ridge 704 first section 704*a*. In this position, a second end 144*a* of the shuttle pin 138*a* extends into groove 127 on the second 126 side of the key blade 117. The lift pins 238*a*, 238*b* are in a resting position and not aligned with supplemental blocking shelves 258*a*, 258*b*.

In continuing through the keyway 702 in the insertion direction A, shuttle pin 138*b* engages first transition ramp 272*b* extending into the groove 127 in the key blade 117. First transition ramp 272*b* pushes shuttle pin 138*b* from the first level 266*b* to the second level 268*b* of the multi-level ridge second section 704*b*. Positioning the shuttle pin 138*b* to the second level 268*b* of the multi-level ridge 704 moves the shuttle pin 138*b* across the width of the key blade 117, into relief 165*b* formed in the keyway 702. As shown in FIG. 52, the enlarged first end 142*b* of the shuttle pin 138*b* extends out of the first side 124 of the key blade 117 and contacts the beveled edge 260*b* of the lift pin 238*b*, which causes the beveled edge 260*b* to ride up onto the enlarged head portion 142*b* and elevate the lift pin 238*b*. The shuttle pin 138*b* remains in the extended position and holding the lift pin 238*b* in the elevated position. In the elevated position, the sidebar slot 242*b* is aligned with the supplemental blocking shelf 258*b*.

As shuttle pin 138*b* is engaging the first transition ramp 272*b* and moving to the second level 268*b* of second section 704*b*, shuttle pin 138*a* is simultaneously engaging first transition ramp 272*a* of first section 704*a* and moving to the second level 268*a*. First transition ramp 272*a* extending into the groove 127 in the key blade 117 pushes shuttle pin 138*a* across the width of the key 110, into relief 165*a* and onto second level 268*a* of the multi-level ridge 704 first section 704*a*. The enlarged first end 142*a* of the shuttle pin 138*a* extends out of the first side 124 of the key blade 117 and contacts the beveled edge 260*a* of the lift pin 238*a*, which causes the beveled edge 260*a* to ride up onto the enlarged head portion 142 and elevate the lift pin 238*a*. In the elevated position, the sidebar slot 242*a* is aligned with the supplemental blocking shelf 258*a*.

With both lift pin 238*a* and lift pin 238*b* in the elevated position having the sidebar slots 242 aligned with the supplemental blocking shelf 258*a* and supplemental blocking shelf 258*b*, respectively, the supplemental blocking shelves 258*a*, 258*b* can enter the sidebar slots 242, and the sidebar 710 is no longer blocked by lift pin 238*a* and lift pin 238*b*. As the sidebar 710 moves radially inward, the beveled projection 232 withdraws from the axial groove 156 and permits the plug 712 to rotate within the housing 152.

As the key blade 117 is removed from the cylinder 712, the extended end 142*a* of the shuttle pin 138*a* leaves the relief 165*a* and engages third transition feature 276*a* opposite the multi-level ridge 704 first side 704*a*, and the extended end 142*b* of the shuttle pin 138*b* leaves the relief 165*b* and engages third transition feature 276*b* opposite the multi-level ridge 704 second section 704*b*. The third transition feature 276*a* moves the shuttle pin 138*a* from a position previously determined by the second level 268*a* back to a position primarily contained within the key blade 117 groove 127 at the first level 266*a*. Third transition feature 276*b* moves the shuttle pin 138*b* from a position previously determined by the second level 268*b* back to a position primarily contained within the key blade 117 groove 127 at the first level 266*b*. Movement of the shuttle pin 138*a* and shuttle pin 138*b* back to the retracted positions allows clearance for shuttle pin 138*a* and shuttle pin 138*b* in the keyway 702 as the key blade 117 is removed.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A method of forming a key from a key blank, wherein the key is operable for opening a lock comprising (i) a plug with a keyway formed therein, (ii) a housing having a bore within which the plug is rotatably disposed, (iii) a sidebar disposed within a sidebar opening formed in the plug and configured for radial movement with respect to an axis of rotation of the plug for engaging a sidebar groove formed in a wall of the bore formed in the housing for controlling rotation of the plug within the housing, (iv) primary pin assemblies aligned with the keyway for partially controlling rotation of the plug within the housing and for partially controlling radial movement of the sidebar within the sidebar opening, wherein each primary pin assembly includes a tip extending into the keyway, (v) one or more secondary pins for partially controlling radial movement of the sidebar within the sidebar opening, wherein each secondary pin has a pin body disposed in a secondary pin hole formed in the plug at a laterally offset position from the keyway, and wherein each secondary pin includes a transverse projection extending from the pin body into the keyway, and (vi) at least one supplemental sidebar control element for partially controlling radial movement of the sidebar within the sidebar opening, wherein each supplemental sidebar control element is disposed within the plug at a laterally offset position from the keyway, and wherein each supplemental sidebar control element includes a key-engaging portion that extends into an associated lateral relief formed in the keyway and is laterally offset from the transverse projection of each secondary pin, the key blank comprising a key blade configured to be inserted into the keyway and including a primary top edge, a bottom edge, first and second opposed sides extending between the primary top edge and the bottom edge, a rib extending longitudinally along at least a portion of the first side, and a groove opposite the rib and extending longitudinally along at least a portion of the length of the second side, the method comprising:

forming primary bittings on the primary top edge for contacting the tips of the primary pin assemblies extending into the keyway and manipulating the primary pin assemblies of the lock when the key formed from the key blank is inserted into the keyway;

forming secondary bittings on a secondary top edge of the rib for contacting the transverse projection of each secondary pin and manipulating the secondary pin of the lock when the key formed from the key blank is inserted into the keyway; and providing at least one movable shuttle pin within a through-hole extending through the key blade from the first side to the second side, wherein the shuttle pin is configured to engage a multi-level ridge projecting from a side of the keyway and aligned with the groove of the key blade as the key formed from the key blank is inserted into the keyway to move the shuttle pin from a first position, where one end of the shuttle pin extends into the groove, to a second position, where an opposite end of the shuttle pin extends from the first side of the key blade into the lateral relief to contact the key-engaging portion and actuate the supplemental sidebar control element, and wherein the secondary bittings are configured to not engage the key-engaging portion of the supplemental sidebar control element as the key formed from the key blank is inserted into the keyway.

2. The method of claim 1, wherein the shuttle pin extends through the rib.

3. The method of claim 1, wherein the shuttle pin comprises a first head portion, a second head portion, and a center portion connecting the first head portion to the second head portion, wherein the first head portion and the second head portion are wider than the center portion, and wherein providing the shuttle pin comprises inserting a shuttle pin retainer within a retainer hole formed in the key blade that intersects the through hole so that the shuttle pin retainer is disposed between the first head portion and the second head portion of the shuttle pin.

4. The method of claim 1, wherein forming the primary bittings comprises forming skew type bittings configured to elevate and rotate the primary pin assemblies.

5. The method of claim 1, wherein the multi-level ridge includes a first level, a second level located further from a front end of the keyway than the first level, projecting further from the side of the keyway than the first level, and located opposite to the supplemental sidebar control element, a first transition ramp from the first level to the second level, a third level located further from the front end of the keyway than the second level and projecting further from the side of the keyway than the second level, and a second transition ramp from the second level to the third level, and wherein the shuttle pin is operable to pass the first level as the key is inserted into the keyway with the shuttle pin located in the first position; contact the first transition ramp extending into the groove as the key is inserted into the keyway to move the shuttle pin from the first position to the second position when the shuttle pin reaches the second level; and to block further insertion of the key into the keyway if the shuttle pin contacts the second transition ramp as the key is inserted into the keyway.

6. The method of claim 1, wherein each primary pin assembly comprises a primary pin and an associated primary pin driver, each primary pin and associated primary pin driver are arranged coaxially within aligned holes formed in the housing and the plug when the lock is in a locked state, the primary pin of each primary pin assembly includes a sidebar recess formed in a side surface of the pin, and the sidebar includes a primary blocking lug associated with each primary pin assembly, and wherein the primary bittings are configured to elevate each primary pin assembly within an associated one of the aligned holes from a locked position, in which a separation between each primary pin and its associated primary pin driver is not aligned with a shear line between the plug and the housing, to an unlocked position, in which the separation between each primary pin and its associated primary pin driver is aligned with the shear line between the plug and the housing, and to rotate each primary pin assembly within the associated hole from a locked rotational orientation, in which the sidebar recess is not aligned with the primary blocking lug and the primary blocking lug contacts the primary pin to prevent radial movement of the sidebar within the sidebar opening, to an unlocked rotational orientation, in which the sidebar recess is aligned with the associated primary blocking lug and the primary blocking lug can enter the sidebar recess to permit radial movement of the sidebar within the sidebar opening.

7. The method of claim 6, wherein each primary pin assembly is arranged within an associated, coaxially aligned hole formed in the housing and the plug when the lock is in a locked state, and wherein the primary bittings are formed with skewed cut bittings and each primary pin assembly includes an angled chisel tip, and wherein manipulating the primary pin assemblies comprises rotating each primary pin assembly within the associated hole by contacting the angled chisel tip of the primary pin assembly with the skewed cut bittings.

8. The method of claim 1, wherein each secondary pin is disposed within an associated secondary hole formed in the plug and extending into the sidebar opening, each secondary pin includes a sidebar slot formed therein, and the sidebar includes a secondary blocking shelf associated with each secondary pin, and wherein the secondary bittings are configured to move each secondary pin within its associated secondary hole from (i) a locked position, in which the sidebar slot is not aligned with the associated secondary blocking shelf and the associated secondary blocking shelf contacts the secondary pin to prevent radial movement of the sidebar within the sidebar opening, to (ii) an unlocked position, in which the sidebar slot is aligned with the associated secondary blocking shelf and the associated secondary blocking shelf can enter the sidebar slot so that the secondary pin does not prevent radial movement of the sidebar within the sidebar opening.

9. The method of claim 1, wherein each supplemental sidebar control element comprises a supplemental pin, each supplemental pin is disposed within an associated supplemental pin hole formed in the plug and extending into the sidebar opening, each supplemental pin includes a sidebar engagement feature formed therein, and the sidebar includes a supplemental blocking feature associated with each supplemental pin, and wherein the shuttle pin is configured to move each supplemental pin within its associated supplemental pin hole from (i) a locked state in which the sidebar engagement feature of the supplemental pin is not aligned with the associated supplemental blocking feature of the sidebar and the associated supplemental blocking feature contacts the supplemental pin to prevent radial movement of the sidebar within the sidebar opening to (ii) an unlocked state in which the sidebar engagement feature of the supplemental pin is aligned with the associated supplemental blocking feature of the sidebar and the associated supplemental blocking feature can cooperate with the sidebar engagement feature so that the supplemental pin does not prevent radial movement of the sidebar within the sidebar opening.

10. The method of claim 9, wherein each supplemental pin comprises a lift pin disposed within the associated supplemental pin hole for axial movement with respect to the supplemental pin hole, each lift pin includes a sidebar slot formed therein, and the sidebar includes a supplemental blocking shelf associated with each lift pin, wherein moving the at least one supplemental pin within its associated supplemental pin hole comprises contacting the lift pin with the shuttle pin to elevate the lift pin within the associated supplemental pin hole from (i) a locked state in which the lift pin is positioned so that the sidebar slot is not aligned with the associated supplemental blocking shelf and the associated supplemental blocking shelf contacts the lift pin to prevent radial movement of the sidebar within the sidebar opening, to (ii) an unlocked state in which the lift pin is positioned so that the sidebar slot is aligned with the associated supplemental blocking shelf and the associated supplemental blocking shelf can enter the sidebar slot so that the lift pin does not prevent radial movement of the sidebar within the sidebar opening.

11. The method of claim 10, wherein the lift pin comprises a beveled tip and wherein contacting the lift pin with the shuttle pin to elevate the lift pin comprises the shuttle pin contacting the beveled tip as the key blade is inserted into the keyway to move the lift pin within the associated supplemental pin hole from the locked state to the unlocked state.

12. The method of claim 9, wherein each supplemental pin comprises a flipper pin disposed within the associated supplemental pin hole for rotational movement about a longitudinal axis of the flipper pin; each flipper pin includes a sidebar engaging lug formed on the flipper pin, and the sidebar includes a flipper pin cutout formed in the sidebar, and wherein moving the at least one supplemental pin within its associated supplemental pin hole comprises contacting the flipper pin with the shuttle pin to rotate the flipper pin within the associated supplemental pin hole from the locked state in which the flipper pin is rotationally oriented within the associated supplemental pin hole so that the sidebar engaging lug is not aligned with the flipper pin cutout and the sidebar engaging lug contacts the sidebar to prevent radial movement of the sidebar within the sidebar opening, to the unlocked state in which the flipper pin is rotationally oriented within the associated supplemental pin hole so that the sidebar engaging lug is aligned with the flipper pin cutout and the sidebar engaging lug can enter the flipper pin cutout so that the sidebar engaging lug does not prevent radial movement of the sidebar within the sidebar opening.

13. The method of claim 12, wherein the flipper pin comprises a transversely extending shuttle pin engaging portion and wherein contacting the flipper pin with the shuttle pin to rotate the flipper pin comprises the shuttle pin contacting the shuttle pin engaging portion as the key blade is inserted into the keyway to rotate the flipper pin within the associated supplemental pin hole from the locked state to the unlocked state.

14. The method of claim 1, wherein each supplemental sidebar control element comprises a slider disposed within an associated slider hole formed in the plug for axial movement with respect to the plug, wherein the slider hole extends into the sidebar opening, and wherein the slider includes a sidebar blocking lug projecting therefrom and the sidebar includes a slider cutout, and wherein the shuttle pin is configured to move the slider from (i) a locked state in which the sidebar blocking lug is not aligned with the slider cutout and the sidebar contacts the sidebar blocking lug to prevent radial movement of the sidebar within the sidebar opening to (ii) an unlocked state in which the sidebar blocking lug is aligned with the slider cutout and the slider cutout receives the sidebar blocking lug so that the sidebar blocking lug does not prevent radial movement of the sidebar within the sidebar opening.

15. The method of claim 1, wherein the groove is paracentric to a centerline of the key blade.

* * * * *